(12) United States Patent
Burch et al.

(10) Patent No.: US 11,938,990 B1
(45) Date of Patent: Mar. 26, 2024

(54) ITEM IDENTIFYING MOBILE APPARATUS

(71) Applicant: Amazon Technologies, Inc., Seattle, WA (US)

(72) Inventors: Wade Burch, Grafton, MA (US); Robert David Serra, Nashua, NH (US); Matthew Clark Webster, Lincoln, RI (US); Jacob A Siegel, Southborough, MA (US); Brendan Kyle McLeod, Londonderry, NH (US); Jacob Paul Warren, Auburn, MA (US); Sridharan Thirumalai Vasu, Framingham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 17/543,147

(22) Filed: Dec. 6, 2021

(51) Int. Cl.
*B62B 3/14* (2006.01)
*B62B 5/00* (2006.01)
*G01G 19/12* (2006.01)
*G06Q 30/0601* (2023.01)
*H04N 23/90* (2023.01)

(52) U.S. Cl.
CPC .......... *B62B 5/0096* (2013.01); *B62B 3/14* (2013.01); *G01G 19/12* (2013.01); *G06Q 30/0623* (2013.01); *H04N 23/90* (2023.01); *B62B 2301/04* (2013.01)

(58) Field of Classification Search
CPC ..... B62B 5/0096; B62B 3/14; B62B 2301/04; H04N 23/90; G01G 19/12; G06Q 30/0623
See application file for complete search history.

(56) References Cited

U.S. PATENT DOCUMENTS

| | | | | |
|---|---|---|---|---|
| 4,071,740 A * | 1/1978 | Gogulski | ........... | G06K 7/10861 235/431 |
| 7,839,284 B2 * | 11/2010 | Rosebush | ............ | G08B 13/187 340/568.1 |
| 7,934,647 B1 * | 5/2011 | Mims | ................... | G07G 1/0081 235/431 |
| 8,371,504 B2 * | 2/2013 | Connelly | ................ | B62B 3/148 235/383 |

(Continued)

FOREIGN PATENT DOCUMENTS

| | | |
|---|---|---|
| DE | 102021110909 A1 * 11/2022 | |
| WO | WO-2019166038 A1 * 9/2019 | ............. B62B 3/005 |

*Primary Examiner* — John D Walters
(74) *Attorney, Agent, or Firm* — Lee & Hayes P.C.; Russell Wagstaff

(57) ABSTRACT

This disclosure describes, in part, a mobile apparatus for identifying items. For instance, the mobile apparatus may include a frame, a basket that attaches to the frame, a tray that attaches to the frame, and a user-facing module that attaches to the frame. Weight sensors may be located beneath the basket and the tray in order to determine the weights of items added to the mobile apparatus. The user-facing module may include imaging devices, such as cameras, that the mobile apparatus uses to perform one or more functions. For example, the mobile apparatus may use the imaging devices to identify items placed within the basket, determine locations of the mobile apparatus within a facility, and/or the like. By including these components, the mobile apparatus is able to generate data that represents the items added to the mobile apparatus, the weights of the items, and the costs of the items.

20 Claims, 24 Drawing Sheets

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,953,906 B1 * | 3/2021 | McMahon | B62B 3/1424 |
| 11,265,518 B2 * | 3/2022 | Yones | H04N 23/60 |
| 11,618,490 B2 * | 4/2023 | Yones | G07G 1/0081 |
| | | | 340/568.5 |
| 2013/0284806 A1 | 10/2013 | Margalit | |
| 2022/0198550 A1 * | 6/2022 | Meidar | G06Q 20/20 |
| 2023/0147385 A1 * | 5/2023 | Hagen | G01G 19/4144 |
| | | | 705/23 |
| 2023/0147769 A1 * | 5/2023 | Hagen | G07G 1/009 |
| | | | 705/23 |

\* cited by examiner

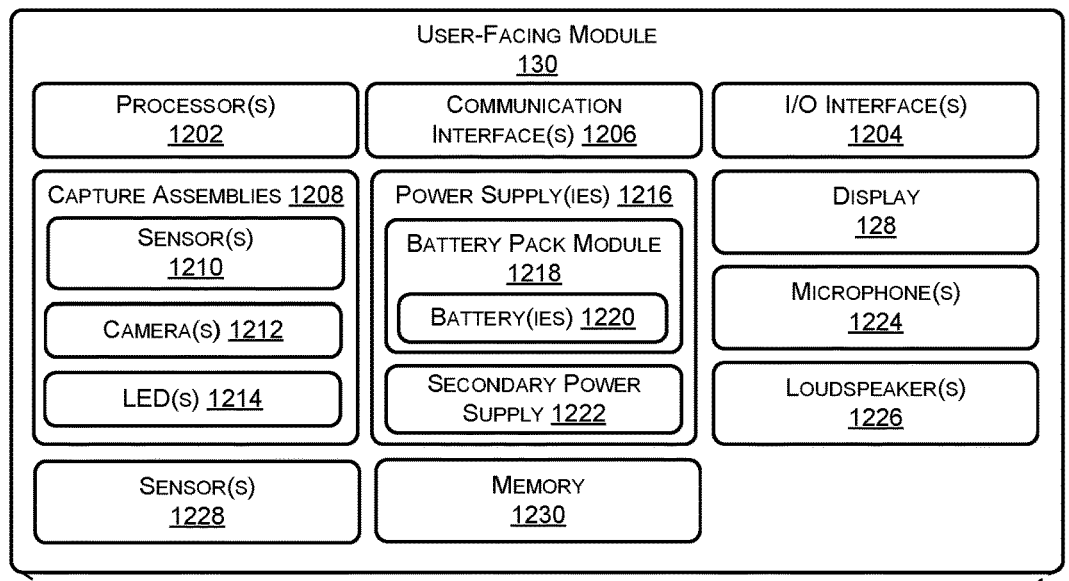
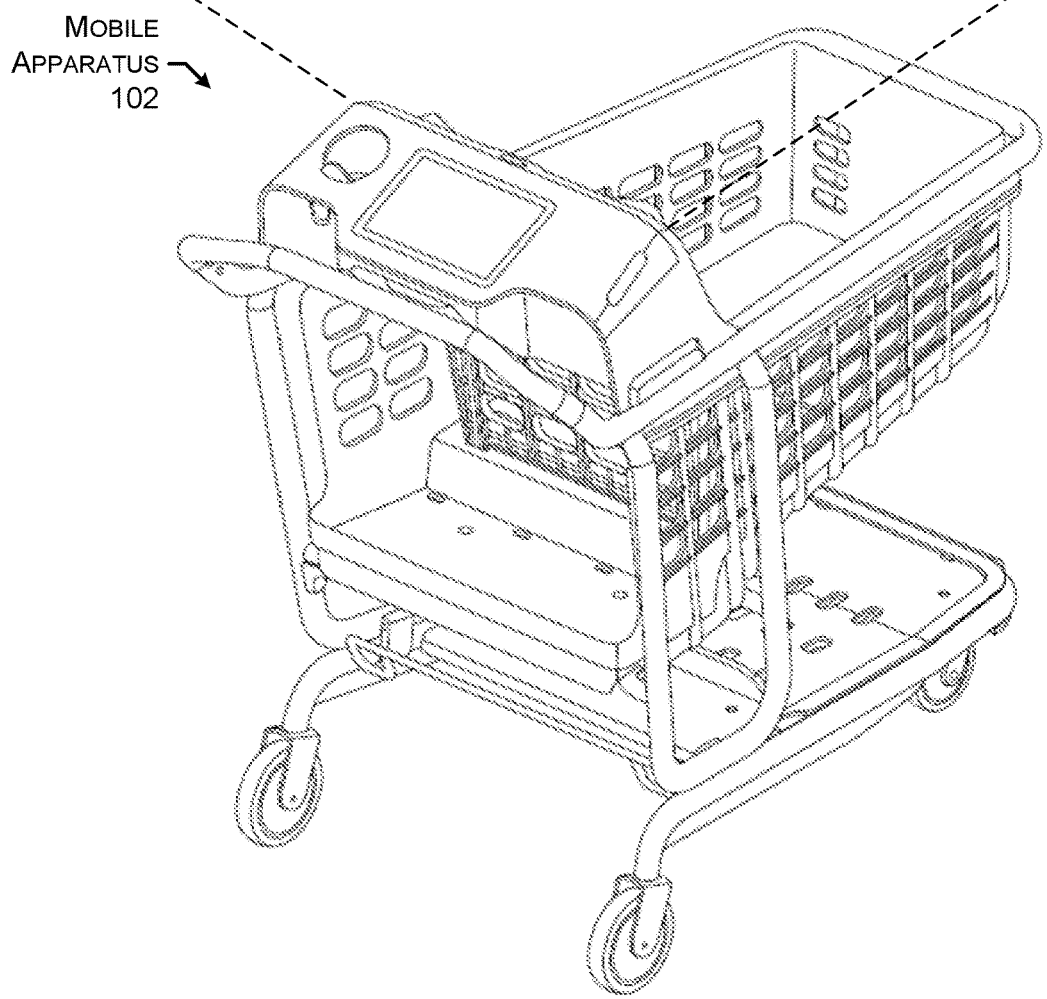
FIG. 12

ITEM IDENTIFYING MOBILE APPARATUS

BACKGROUND

Retail stores maintain an inventory of items in customer-accessible areas such that customers can pick items from the inventory for purchase, rental, and so forth. For example, a customer may take items from shelves located within the store and place the items in a shopping cart. When the customer is finished identifying and retrieving the items, the customer may transport the items, using the shopping cart, to a check-out destination within the store, such as a cashier or dedicated self-checkout stand. In some circumstances, the shopping cart may include sensors, such as cameras and weight sensors, that are configured to determine the items that are placed into the shopping cart by the customer. In these circumstances, the shopping cart may then update a list of items for the customer, display the list of items to the customer, and/or send the list of items to a system for processing of a transaction for the items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 12 illustrates an example of components of a user-facing module, in accordance with examples of the present disclosure.

DETAILED DESCRIPTION

Figure 1A:
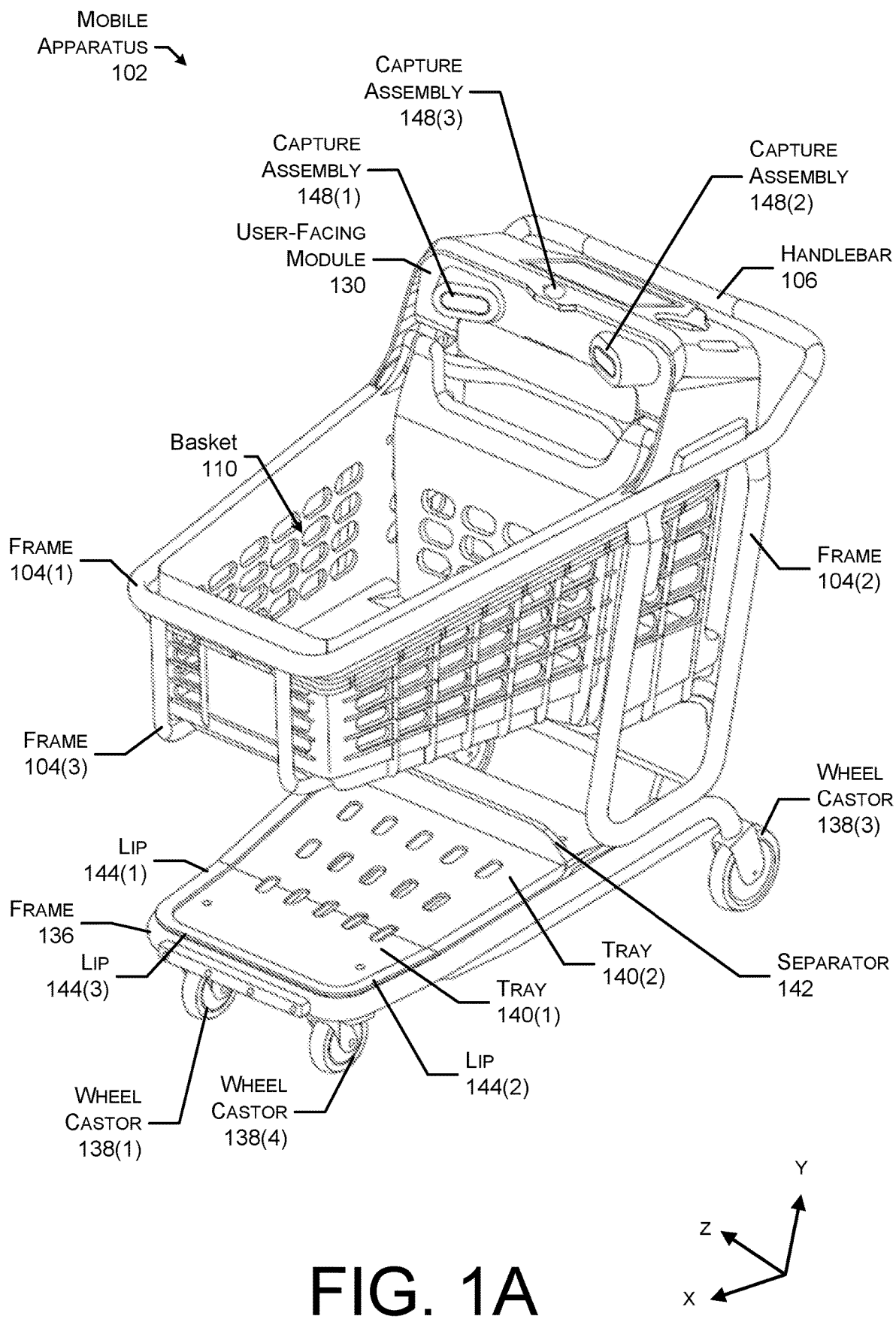
FIGS. 1A-1E illustrate an example of a mobile apparatus for identifying items, in accordance with examples of the present disclosure.

This disclosure describes, in part, mobile apparatuses that use sensors to detect items. For instance, a mobile apparatus, such as a shopping cart, may include at least a frame, a chassis that attaches to the frame, a basket that attaches to the chassis, weight sensor(s) disposed between the basket and the chassis, a tray that attaches to the frame, additional weight sensor(s) disposed beneath the tray, and a user-facing module that attaches to the frame. In some examples, the basket attaches to the chassis such that the basket does not contact the main frame during operation (e.g., there is an air gap around the perimeter of the basket and the main frame). The user-facing module may include at least a display, imaging device(s), and an opening for receiving a removable battery that provides power to the electrical components of the mobile apparatus. The mobile apparatus may be configured to use the weight sensor(s) to determine weights of items added to the mobile apparatus, use the imaging device(s) to both identify the items added to the mobile apparatus and determine a location of the mobile apparatus within a facility, use the display to provide information about the identified item(s), and/or send data representing the items to one or more computing devices.

For more detail, the mobile apparatus may include a frame (referred to, in some examples, as the "main frame" or an "upper frame") that includes, or supports, components of the mobile apparatus. For example, a top portion of the main frame may support at least the user-facing module while a bottom portion of the main frame supports at least a chassis. The chassis may include any shape, such as an "X" shape, a square, a circle, a triangle, and/or the like, and support one or more sensors of the mobile apparatus. For example, the chassis may include the "X" shape and support a weight sensor, where a first loadcell of the weight sensor is disposed proximate to a first end of the chassis, a second loadcell of the weight sensor is disposed proximate to a second end of the chassis, a third loadcell of the weight sensor is disposed proximate to a third end of the chassis, and a fourth loadcell of the weight sensor is disposed proximate to a fourth end of the chassis. While this example describes the chassis as supporting four loadcells of the weight sensor, in other examples, the chassis may support any number of loadcells of the weight sensor.

The chassis may further include, and/or support, the basket. The basket may include a bottom having a given shape (e.g., a quadrilateral shape, a circular shape, a triangular shape, etc.), one or more sides (e.g., three sides, four sides, etc.) protruding from the bottom to define a receptacle, and a top having a perimeter that defines an opening of the receptacle to receive items that are placed within the basket. In some examples, the sides of the basket may include a pattern that is configured to reduce flexing of the basket. For example, the sides of the basket may include a ribbed pattern, where the ribbed pattern is configured to reduce the flexing of the sides the basket when pressure is applied to the sides. In some examples, this pressure may be applied to the sides by items placed within the basket, such as when the items are contacting the sides of the basket. By reducing the flexing of the sides of the basket using such a pattern, the basket may maintain that air gap between the basket and the main frame.

In some examples, the basket, such as one of the sides of the basket, may include a gate that is configured to move between a first position (which may be referred to, in some examples, as a "closed position") and a second position (which may be referred to, in some examples, as an "open position"). In such examples, the bottom of the basket may include feature(s), such as groove(s), notch(es), channel(s), trench(es), and/or the like, that are configured to receive an additional feature(s), such as fastener(s), clasp(s), snap(s), extension(s), and/or the like of the gate when the gate is in the first position. For example, and as described in more detail below, the additional feature(s) of the gate may be configured to insert into the feature(s) of the basket such that that the gate cannot move laterally (e.g., to the sides) while in the first position. However, even when the gate is laterally secured to the basket, the gate may still be able to move from the first position to the second position, such as when a force is applied to a back of the basket (which is described in more detail below).

As described above, the basket attaches to the chassis such that the basket is prevented from contacting the main frame of the mobile apparatus. For example, the basket may be attached to the chassis such that there is an air gap between the perimeter of the basket and the top of the main frame when the mobile apparatus is being utilized by a user. This way, if the user contacts the main frame, such as to lean on the main frame to place an item within the receptacle of the basket, the weight of the user does not impact the weight sensor disposed on the chassis. In some examples, one or more fastener may be used to secure the basket to the chassis. As described herein, a fastener may include, but is not limited to, an expansion joint, a screw, a bolt, a mold, tape, a welding material, and/or any other mechanism that may be used to attach the basket to the chassis. For example, such as when the chassis includes the "X" shape, the one or more fasteners may include a first fastener (e.g., a first expansion joint) disposed proximate to a first end of the chassis, a second fastener (e.g., a second expansion joint) disposed proximate to a second end of the chassis, a third fastener (e.g., a third expansion joint) disposed proximate to a third end of the chassis, and a fourth fastener (e.g., a fourth expansion joint) disposed proximate to a fourth end of the chassis.

In some examples, one or more of the fasteners may be configured to align the basket onto the chassis in order to maintain the gap between the basket and the main frame. For example, the chassis may include opening(s), where fastener(s) (e.g., screw(s)) attach to the basket through the opening(s). In such an example, the opening(s) may be configured to allow for adjusting the location of the basket on the chassis in order to maintain the gap. For instance, the fastener(s) that pass through the opening(s) may be configured to move side-to-side within the opening(s) to adjust the location of the basket on the chassis. For example, the fastener(s) may be configured such that a user may loosen the fastener(s), adjust the location of the basket on the chassis to ensure that the gap remains between the basket and the main frame, and then tightened the fastener(s) in order to secure the basket at the location on the chassis. In some examples, the mobile apparatus includes a number of these fastener(s). The number may include, but is not limited to, one fastener, two fasteners, five fasteners, eight fasteners, ten fasteners, and/or any other number of fasteners.

In some examples, the mobile apparatus may include a bar that is configured to protect one or more components of the mobile apparatus, such as the user-facing module. For example, the bar may extend between at least a first side of the main frame to a second, opposite side of the main frame. As such, and in some examples, the bar may be configured to protect the user-facing module by preventing the gate from contacting the user-facing module when the gate moves between the first position and the second position. Additionally, in some examples, the bar may be configured to protect the user-facing module by preventing an additional basket of an additional mobile apparatus from contacting the user-facing module, such as when the mobile apparatuses are nested.

In some examples, the mobile apparatus may include one or more other components that help protect the connection between the basket and the chassis. For a first example, such as when the chassis includes the weight sensor with the loadcell(s), the mobile apparatus may include one or more first components that are located proximate to the loadcell(s), where the first component(s) operate as stops when a large force is applied downward on the basket (e.g., when a user leans onto the basket). The first component(s) may include raised area(s), such as protrusion(s), lip(s), flange(s), and/or the like. For a second example, the mobile apparatus may include one or more second components that operate to prevent horizontal movement of the basket with respect to the chassis. For instance, the second component(s) may include pin(s) that bottom out within hole(s) when there is a horizontal force applied to the basket. Still, for a third example, the mobile apparatus may include one or more third components that operate to prevent a separating (e.g., a lifting) of the basket from the chassis. While these are just a couple examples of component(s) that help protect the connection between the basket and the chassis, in other examples, the mobile apparatus may include additional and/or alternative components to help protect the connection between the basket and the chassis.

In some examples, the mobile apparatus may include another compartment, separate from the basket, for holding items. For example, the mobile apparatus may include a shelf that is coupled to and extends substantially horizontally from the basket. In such an example, the shelf may extend from a side of the basket that is closest to a user when the user is operating the mobile apparatus (e.g., a back side of the basket). The shelf may include a bottom having a given shape (e.g., a quadrilateral shape, a circular shape, a triangular shape, etc.), one or more sides (e.g., four sides, etc.) protruding from the bottom to define a receptacle, and a top having a perimeter that defines an opening of the receptacle to receive items that are placed within the shelf. In some examples, one or more of the sides of the shelf may include a portion of one or more of the sides of the basket. For example, the basket and the shelf may share the same left and right sides. Additionally, the gate of the basket may separate the receptacle of the basket from the receptacle of the shelf.

In some examples, the configuration of the basket may allow for an Electronic Alert Surveillance (EAS) system to still operate as intended when the mobile apparatus passes by the EAS system. The EAS system may include, but is not limited to, a radio frequency EAS system, an Electromagnetic EAS system, an acousto-magnetic EAS system, and/or any other type of EAS system. For example, the basket may be manufactured using a material, such as plastic, that does not interfere with the EAS system when the mobile apparatus passes by the EAS system. This way, security tags that are located on and/or in items placed within the basket may switch from a first state to a second state when the mobile apparatus passes by the EAS system. The first state may include an active state, where the security tags are configured to cause an alarm to activate when the security tags pass through a specific area of the facility. Additionally, the second state may include an inactive state, where the security tags are configured to no longer cause the alarm to activate when the security tags pass through the specific area of the facility.

For instance, antennas of the EAS system are configured to change the security tags from activate states to inactivate states by causing the security tags to no longer have the ability to transmit signals or fusing the security tags to prevent activation triggers. For a first example, and when the EAS system is a radio frequency EAS system, the antennas may be configured to output radio frequency (RF) signal(s) when activated, where the RF signal(s) are configured to cause the security tags to no longer transmit signals (e.g., change the security tags to inactive states). For instance, the RF signal(s) may be configured to destroy diodes and/or transmitting components included within the security tags. For a second example, and when the EAS system is a magnetic EAS system, the antennas may be configured to transmit fields (e.g., magnetic fields) when activated, where the fields are configured to deactivate the security tags by again causing the security tags to no longer transmit signals (e.g., change the security tags to inactivate states). While these are just a couple example techniques of how different EAS systems operate to deactivate security tags, in other examples, the electronic device may deactivate the security tags using one or more additional and/or alternative techniques.

As such, by including the configuration of the basket, the basket may still allow for the antennas to deactivate the security tags while the mobile apparatus passes in proximity to the EAS system. In other words, the basket may be configured such that the signals are able to pass through the basket and to the security tags associated with the items.

The mobile apparatus may further include the user-facing module that is coupled to the main frame. The user-facing module may include one or more imaging devices (e.g., camera(s)), sensors (e.g., scanner(s), proximity sensor(s), motion sensor(s), etc.), one or more lights, a display, and/or any other type of electronic device. The user-facing module may be configured to use the imaging device(s) to perform various functions. For a first example, the user-facing module may include imaging device(s) that are oriented towards the receptacle of the basket. In some examples, the user-facing module includes two imaging devices oriented towards the receptacle of the basket while, in other examples, the user-facing module may include any number of imaging devices oriented towards the receptacle of the basket. The mobile apparatus may thus use these imaging device(s) to identify items that are placed within the basket. For instance, the user-facing module may receive image data generated by these imaging device(s), where the image data represents at least an item that is being placed within the basket by a user and/or an item that has already been placed within the basket. The user-facing module may then analyze the image data, using one or more of the processes described herein, to identify the item.

For a second example, the user-facing module may include imaging device(s) that are oriented towards the receptacle of the shelf. In some examples, the user-facing module includes one imaging device oriented towards the receptacle of the shelf while, in other examples, the user-facing module may include any number of imaging devices oriented towards the receptacle of the shelf. The mobile apparatus may thus use these imaging device(s) to identify items that are placed within the shelf. For instance, the user-facing module may receive image data generated by these imaging device(s), where the image data represents at least an item that is being placed within the shelf by a user and/or an item that has already been placed within the shelf. The user-facing module may then analyze the image data, using one or more of the processes described herein, to identify the item.

For a third example, the user-facing module may include imaging device(s) oriented substantially perpendicular with respect to a ground plane (e.g., oriented towards a ceiling of the facility). In some examples, the user-facing module includes one imaging device oriented substantially perpendicular with respect to the ground plane while, in other examples, the user-facing module includes any number of imaging devices orientated substantially perpendicular with respect to the ground plane. The mobile apparatus may then use these imaging device(s) to determine a location of the mobile apparatus within the facility. For instance, the user-facing module may receive image data generated by these imaging device(s), where the image data represents a portion of the facility (e.g., the ceiling of the facility). The user-facing module may then analyze the image data, using one or more of the processes described herein, in order to determine the location of the mobile apparatus within the facility.

Additionally, the user-facing module may include an opening for receiving the removable battery that provides power to the electrical components of the mobile apparatus. In some examples, the mobile apparatus may include a rail system that guides the battery into the opening when installing the battery into the mobile apparatus and/or guides the battery out of the opening when removing the battery from the mobile apparatus. For example, the opening may include a first rail feature that is configured to "slide into" a second rail feature of the battery when an associate is inserting the battery into the opening and/or removing the battery from the opening. In some examples, the rail system guides the battery using an angle such that the battery may be removed from and/or inserted into the mobile apparatus even when the mobile apparatus is "nested" with other mobile apparatus(es).

In some examples, the opening may further include a latching system, such as prong(s) and/or spring-loaded ram(s), that insert into one or more cavities of the battery when the battery is inserted into the opening. This way, the latching system may be configured to both secure the battery within the opening (e.g., lock the battery in place) and offload impact forces directly to the housing of the user-facing module. In some examples, such as when the latching system includes the prong(s), the battery may be unlatched using a key that is inserted into another opening. For example, the key may be configured to access lifter(s) associated with the prong(s) in order to release the battery such that the battery may be removed from the opening of the user-facing module. In examples where the mobile apparatus includes the key, the mobile apparatus may further include security features(s), such as pin(s), that are designed to only allow access to the key for unlatching the battery. For example, if a user of the mobile apparatus attempts to use a different type of apparatus to unlatch the battery, the pin(s) may be configured to prevent the apparatus from accessing the lifter(s) of the prong(s).

The main frame of the mobile apparatus may be connected to a wheel frame that includes components for providing mobility to the mobile apparatus. For instance, the wheel frame may support one or more wheel castors to enable movement of the mobile apparatus along a surface. The wheel casters may include one or more wheels, axles, forks, joints or other components which enable the mobile apparatus to travel on various surfaces. For instance, in some examples, each of the wheel casters may include a single wheel provided on an axle within a fork, or two or more wheels provided on such an axle. In some other examples, the wheel casters may include two or more axles. Alternatively, in still other examples, a single caster may be provided in lieu of the multiple wheel casters.

The wheel frame may include, and/or support, a tray. In some examples, the tray may be attached to the wheel apparatus using one or more plates. The tray may include a bottom having a given shape (e.g., a quadrilateral shape, a circular shape, a triangular shape, etc.). In some examples, the tray may further include a separator that separate a portion of the tray (e.g., a front portion of the tray) that is configured to receive items from a second portion of the tray (e.g., a back portion of the tray) that is configured to cover one or more components of the mobile apparatus. Additionally, one or more weight sensors may be disposed between a bottom of the tray and the plates that attach the tray to the wheel frame. In some examples, the weight sensor(s) may include a first loadcell of a weight sensor that is disposed between a first side of a first plate and a first portion (e.g., a front-right portion) of the tray, a second loadcell of the weight sensor that is disposed between a second side of the first plate and a second portion (e.g., a front-left portion) of the tray, a third loadcell of the weight sensor that is disposed between a first side of a second plate and a third portion (e.g., a back-right portion) of the tray, and a fourth loadcell of the weight sensor that is disposed between a second side of the second plate and a fourth portion (e.g., a back-left portion) of the tray. While this example describes four loadcells of the weight sensor, in other examples, the weight sensor may include any number of loadcells disposed at any location beneath the tray.

In some examples, the tray is configured in order to prevent items that are placed on the tray from contacting other components of the mobile apparatus, such as the wheel frame and/or the main frame. For example, the tray may attach to the wheel frame, such as using the plate(s), in order to prevent the tray from contacting the wheel frame of the mobile apparatus. For instance, the tray may be attached to the wheel frame such that there is an air gap between the perimeter of the tray and the wheel frame when the mobile apparatus is being utilized by a user. Additionally, the tray may include one or more lips that extend from the sides of the tray and over the wheel frame. This way, when items are placed on the tray, the items are prevented from contacting the wheel frame. Furthermore, the tray may include a first portion (e.g., a back portion) that is angled with respect to a ground plane and a second portion (e.g., a front portion) that is substantially parallel with respect to the ground plane. This way, the items are pushed to a front of the tray in order to prevent the items from contacting the main frame of the mobile apparatus. By including all such as configuration, the weight sensor(s) associated with the tray may measure an entirety of the items that are placed on the tray, which increases the accuracy of the weight sensors.

In some examples, the mobile apparatus (e.g., the user-facing module) may be configured to determine characteristics associated with the items that are added to the mobile apparatus (e.g., placed within the receptacle of the basket, placed within the receptacle of the shelf, placed on the tray, etc.) using the weight sensors. For a first example, the mobile apparatus may use the weight sensor(s) that are associated with the chassis in order to determine the weight of an item that is placed within the receptacle of the basket and/or within the receptacle of the shelf. When the weight sensor(s) include four loadcells, the mobile apparatus may determine the weight using data received from each of the loadcells. For instance, the mobile apparatus may use the data to determine a respective weight measured by each of the loadcells and then determine the total weight using the measured weights (e.g., determine the total weight by adding the measured weights together). Additionally, to determine the weight of the item placed within the basket, the mobile apparatus may determine the weight as a difference between a first weight measured before the item was placed within the receptacle and a second weight measured after the item is placed within the receptacle. In some examples, the mobile apparatus may then be configured to determine an identity of the item, a price of the item that is based on the weight, and/or any other characteristic associated with the item.

For a second example, and similar to the weight sensor of the basket, the mobile apparatus may use the weight sensor(s) that are associated with the tray in order to determine the weight of an item that is place on the tray. When the weight sensor(s) includes multiple loadcells, the mobile apparatus may determine the weight using data received from each of the loadcells. For instance, the mobile apparatus may use the data to determine a respective weight measured by each of the loadcells and then determine the total weight using the measured weights (e.g., determine the total weight by adding the measured weights together). Additionally, to determine the weight of the item placed on the tray, the mobile apparatus may determine the weight as a difference between a first weight measured before the item was placed on the tray and a second weight measured after the item is placed on the tray. In some examples, the mobile apparatus may then be configured to determine an identity of the item, a price of the item that is based on the weight, and/or any other characteristic associated with the item.

The mobile apparatus may then be configured to update a virtual shopping cart for a user, where the virtual shopping cart represents the item(s) that have been placed within the receptacle(s), item(s) that have been placed on the tray, weight(s) of the item(s), price(s) of the item(s), and/or any other information. Additionally, the mobile apparatus may be configured to use the display associated with the user-facing module to present the information to the user. This way, the user is provided with the most updated information associated with the shopping session while the user continues to place new items in the mobile apparatus.

By configuring the mobile apparatus such that the basket is attached to the chassis and prevented from contacting the main frame, the weight sensor(s) located between the basket and the chassis may be configured to only measure the weight of item(s) placed within the receptacle(s) of the mobile apparatus. For example, if a user contacts the main frame during operation of the mobile apparatus, such as by leaning on the main frame or pulling on the main frame, the force from the user may not be transferred from the main frame and to the basket. As such, the weight sensor(s) may not measure the force that is applied to the main frame by the user. This may help increase the accuracy of the mobile apparatus when using the weight to identify the characteristic(s) of the item(s) placed within the receptacle(s).

Additionally, by configuring the mobile apparatus such that the tray is prevented from contacting the wheel frame, the weight sensor(s) located between the tray and the plate(s) may be configured to only measure the weight of item(s) placed on the tray of the mobile apparatus. For example, if a user places an item on the tray, where the item extends off one or more edges of the tray, the item will still not contact the wheel frame of the mobile apparatus because of the lips. As such, an entirety of the weight of the item may be placed on the tray such that the weight sensor(s) of the tray measure the entirety of the weight. This may help increase the accuracy of the mobile apparatus when using the weight to identify the characteristic(s) of the item(s) placed on the tray.

FIGS. 1A-1E illustrate an example of a mobile apparatus 102 for identifying items, in accordance with examples of the present disclosure. The mobile apparatus 102 may include a main frame 104(1)-(4) (also referred to as a "main frame 104"). As shown, the main frame 102 may include at least a top portion 104(1), side portions 104(2), a front portion 104(3), and a bottom portion 104(4) (illustrated at least in FIGS. 4A-4B). The top portion of the main frame 104(1) may also include a handlebar 106 that a user uses to push the mobile apparatus 102. The main frame 104 may be made of plastic, wood, metal, composites, or any other material and/or combinations of materials. As shown, the main frame 104 may include, and/or support, the other components of the mobile apparatus 102.

For example, the main frame 104 (e.g., the bottom portion 104(4)) may support a chassis 108. As shown in more detail with regard to FIGS. 4A-4B, the chassis 108 may include any shape, such as an "X" shape, a square, a circle, a triangle, and/or the like, and support one or more sensors of the mobile apparatus 102. For example, the chassis 108 may include the "X" shape that supports a weight sensor, where a first loadcell of the weight sensor is disposed proximate to a first end of the chassis, a second loadcell of the weight sensor is disposed proximate to a second end of the chassis, a third loadcell of the weight sensor is disposed proximate to a third end of the chassis, and a fourth loadcell of the weight sensor is disposed proximate to a fourth end of the chassis. While this example describes the weight sensor as include four loadcells, in other examples, the chassis 108 may include any number of loadcells. Additionally, the chassis 108 may be made of plastic, wood, metal, composites, or any other material and/or combinations of materials.

Figure 1B:
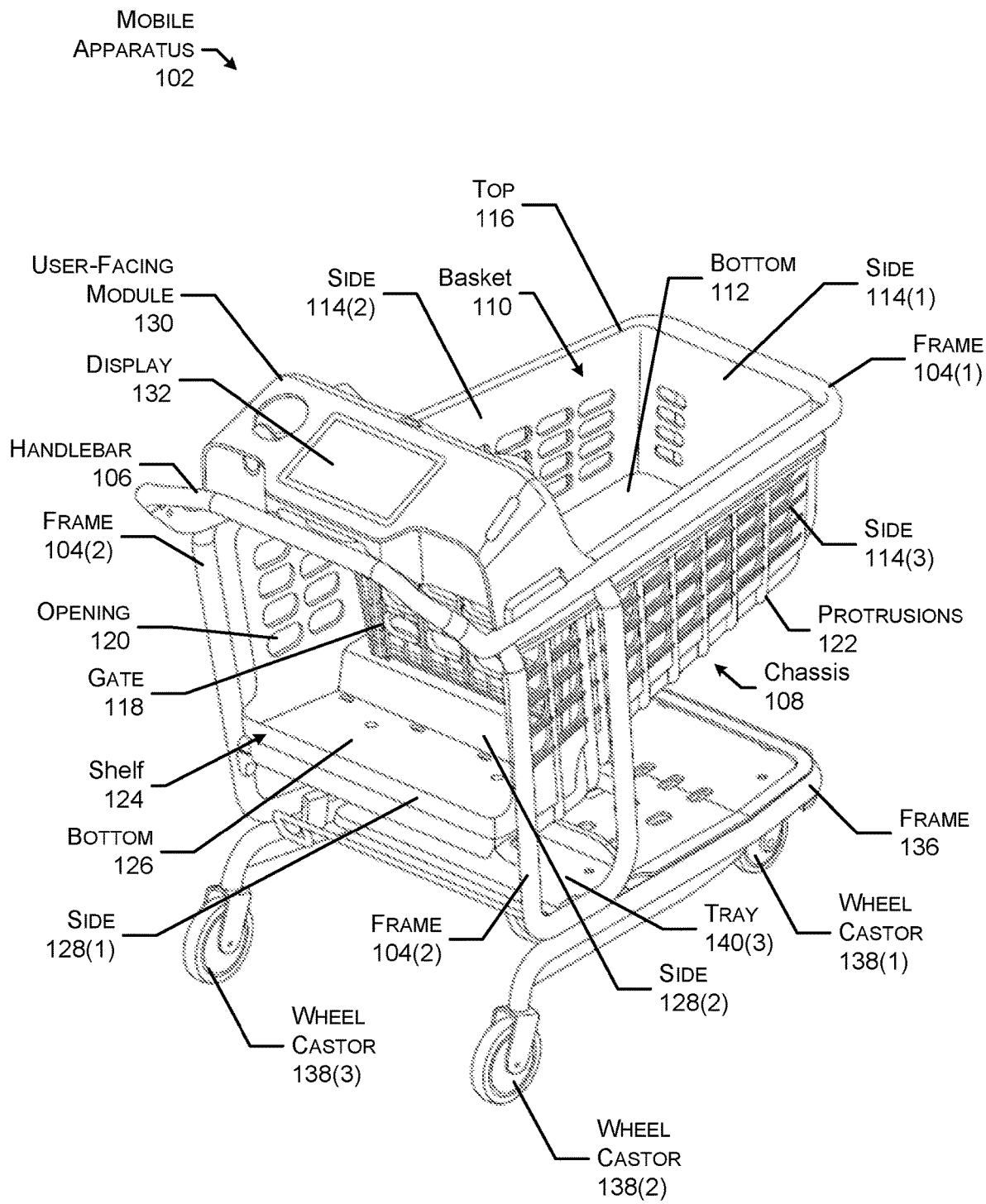

The chassis 108 may further include, and/or support, a basket 110. The basket 110 may comprise a bottom 112 having a given shape (e.g., a quadrilateral shape, a circular shape, a triangular shape, etc.), sides 114(1)-(3) (also referred to as "sides 114") protruding from the bottom 112 to define a receptacle, and a top 116 having a perimeter that defines an opening of the receptacle to receive items that are placed within the basket 110. In the example of FIGS. 1A-1B, the sides 114 of the basket 110 (as well as a gate 118 described below) include a ribbed pattern. As shown, the ribbed pattern may include openings 120 (although only one is labeled for clarity reasons) that are rectangular in shape, but with circular ends. However, in other examples, the openings may include any other shape. The sides of the basket 110 further include protrusions 122 (although only one is labeled for clarity reasons) that extend from the bottom 112 of the basket 110 to the top 116 of the basket 110 and/or laterally along the sides 114 of the basket 110.

In some examples, and as described in more detail here, the openings 120 and/or the protrusions 122 are configured to strengthen the basket 110, while also maintaining an overall lightweight design for the basket 110. For example, the openings 120 and/or the protrusions 122 may be configured to reduce the flexing that occurs to the sides 114 (as well as the gate 118) when forces are applied. For instance, when a user places an item within the basket 110 such that the item is pressed against a side 114(2) of the basket 110 (e.g., the item is leaning on the side 114(2)), the openings 120 and/or the protrusion 122 may be designed to reduce the flexing that occurs with respect to the side 114(2) such that the side 114(2) does not contact the main frame 104(1). This may maintain the are gap between the basket 110 and the main frame 104(1).

In some examples, the openings 120 may be configured to reduce the overall weight of the basket 110 while the protrusion 122 may be configured to provide additional strength to the basket 110. For example, by including the opening 120, the basket 110 may require less material, which will reduce the overall weight of the basket 110. However, this reducing of the overall weight of the basket 110 may initially also reduce the strength of the basket 110. As such, the protrusion 122 may be configured to provide extra material in order to again increase the strength of the basket 110. Additionally, the design of the protrusions 122, which are again both horizontally and vertically aligned along the sides 114 of the basket 110, may provide for the greatest increase in the strength for the basket 110. As such, by including both the openings 120 and the protrusions 122, the overall weight of the basket 110 is reduced while the overall strength of the basket 110 is still increased.

Additionally, the basket 110 also includes a gate 118 that is configured to move between the first position, which is illustrated in the example of FIGS. 1A-1E, and the second position, such as an open position. As shown, the gate 118 is attached to both a top of the side 114(2) and a top of the side 114(3) of the basket 110 such that the gate 118 is able to move between the different positions. As will be illustrated and discussed more with regard to FIG. 2, the bottom 112 of the basket 110 may include feature(s), such as groove(s), notch(es), channel(s), trench(es), and/or the like, that are configured to receive an additional feature(s), such as fastener(s), clasp(s), snap(s), extension(s), and/or the like of the gate 118 when the gate 118 is in the first position. As described herein, the features of the gate 118 and the basket 110 may be configured to prevent lateral movement (e.g., sideways movement towards the side 114(2) and the side 114(3) of the gate 118 when the gate 118 is in the first position. However, even with the features, the gate 118 is still able to move between the first position and the second position.

The mobile apparatus 102 may also include a shelf 124 that is coupled to and extends substantially horizontally from the basket 110. For example, the shelf 124 may extend at a 0-degree horizontal angle, a 10-degree horizontal angle, a 20-horizontal degree angle, and/or any other horizontal angle from the bottom 112 of the basket 110. As shown, the shelf 124 extends from a side of the basket 110 that is closest to a user when the user is operating the mobile apparatus 102 (e.g., a backside of the basket 110). The shelf 124 may include a bottom 126 having a given shape (e.g., a quadrilateral shape, a circular shape, a triangular shape, etc.), the sides 114(2)-(3) protruding from the bottom 126, and sides 128(1)-(2) (also referred to as "sides 128") protruding from the bottom 126. The bottom 126, the sides 114(2)-(3), and the sides 128 define a receptacle, where a top of the receptacle has a perimeter that defines an opening of the receptacle to receive items that are placed within the shelf 124. As shown, first portions of the sides 114(2)-(3) may operate as the sides of the basket 110 while second portions of the sides 114(2)-(3) operate as the sides of the shelf 124. Additionally, the gate 118 may separate the shelf 124 from the basket 110.

The shelf 124 may be made of plastic, wood, metal, composites, or any other material and/or combinations of materials. In some examples, the shelf 124 is made of the same material as the basket 110 while, in other examples, the shelf 124 is made of a different material than the basket 110.

The mobile apparatus 102 may further include a user-facing module 130 that is coupled to the main frame 104. The user-facing module 130 may include one or more imaging device(s) (e.g., camera(s)), one or more sensors (e.g., scanner(s), proximity sensor(s), motion sensor(s), etc.), one or more lights, a display 132, and/or any other type of electronic device. Additionally, and as discussed in more detail with regard to FIGS. 6-11, the user-facing module 130 may include an opening for receiving a removable battery that provides power to the electrical components of the mobile apparatus 102.

Figure 1C:
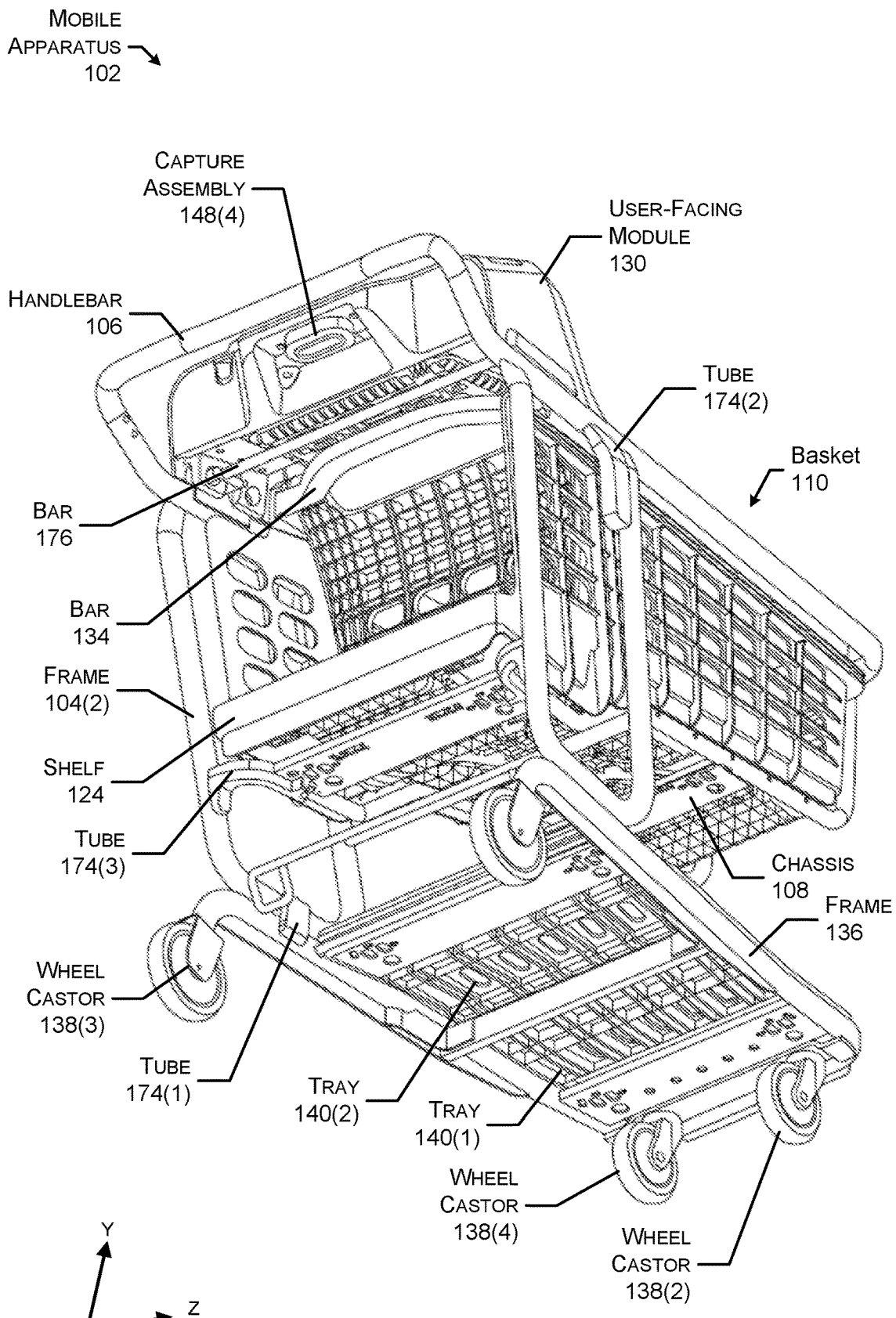

In some examples, the mobile apparatus 102 may include a bar 134 that is configured to protect one or more components of the mobile apparatus 102, such as the user-facing module 130. For instance, and as illustrated by the example of FIGS. 1A-1C, the bar 134 may extend between at least the side portions 104(2) of the main frame 104. As such, and in some examples, the bar 134 may be configured to protect the user-facing module 130 by preventing the gate 118 from contacting the user-facing module 130 when the gate 118 moves between the first position and the second position. Additionally, in some examples, the bar 134 may be configured to protect the user-facing module 130 by preventing an additional basket of an additional mobile apparatus from contacting the user-facing module 130, such as when the mobile apparatuses are nested.

In some examples, the bar 134 may also be configured to help maintain a position of the gate 118 when the gate 118 is in the first position, which is illustrated by the example of FIGS. 1A-1C. For instance, the bar 134 may act as an upper support, while the feature(s) at the bottom of the gate 118 (which are illustrated in FIG. 3) act as bottom supports, when the gate 118 is in the first position. This may provide more stiffness for the gate 118, which may help protect the basket 112 from contacting the main frame 104 when forces are applied to the basket 112.

The main frame 104 of the mobile apparatus 102 may be connected to a wheel frame 136 that includes components for providing mobility to the mobile apparatus 102. For instance, the wheel frame 136 may support wheel castors 138(1)-(4) (also referred to as "wheel castors 138") to enable movement of the mobile apparatus 102 along a surface. The wheel casters 138 may include wheels, axles, forks, joints or other components which enable the mobile apparatus 102 to travel on various surfaces. For instance, in some examples each of the wheel casters 138 may include a single wheel provided on an axle within a fork, or two or more wheels provided on such an axle. In some other examples, the wheel casters 138 may include two or more axles. Alternatively, in still other examples, a single caster 138 may be provided in lieu of the multiple wheel casters 138.

As further illustrated in the example of FIGS. 1A-1E, the mobile apparatus 102 may include a tray 140(1)-(3) (also referred to as a "tray 140"). In some examples, and as illustrated in more detail with regard to FIGS. 3A-3B, the tray 140 may be attached to the wheel apparatus using one or more plates. The tray 140 may include a bottom having a given shape (e.g., a quadrilateral shape, a circular shape, a triangular shape, etc.). In some examples, the tray 140 may further include a separator 142 that separates portions 140(1)-(2) of the tray 140 that are configured to receive items from a portion 140(3) of the tray 140 that is not configured to receive items. Additionally, one or more weight sensors may be disposed between a bottom of the tray 140 and the plates that attach the tray 140 to the wheel frame 136. In some examples, the weight sensor(s) may include a first loadcell of a weight sensor that is disposed between a first side of a first plate and a first portion (e.g., a front-right portion) of the tray 140, a second loadcell of the weight sensor that is disposed between a second side of the first plate and a second portion (e.g., a front-left portion) of the tray 140, a third loadcell of the weight sensor that is disposed between a first side of a second plate and a third portion (e.g., a back-right portion) of the tray 140, and a fourth loadcell of the weight sensor that is disposed between a second side of the second plate and a fourth portion (e.g., a back-left portion) of the tray 140. While this example describes four loadcells of the weight sensor, in other examples, the weight sensor may include any number of loadcells disposed at any location beneath the tray 140.

As described herein, the tray 140 is configured in order to prevent items that are placed on the tray 140 from contacting other components of the mobile apparatus 102, such as the wheel frame 136 and/or the main frame 104. For example, the tray 140 may attach to the wheel frame 136, such as using the plate(s) (illustrated in FIG. 3A), in order to prevent the tray 140 from contacting the wheel frame 136 of the mobile apparatus 102. For instance, the tray 140 may be attached to the wheel frame 136 such that there is an air gap between the perimeter of the tray 140 and the wheel frame 136 when the mobile apparatus 102 is being utilized by a user. Additionally, the tray 140 may include one or more lips 144(1)-(3) (also referred to as "lips 144") that extend from the sides of the first and second portions of the tray 140(1)-(2) and over the wheel frame 136. This way, when items are placed on the tray 140, the items are prevented from contacting the wheel frame 136.

Figure 1D:
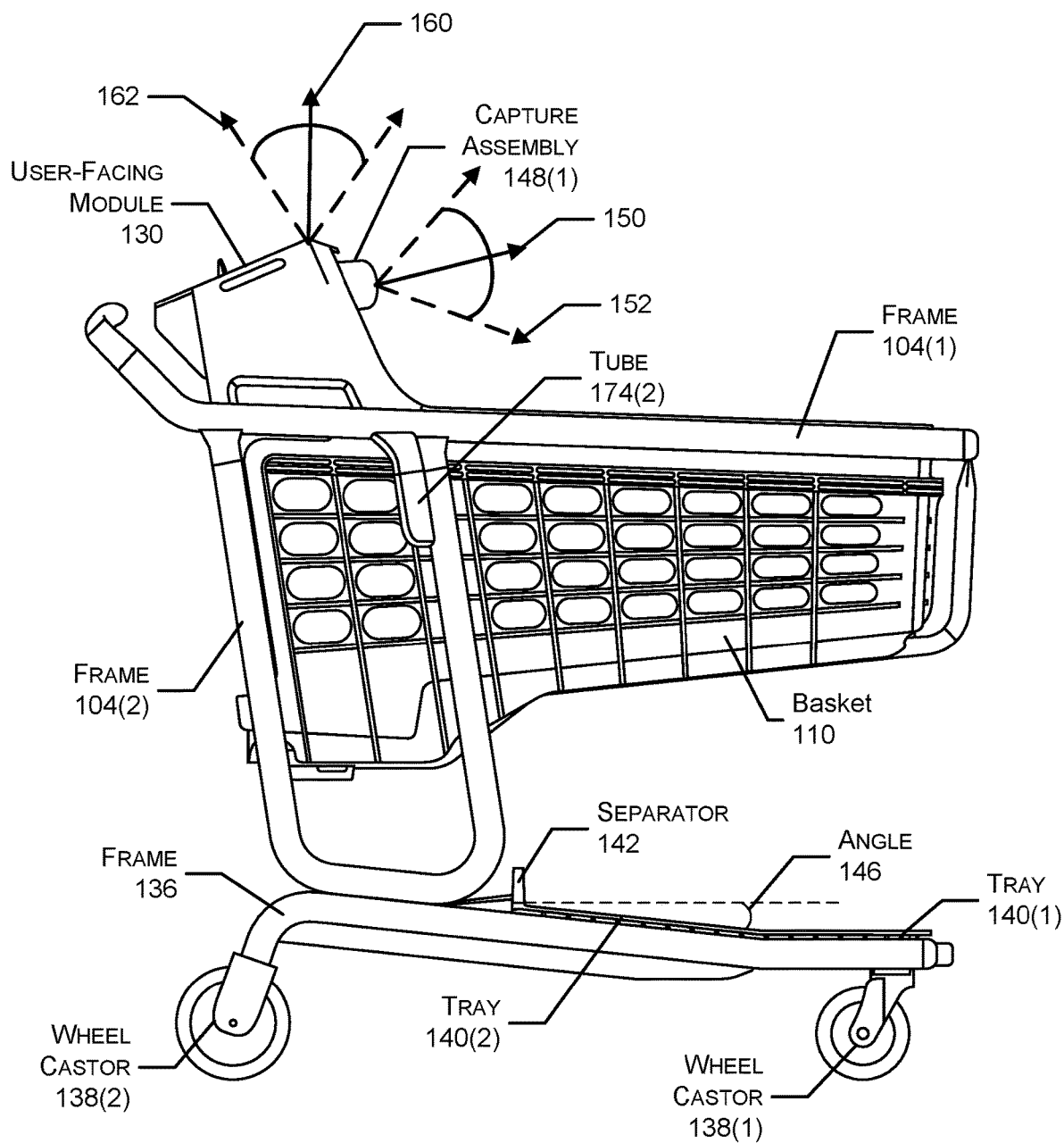
Figure 1E:
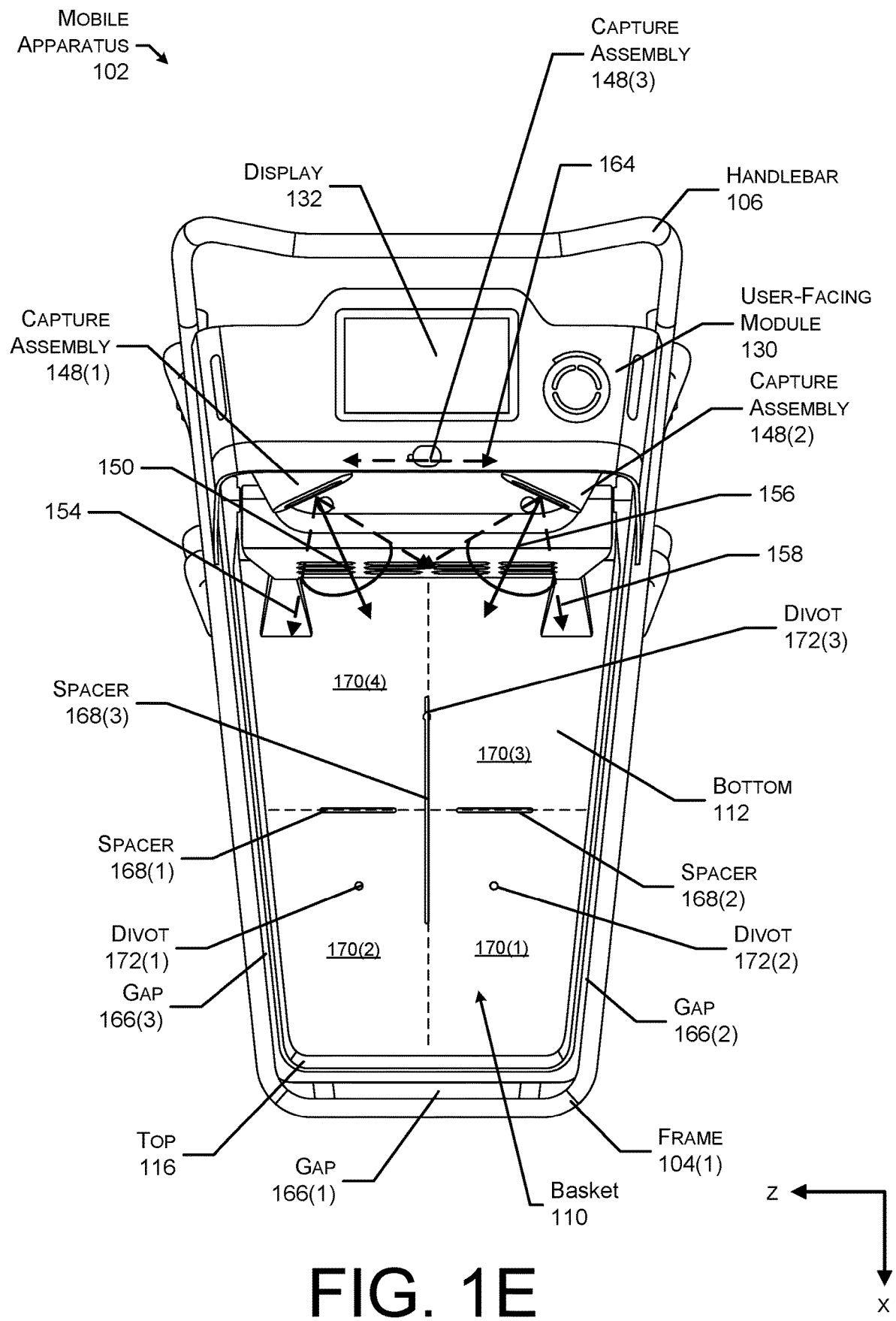

Furthermore, and shown in detail in FIG. 1D, the first portion of the tray 140(1) may be substantially parallel with respect to a ground plane (e.g., substantially flat) while the second portion of the tray 140(2) includes an angle 146. The angle 146 may include, but is not limited to, 1 degree, 3 degrees, 6 degrees, 10 degrees, and/or any other angle. In some examples, the tray 140 includes the angle 146 so that items placed on the tray 140 remain towards a front of the tray 140 (e.g., towards the first portion of the tray 140(1)). Additionally, the separator 142 may be at a location of the tray 140 that prevents the items from contacting the frame 104 of the mobile apparatus 102. In some examples, the separator 142 may be perpendicular with respect to the second portion of the tray 140(2) to also ensure that the items remain towards the front of the tray 140.

As described above, the user-facing module 130 may include one or more imaging devices. For example, and as shown in FIGS. 1A-1E, the mobile apparatus 102 may include at least four capture assemblies 148(1)-(4) (also referred to as "capture assemblies 148"). In some examples, one or more of the components of the capture assemblies 148 may be disposed internal to the form factor of the user-facing module 130, at least partially internal to the form factor of the user-facing module 130, and/or entirely external to the form factor of the user-facing module 10. In the examples of FIGS. 1A-1E, the user-facing module 130 includes at least two capture assemblies 148(1)-(2) located proximate to the front of the user-facing module 130 (e.g., towards the basket 110), a capture assembly 148(3) located proximate to a top of the user-facing module 130, and a capture assembly 148(4) located proximate to a back-bottom portion of the user-facing module 130. Generally, the capture assemblies 148 may each include at least one imaging device, one light source (e.g., LED), and/or one proximity sensor (e.g., ToF sensor, PIR sensor, etc.). For instance, each of the capture assemblies 148 may include a printed circuit board to which each of the imaging device, LED, and proximity sensor are coupled.

The capture assembly 148(1) is positioned at a front-right portion of the user-facing module 130. The capture assembly 148(1) may have an optical axis 150, a field-of-view (FOV) 152 oriented in the x-y plane, and FOV 154 oriented in the x-z plane. The optical axis 150 of the capture assembly 148(1) may be directed upward from a substantially horizontal plane and towards an interior of a perimeter of the basket 110. In some examples, a FOV of the capture assembly 148(1) may be defined according to the optical axis 150 (e.g., the optical axis 150 may be approximately the middle of the FOV 152 and/or the FOV 154). The FOV 152 and/or the FOV 154 may be any FOV for cameras, such as, but not limited to, 45 degrees, degrees, 100 degrees, 120 degrees, and/or the like. Generally, the FOV 152 and the FOV 154 at least partially include an area above a top of the basket 110 and/or at least partially within the receptacle of the basket 110.

The capture assembly 148(2) is positioned at a front-left portion of the user-facing module 130. The capture assembly 148(2) may have an optical axis 156, a FOV oriented in the x-y plane that is similar to the FOV 152 of the capture assembly 148(1), and FOV 158 oriented in the x-z plane. The optical axis 156 of the capture assembly 148(2) may be directed upward from a substantially horizontal plane and towards an interior of a perimeter of the basket 110. In some examples, a FOV of the capture assembly 148(2) may be defined according to the optical axis 156 (e.g., the optical axis 156 may be approximately the middle FOVs). The FOVs may be any FOV for cameras, such as, but not limited to, 45 degrees, 70 degrees, 100 degrees, 120 degrees, and/or the like. Generally, the FOVs at least partially include an area above a top of the basket 110 and/or at least partially within the receptacle of the basket 110.

The capture assembly 148(3) is positioned at a top portion of the user-facing module 130. The capture assembly 148(3) may have an optical axis 160, a FOV 162 oriented in the x-y plane, and FOV 164 oriented in the x-z plane. The optical axis 160 of the capture assembly 148(3) may be directed substantially perpendicular to a ground plane (e.g., substantially in the vertical plane). In some examples, a FOV of the capture assembly 148(3) may be defined according to the optical axis 160 (e.g., the optical axis 160 may be approximately the middle FOVs). The FOV 162 and/or the FOV 164 may be any FOV for cameras, such as, but not limited to, 45 degrees, 70 degrees, 100 degrees, 120 degrees, and/or the like. Generally, the FOV 162 and/or the FOV 164 at least partially include an area above a top the mobile apparatus 102, such as towards a ceiling of a facility.

The FOV of the capture assembly 148(4) is described in more detail with respect to 4A.

As further illustrated in the example of FIGS. 1A-1E, the basket 110 is separated from the main frame 104 by gaps 166(1)-(3) (also referred to as "gaps 166"). For example, at least the first side 114(1) is separated from the main frame 104 by the gap 166(1), the second side 114(2) is separates from the main frame 104 by the gap 166(2), and the third side 114(3) is separated from the main frame 104 by the gap 166(3). As described herein, a respective gap 166 may include, but is not limited to, 0.5 inches, 1 inch, 2 inches, and/or any other distance. As will be described in more detail below, the basket 110 may be separated from the main frame 104 in order to prevent the weight sensor(s) from measuring the weight of objects, such as the user, that contact the main frame 104 during normal operation of the mobile apparatus 102.

The bottom 112 of the basket 110 may include spacers 168(1)-(3) (also referred to as "spacers 168"). In some examples, the spacers 168 include marking (e.g., stickers, colors, etc.) that are configured to indicate to a user where to place item carriers, such as bags, within the basket 110. For instance, the spacers 168 may indicate that a first item carrier is to be placed at a front-left portion 170(1) of the basket 110, a second item carrier is to be placed at a front-right portion 170(2) of the basket 110, a third item carrier is to be placed at a back-left portion 170(3) of the basket 110, and/or a fourth item carrier is to be placed at a back-right portion 170(4) of the basket 110. Additionally, or alternatively, in some examples, the spacer 168 may include components, such as grooves or protrusions, that help secure the item carriers within the basket 110. For instance, the spacers 168 may secure a first item carrier at the front-left portion 170(1) of the basket 110, secure a second item carrier at the front-right portion 170(2) of the basket 110, secure a third item carrier at the back-left portion 170(3) of the basket 110, and/or secure a fourth item carrier at the back-right portion 170(4) of the basket 110. While the example of FIGS. 1A-1E only illustrates three spacers 168 that separate the basket 110 into four different portions 170(1)-(4), in other examples, the basket 110 may include any number of spacers 168 that separate the basket 110 into any number of portions.

In some examples, the bottom 112 of the basket 110 may further include divots 172(1)-(3) (also referred to as "divots 172") that are used when calibrating and/or testing the weight sensor(s) of the mobile apparatus 102. For instance, when calibrating and/or testing the weight sensor(s), physical weight(s) may be placed on the divots. The weight sensor(s) may then generate sensor data representing the total weight within the basket 110. The mobile apparatus 102 may then be calibrated and/or tested using the total weight of the physical weight(s) placed within the basket 110 and the total weight of the weight measured by the weight sensor(s).

As further illustrated in the example of FIGS. 1A-1E, the mobile apparatus 102 may include one or more tubes 174(1)-(3) (also referred to as "tubes 174"). The mobile apparatus 102 may include the tubes 174 in order to protect the internal connections between the user-facing module 130 and the weight sensors. For example, the weight sensor(s) associated with the tray 140 may include a wired connection with the user-facing module 130, where the wires extend from the weight sensor(s), through the wheel frame 136, through the tube 174(1) (and similarly another tube on the other side of the wheel frame 136), up through the side portion of the main frame 104(2), and then to the user-facing module 130. Additionally, at least a portion of the weight sensor(s) associate with the basket 110 may include a wired connection with the user-facing module 130, where the wires extend from the weight sensor(s), through the tube 174(3) (and/or similar tube), through the frame 104(2), and finally to the user-facing module 130. Furthermore, at least a portion of the weight sensor(s) associated with the basket 110 may also include a wired connection with the user-facing module 130, where the wires extend from the weight sensor(s), through the frame 140(2), through the tube 174(2) (and/or similar tube), and finally to the user-facing module 130.

As further illustrated in the example of FIGS. 1A-1E, the mobile apparatus 102 may include an additional bar 176 that the mobile apparatus 102 uses to protect the user-facing module 130. More specifically, when the mobile apparatus 102 is nested with other mobile apparatuses, the bar 176 may be configured to protect the user-facing module 130 from being contacted by a component of another mobile apparatus, such as the basket and/or the gate. For instance, when the gate of the other mobile apparatus moves from the first position to the second position, in which the gate swings upward, the bar 176 may be configured to prevent the gate from contacting the user-facing module 130.

Figure 2:
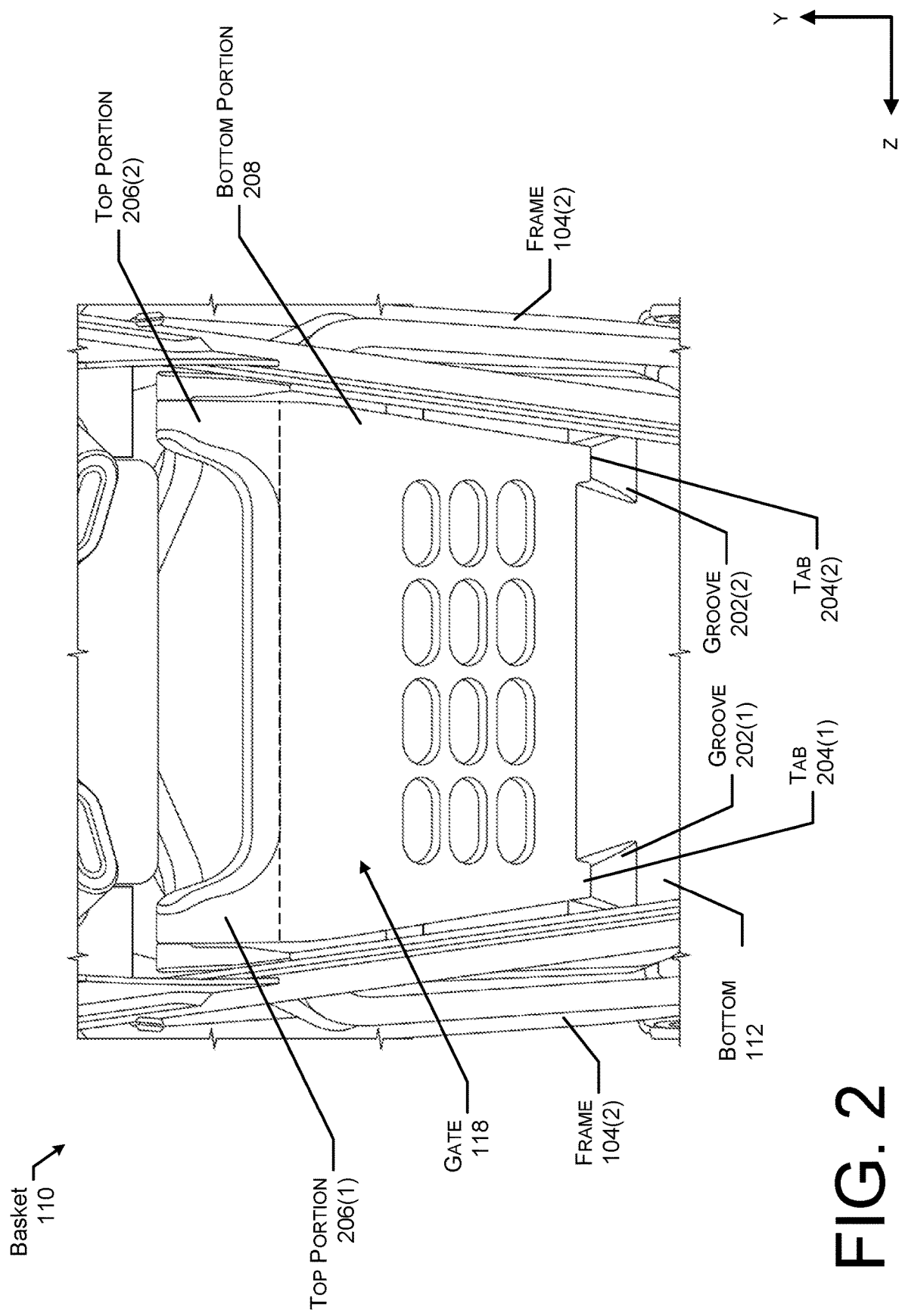
FIG. 2 illustrates a basket of the mobile apparatus that includes a gate, in accordance with examples of the present disclosure.

FIG. 2 illustrates the gate 118 of the mobile apparatus 102 being secured to the basket 110, in accordance with examples of the present disclosure. As shown, the bottom 112 of the basket 110 includes grooves 202(1)-(2) (also referred to as "grooves 202") located at a back portion of the basket 110 and proximate to the gate 118. In the example of FIG. 2, the grooves 202 include a quadrilateral shape. However, in other examples, one or more of the grooves 202 may include any other shape, such as a triangular shape, a circular shape, and/or the like. Additionally, the grooves 202 may be configured such that the grooves 202 increase in depth from the front sides of the grooves 202 (e.g., the side that is closest to the front of the mobile apparatus 102) to the back sides of the grooves 202 (e.g., the side that is closest to the back of the mobile apparatus 102). Furthermore, the grooves 202 may be configured such that the grooves increase in width from the back sides of the grooves 202 to the front sides of the grooves 202.

The grooves 202 may be configured to secure the gate 118 when the gate 118 is in the first position. For instance, and as shown by the example of FIG. 2, the gate 118 may include tabs 204(1)-(2) (also referred to as "tabs 204") that are configured to slide into the grooves 202 when the gate 118 is lowered from the second position to the first position. The tabs include a shape that is configured to cause the gate 118 to be secured, while in the first position, such that the gate 118 is not able to move side-to-side when in the first position. For example, a width of the tabs 204 may be substantially equal to a width of the grooves 202 such that the gate 118 cannot move side-to-side. This way, the gate 118 will not contact the main frame 104 of the mobile apparatus 102 when the gate is in the first position and a force is applied to the sides of the gate 118.

Additionally, based on the shapes of the grooves 202, the gate 118 may still be configured to move from the first position to the second position even when the tabs 204 of the gate 118 are within the grooves 202 of the basket 110. This is because the grooves 202 may only be configured to prevent the side-to-side movement of the gate 118 (e.g., movement towards the side 114(2) of the basket 110 and the side 114(3) of the basket 110). However, the grooves 202 do not prevent the bottom of the gate 118 from moving forward, such as towards the side 114(1) of the basket 110, when the gate 118 is moving from the first position to the second position (e.g., the bottom of the gate 118 is still able to swing upwards until the gate 118 is approximately parallel with the bottom 112 of the basket 110).

As further illustrated in the example of FIG. 2, the gate 118 may include at least top portions 206(1)-(2) (also referred to as "top portions 206") and a bottom portion 208. In some examples, the bottom portion 208 may be configured to be substantially parallel with respect to the horizontal plane (e.g., the y-plane) while the top portions 206(2) include an angle with respect to the horizontal plane. In such examples, the top portions 206 are angled in order to prevent items, which are placed within the basket 110, from contacting the user-facing module 130 (e.g., from contacting the capture assemblies 148(1)-(2)). The angle may include, but is not limited to, 2 degrees, 5 degrees, 10 degrees, 20 degrees, and/or any other angle.

Figure 3A:
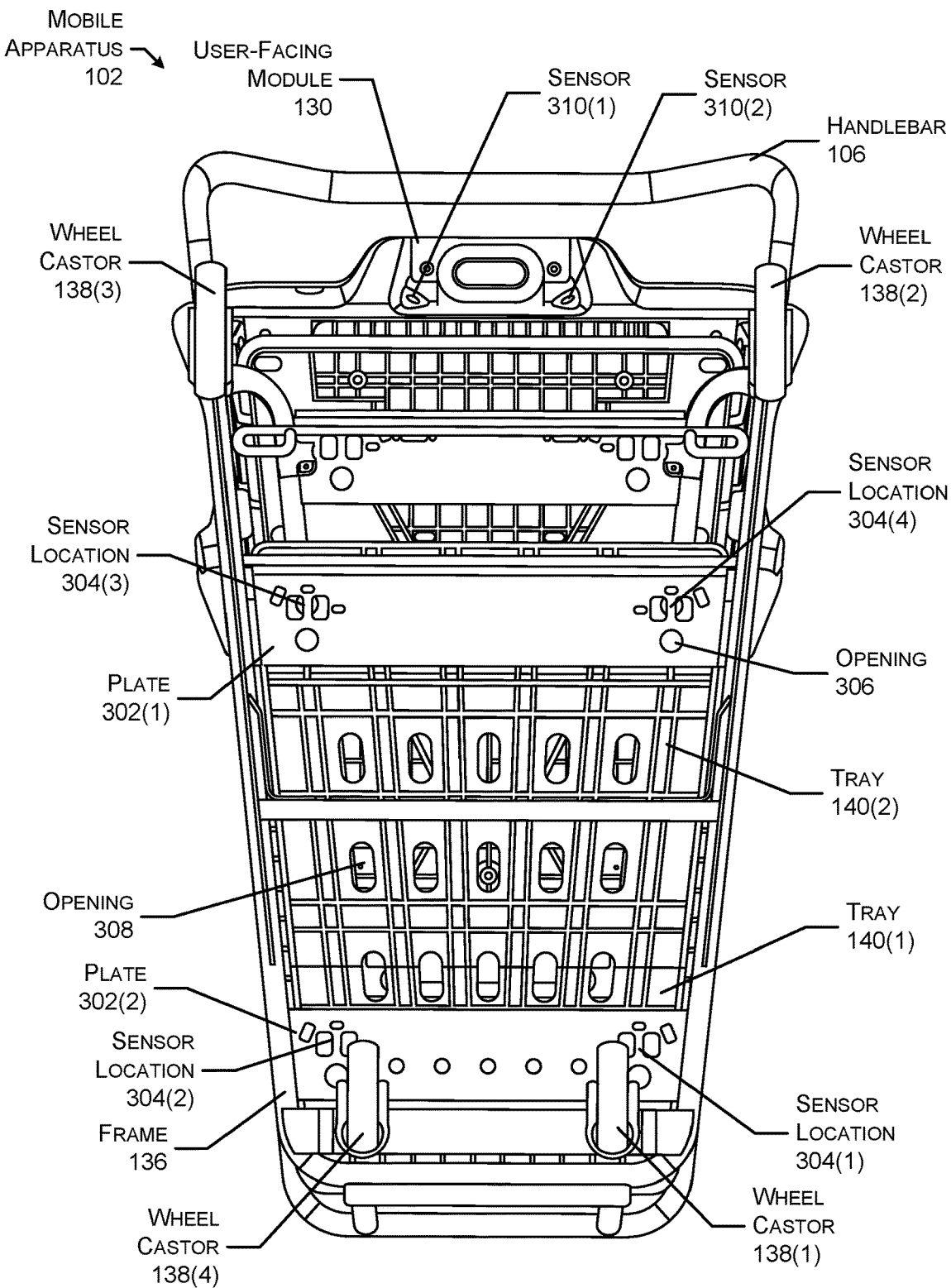
FIGS. 3A-3B illustrate a view of a bottom of the tray of the mobile apparatus, in accordance with examples of the present disclosure.
Figure 3B:
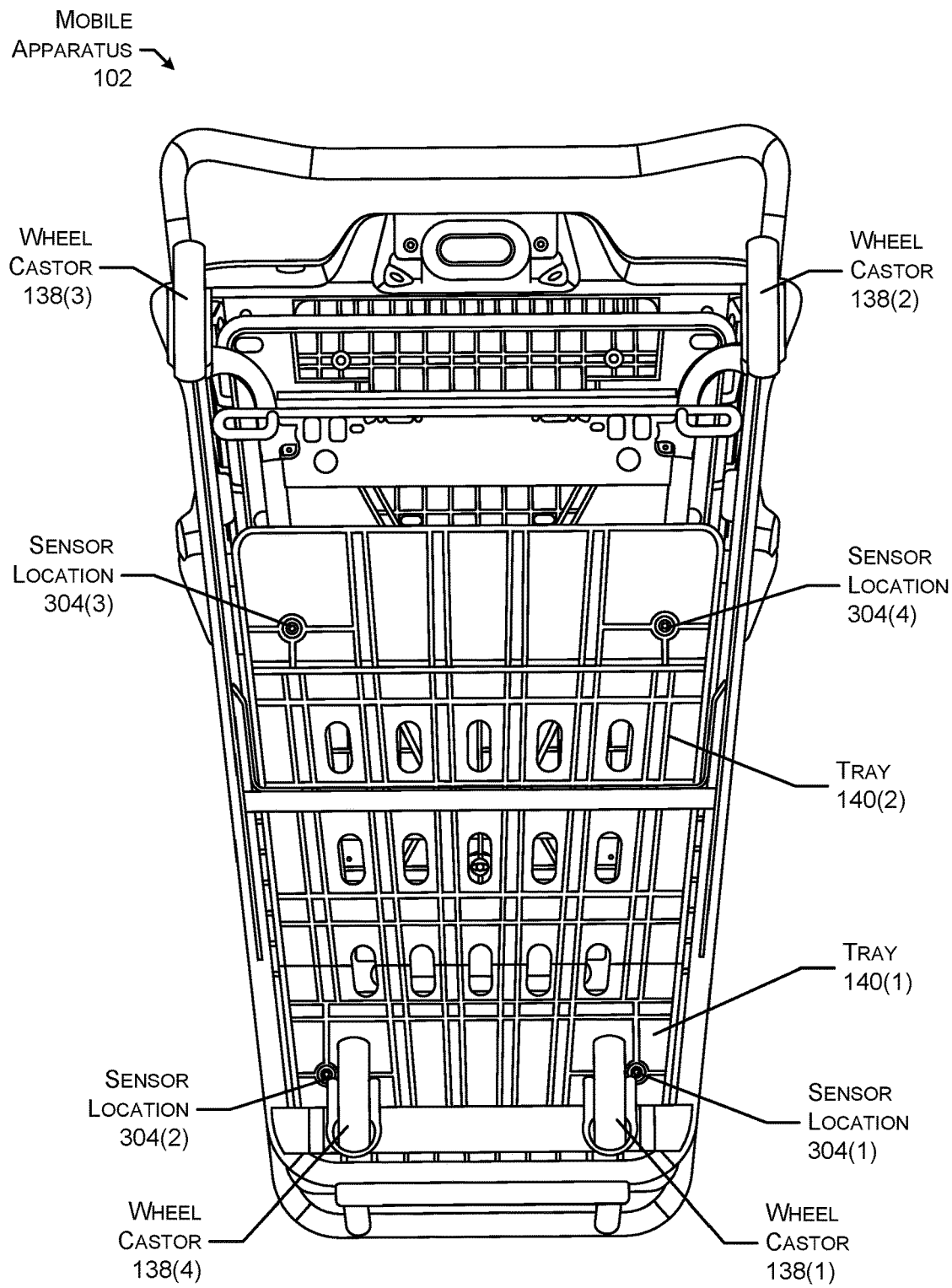

FIGS. 3A-3B illustrate a view of a bottom of the tray 140 of the mobile apparatus 102, in accordance with examples of the present disclosure. As shown by the example of FIG. 3A, the mobile apparatus 102 may include plates 302(1)-(2) (also referred to as "plates 302") that attach to the wheel frame 136. For example, the plate 302(1) is attached to a back portion of the wheel frame 136 while the plate 302(2) is attached to a front portion of the wheel frame 136. The plates 302 may attach to the wheel frame 136 using any type of connection mechanism, such as, but not limited to, welding. The plates 302 may be made of plastic, wood, metal, composites, or any other material and/or combinations of materials.

The tray 140 may then attach to the plates 302 using one or more fasteners. As described herein, a fastener may include, but is not limited to, an expansion joint, a screw, a bolt, a mold, tape, a welding material, and/or any other mechanism that may be used to attach the tray 140 to the plates 302. In some examples, the tray 140 attaches to each of the plates 302 using a single fastener while, in other examples, the tray 140 attaches to each of the plates 302 using more than one fastener.

As further illustrated in the example of FIGS. 3A-3B, the mobile apparatus 102 may include sensors located between the plates 302 and the tray 140 at various sensor locations 304(1)-(4) (also referred to as "sensor locations 304"). For example, a first loadcell associated with a weight sensor may be located between the plate 302(2) and the tray 140 at the first sensor location 304(1), a second loadcell associated with the weight sensor may be located between the plate 302(2) and the tray 140 at the second sensor location 304(2), a third loadcell associated with the weight sensor may be located between the plate 302(1) and the tray 140 at the third sensor location 304(3), and a fourth loadcell associated with the weight sensor may be located between the plate 302(1) and the tray 140 at the fourth sensor location 304(4). While the example of FIGS. 3A-3B illustrate four different sensor locations 304 of where sensors may be located between the plates 302 and the tray 140, in other examples, any number of sensors may be located at any number of sensor locations between the plates 302 and the tray 140.

As further illustrated in the example of FIG. 3A, the plates 302 may include openings 306 (although only one is labeled for clarity reasons) that provide access to each of the loadcells of the weight sensor. The plates 302 may further include additional openings that are used to attach the sensors to the plates 302.

As further illustrated in the example of FIGS. 3A-3B, the tray 140 may include openings 308. In some examples, the openings 308 may reduce the overall weight of the tray 140 and, as such, reduce the overall weight of the mobile apparatus 102. Additionally, in some examples, the openings 308 may also allow for substances, such as water, to fall off of the tray 140.

FIGS. 3A-3B further illustrate that the user-facing module 130 may include sensors 310(1)-(2) (also referred to as "sensors 310"). The sensors 310 may include, but are not limited to, Time-of-Flight (ToF) sensors, distance sensors, proximity sensors, and/or any other type of sensor. In some examples, the user-facing module 130 may use the sensors 310 in order to determine when a user is located proximate to the mobile apparatus 102. Additionally, or alternatively, in some examples, the user-facing module 130 may use the sensors 310 to determine when the mobile apparatus 102 is "nested" with other mobile apparatuses. In either of the examples, the user-facing module 130 may perform one or more processes based on the determinations. For a first example, the user-facing module 130 may cause the mobile apparatus 102 to operate in a first state when a user is located proximate to the mobile apparatus 102 and/or the mobile apparatus 102 is not nested. Additionally, the user-facing module 130 may cause the mobile apparatus to operate in a second, different state when a user is not located proximate to the mobile apparatus 102 and/or the mobile apparatus 102 is nested. The first state and the second state are described in more detail below with respect to FIG. 13.

Figure 4A:
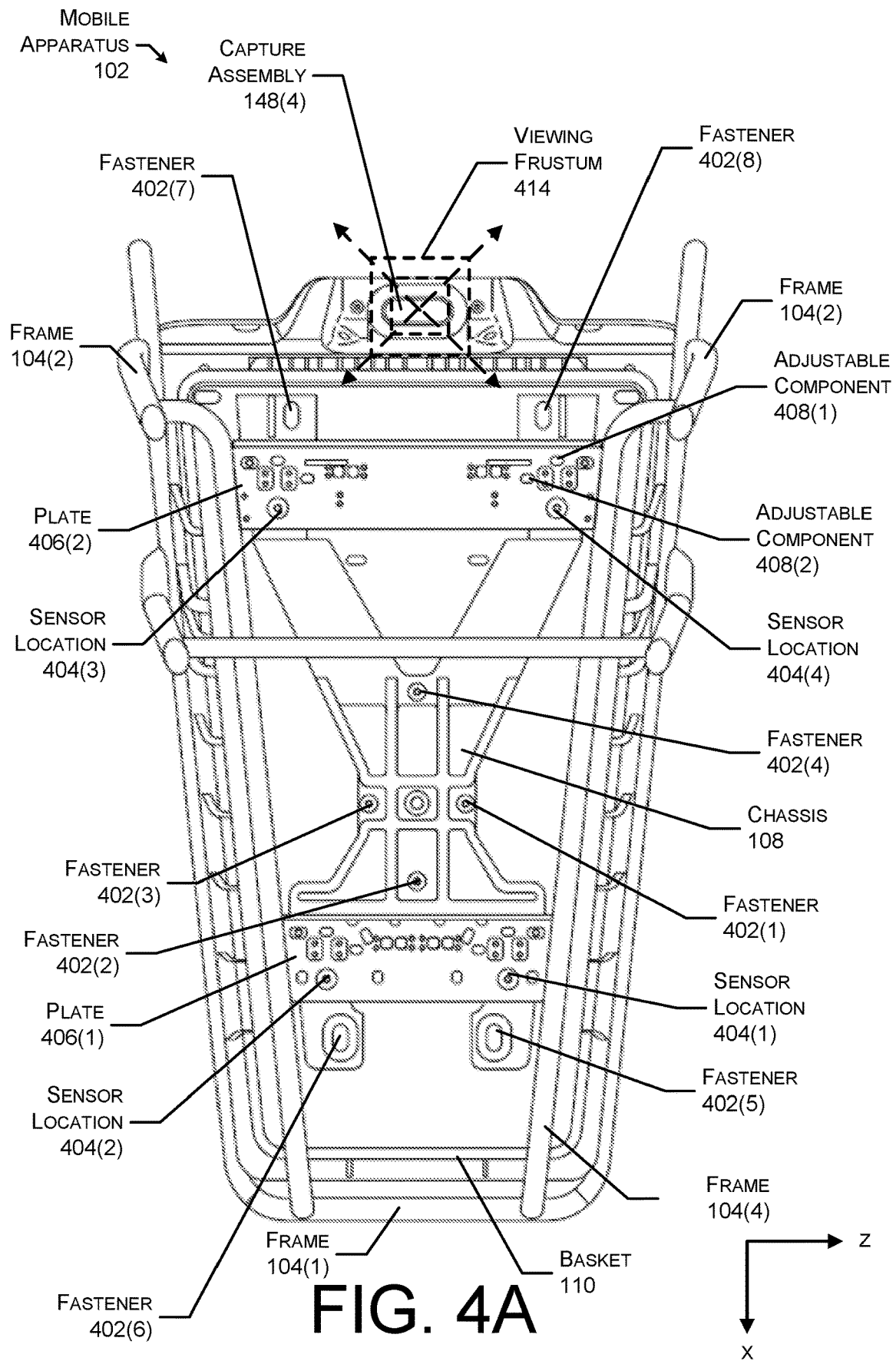
FIGS. 4A-4B illustrate a view of a bottom of the basket of the mobile apparatus, in accordance with examples of the present disclosure.
Figure 4B:
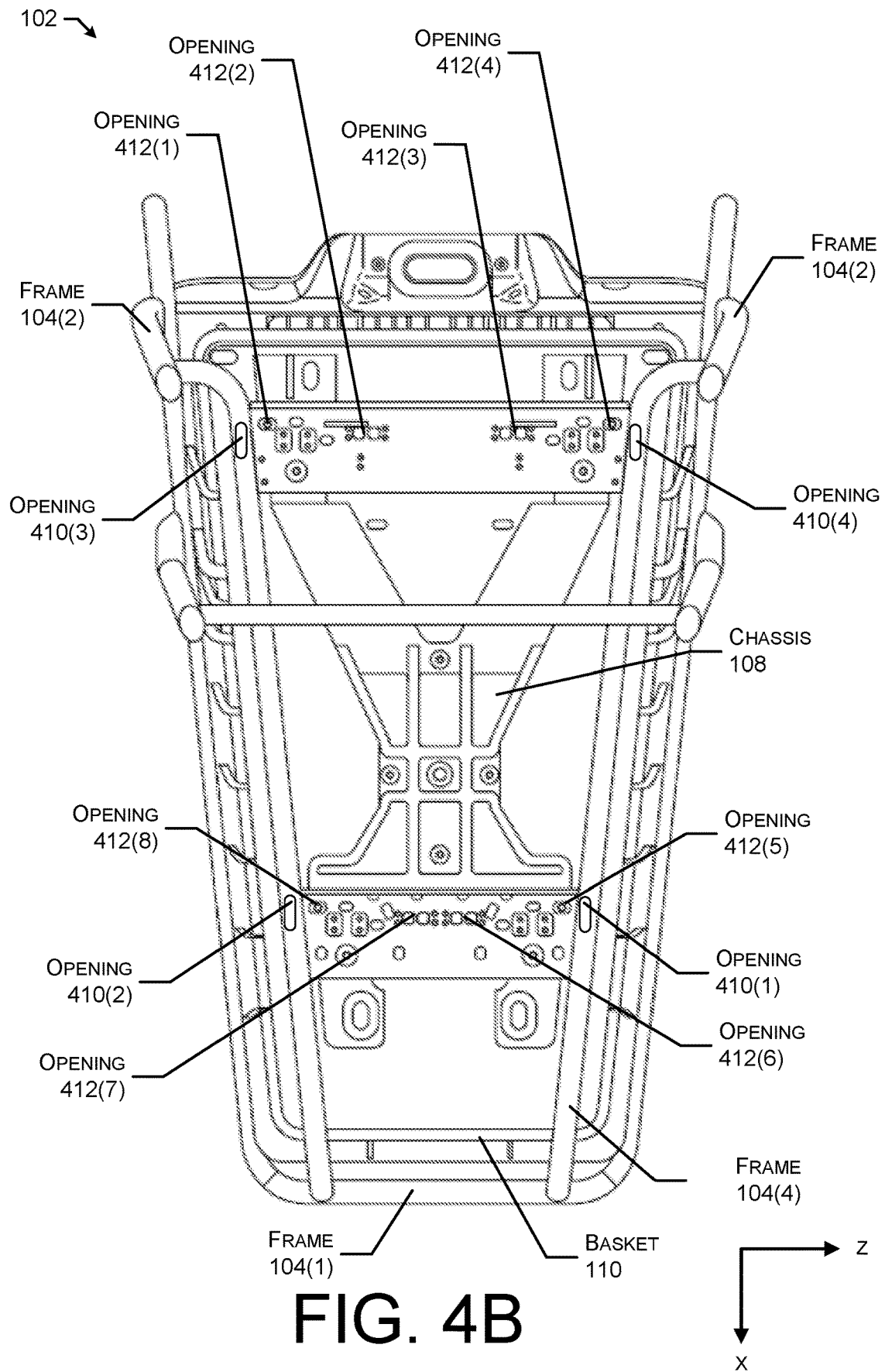

FIGS. 4A-4B illustrate a view of the bottom 112 of the basket 110 of the mobile apparatus 102, in accordance with examples of the present disclosure. As shown, the chassis 108 is attached to the bottom portion 104(4) below the basket 110. The basket 110 may then be attached to the chassis 108 using fasteners 402(1)-(8) (also referred to as "fasteners 402"). In the example of FIGS. 4A-4B, the chassis 108 includes an "X" shape. However, in other examples, the chassis 108 may include any other shape.

In the example of FIGS. 4A-4B, the basket 110 is attached to the chassis 108 using eight fasteners 402 while, in other examples, the basket 110 may be attached to the chassis 108 using any number of fasteners 402. Additionally, in the example of FIGS. 4A-4B, the fasteners 402(1)-(4) may include a first type of fastener while the fasteners 402(5)-(8) include a second type of fastener. In some examples, the first type of fastener may include bolts while the second type of fastener may include expansion joints. However, in other examples, the first type of fastener and/or the second type of fastener may include any other type of fastener.

As further illustrated in the example of FIGS. 4A-4B, the mobile apparatus 102 may include sensors located between the chassis 108 and the basket 110 at various sensor locations 404(1)-(4) (also referred to as "sensor locations 404"). For example, a first loadcell associated with a weight sensor may be located between the chassis 108 and the basket 110 at the first sensor location 404(1), a second loadcell associated with the weight sensor may be located between the chassis 108 and the basket 110 at the second sensor location 404(2), a third loadcell associated with the weight sensor may be located between the chassis 108 and the basket 110 at the third sensor location 404(3), and a fourth loadcell associated with the weight sensor may be located between the chassis 108 and the basket 110 at the fourth sensor location 404(4). While the example of FIGS. 4A-4B illustrate four different sensor locations 404 of where sensors may be located between the chassis 108 and the basket 110, in other examples, any number of sensors may be located at any number of sensor locations between the chassis 108 and the basket 110.

In some examples, the sensors are coupled to plates 406(1)-(2) (also referred to as "plates 406") associated with the chassis 108. For example, a first loadcell located at the first sensor location 404(1) may be coupled to the plate 406(1), a second loadcell located at the second sensor location 404(2) may be coupled to the plate 406(1), a third loadcell located at the third sensor location 404(3) may be coupled to the plate 406(2), and a fourth loadcell located at the fourth sensor location 404(4) may be coupled to the plate 406(2). In other words, the loadcells are located between the plates 406 associated with the chassis 108 and the basket 110.

As further illustrated in the example of FIGS. 4A-4B, the mobile apparatus 102 may include adjustable components 408(1)-(2) (also referred to as "adjustable components 408"). While the example of FIG. 4A only labels two adjustable components 408 for clarity reasons, FIG. 4A illustrates the mobile apparatus 102 as including eight adjustable components 408 (e.g., four adjustable components 408 in the front of the chassis 108 and four adjustable components in the back of the chassis 108). The adjustable components 408 may be configured to secure the basket 110 to the chassis 108, after the basket 110 is correctly aligned on the chassis 108, such that the basket 110 does not contact the main frame 104. In some examples, each adjustable component 408 may include at least an opening, such as a slot, located on the chassis 108 and a screw that is disposed through the opening and attached to the basket 110. For example, a user may loosen the screw, align the basket 110 onto the chassis 108 such that the basket 110 does not contact the main frame 104, and then tighten the screw in order to "lock" the basket 110 into position. While these examples describe the adjustable components 408 as including openings and screws, in other examples, the adjustable components 408 may include any other type of component that is capable of securing the basket 110 to the chassis 108. Additionally, while the example of FIGS. 4A-4B illustrate eight adjustable components 408, in other examples, the mobile apparatus 102 may include any number of adjustable components 408.

FIG. 4B illustrates locations of openings for wiring the electrical components, such as the sensor(s) (e.g., the weight sensor, the loadcells, etc.) of the mobile apparatus 102. As shown, the main frame 104 (e.g., the bottom portion 104(4)) includes four openings 410(1)-(4) (also referred to as "openings 410") for the wiring. For example, in order to protect the wiring, the wiring may be placed within the main frame 104 so that a majority of the wiring is not exposed to the outside environment. As such, in order to attach the wiring to the electrical components, the main frame 104 may include the openings 410 so that the wiring is able to extend from within the main frame 104, to outside of the main frame 104, and then to the electrical components. While the example of FIG. 4B illustrates the main frame 104 as including four openings 410, in other examples, the main frame 104 may include any number of openings 410.

As further illustrated in the example of FIGS. 4A-4B, the chassis 108 may include eight openings 412(1)-(8) for wiring the electrical components of the mobile apparatus 102. As shown, the chassis 108 include two openings 412(1)-(2) located proximate to the third sensor location 404(3), two openings 412(3)-(4) located proximate to the fourth sensor location 404(4), two openings 412(5)-(6) located proximate to the first sensor location 404(1), and two openings 412(7)-(8) located proximate to the second sensor location 404(2). While the example of FIGS. 4A-4B illustrate the chassis 108 as including eight openings 412, in other examples, the chassis 108 may include any number of openings 412. Additionally, while the example of FIGS. 4A-4B illustrate the chassis 108 as including two respective openings 412 located proximate to each sensor location 404, in other examples, the chassis 108 may include any number of sensor openings located proximate to each sensor location 404.

In some examples, the openings 412 allow for electrically connecting the loadcells of the weight sensor to the components included in the user-facing module 130. For example, the opening 412(1) and/or the opening 412(6) may allow for wiring to electrically connect the sensor that is located at the sensor location 404(1) to the components included in the user-facing module 130. For the wiring, the wires that are connected to the sensor may enter the main frame 104(1) through the opening 412(1) and/or the opening 412(6), extend through the main frame 104(1) to a location that is proximate to the user-facing module 130, and then connect to the components of the user-facing module 130. Similar wiring connections may be used to then connected each of the other sensors to the user-facing module 130 using the other openings 410 of the main frame 104(1).

FIG. 4A further illustrates a viewing frustum 414 associated with the capture assembly 148(4). In some examples, the viewing frustum 414 may be oriented in a same direction as an optical axis of the capture assembly 148(4), which is substantially downward in the vertical plane. The viewing frustum 414 may generally be the region of space in the environment of the mobile apparatus 102 that is within the FOV of the imaging device of the capture assembly 148(4). As described herein, the viewing frustum 414 may be directed substantially towards the shelf 124 of the mobile apparatus 102.

Figure 5:
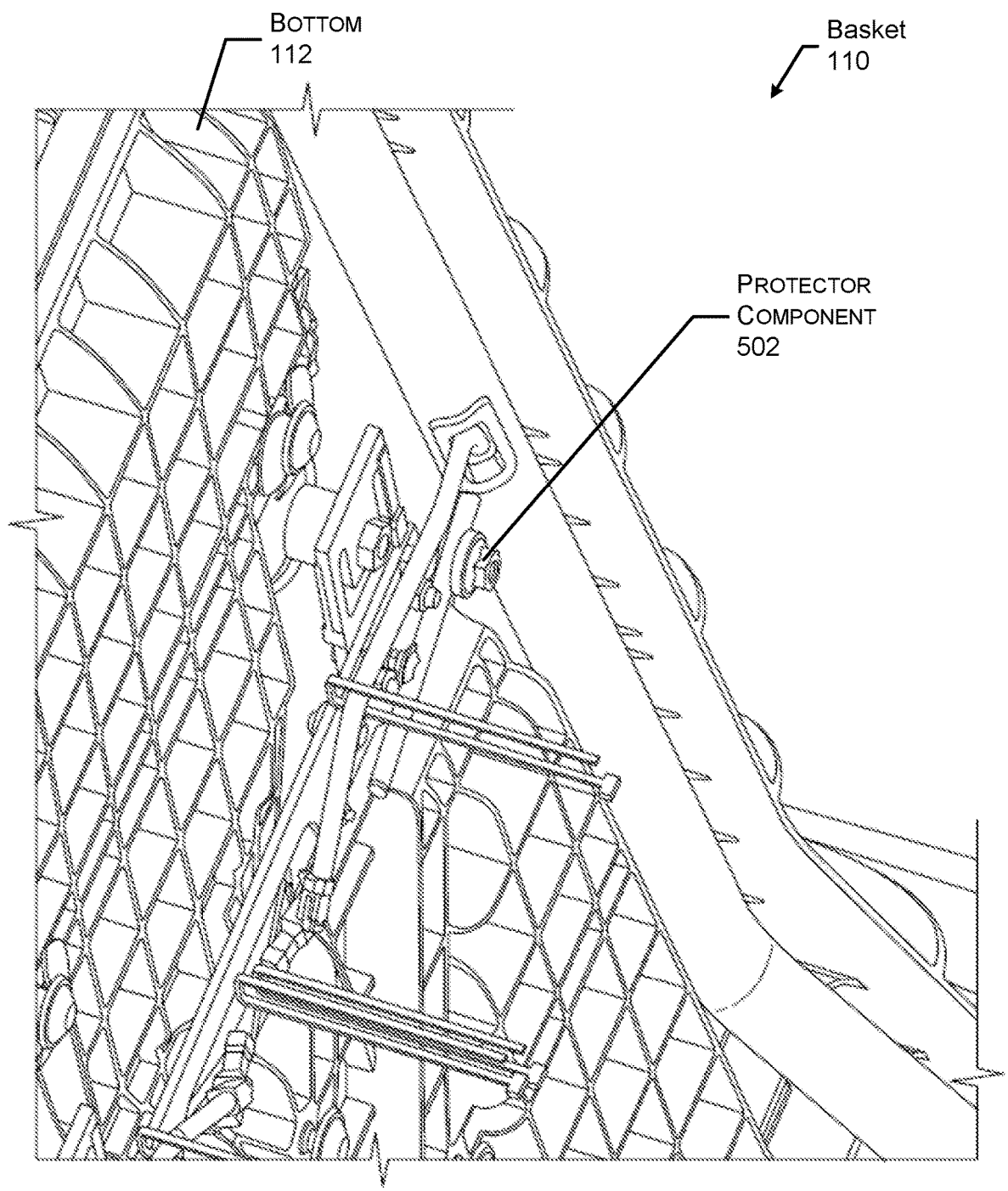
FIG. 5 illustrates another view of the bottom of the basket, in accordance with examples of the present disclosure.

FIG. 5 illustrate another view of the bottom 112 of the basket 110, in accordance with examples of the present disclosure. As shown, underneath the bottom of the basket 112 may include a protector component 502 that protects the mobile apparatus 102 (e.g., the weight sensor(s)) when forces are applied to the basket 112. For instance, and in the example of FIG. the protector component 502 includes a washer and nut, where the mobile apparatus 102 is configured to include a clearance between the washer and the chassis 108 (e.g., frame places of the chassis 108). When a force is applied upward onto the basket 112 (e.g., in the z-direction), such that the basket 112 flexes up, the clearance is closed in order to protect the basket 112 and the sensor(s). While the example of FIG. 5 only illustrates a single protector component 502, in other examples, the mobile apparatus 102 may have more than one of these protector components.

In some examples, the mobile apparatus 102 may include one or more additional components that help protect the mobile apparatus 102 from forces. For example, the chassis 108, such as the plate of the chassis 108, may include pin(s) that extend through hole(s) in the main frame 104. These pin(s) are then configured to prevent lateral movement (e.g., in the x-direction and the y-direction) of the basket 112, such as when forces are applied to the sides 114(1)-(3) of the basket 112. For instance, the pin(s) may contact the side(s) of the hole(s) when forces are applied to the sides 114(1)-(3) of the basket 112, where the contacting of the side(s) prevents the further movement of the basket 112 in the lateral direction.

Figure 6:
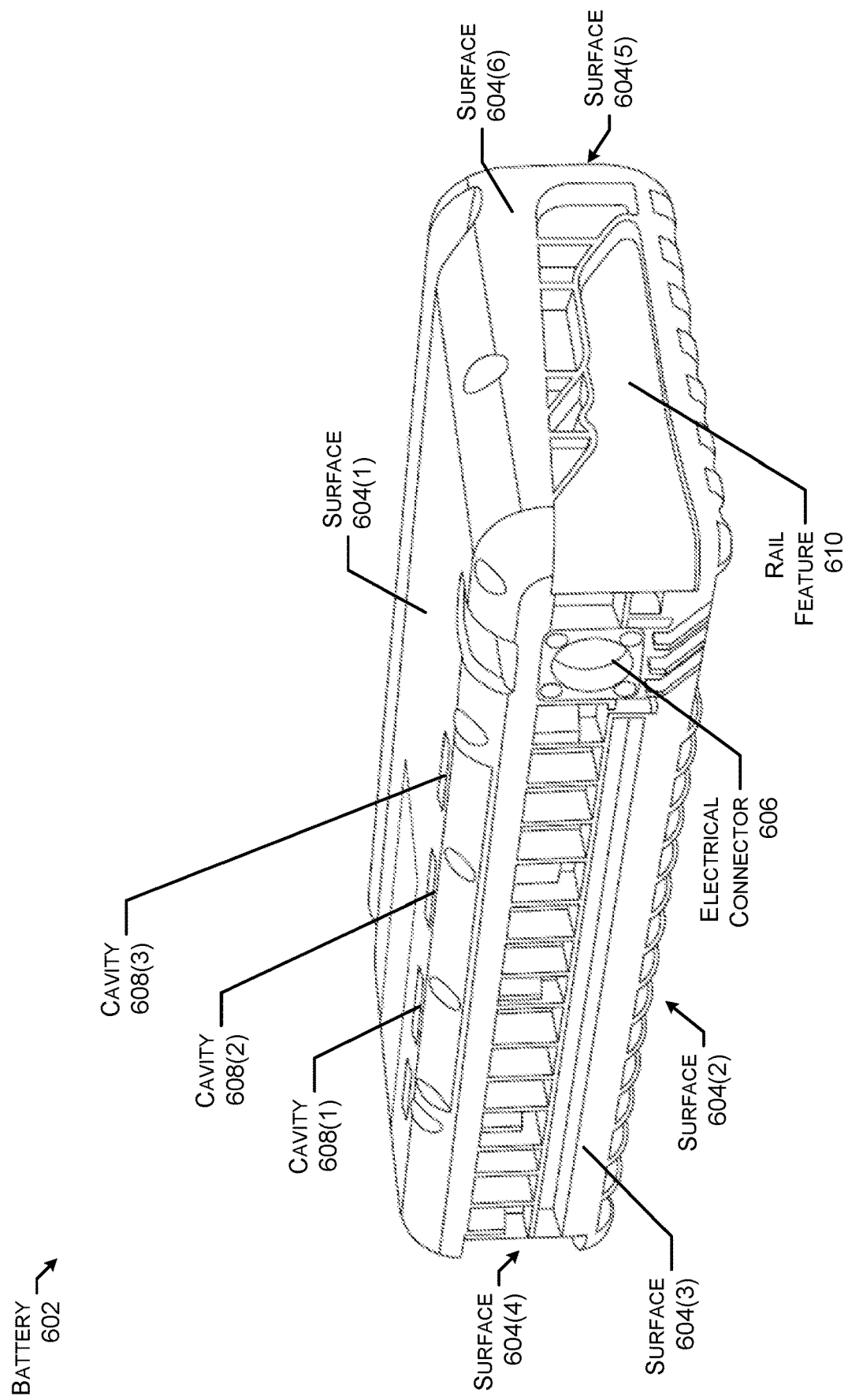
FIG. 6 illustrates an example of a battery of the mobile apparatus, in accordance with examples of the present disclosure.

FIG. 6 illustrates an example of a battery 602 of the mobile apparatus 102, in accordance with examples of the present disclosure. As shown, the battery 602 may include a substantially cuboid shape that includes a top surface 604 (1), a bottom surface 604(2), and four side surfaces 604(3)-(6). However, in other examples, the battery 602 may include a different shape, such as a cube, a cylinder, and/or the like. The example of FIG. 6 illustrates that the battery 602 may include an electrical connector 606 for electrically connecting the battery 602 to the mobile apparatus 102 and/or electrically connecting the battery 602 to an electrical component that recharges the battery 602. Additionally, the battery 602 may include cavities 608(1)-(3) (also referred to as "cavities 608"). As will be discussed further with regard to FIG. 9, the cavities 608 may be used to lock the battery 602 into position when the battery 602 is installed in the mobile apparatus 102. While the example of FIG. 6 illustrates the battery 602 as including three cavities 608, in other examples, the battery 602 may include any number of cavities.

Figure 7:
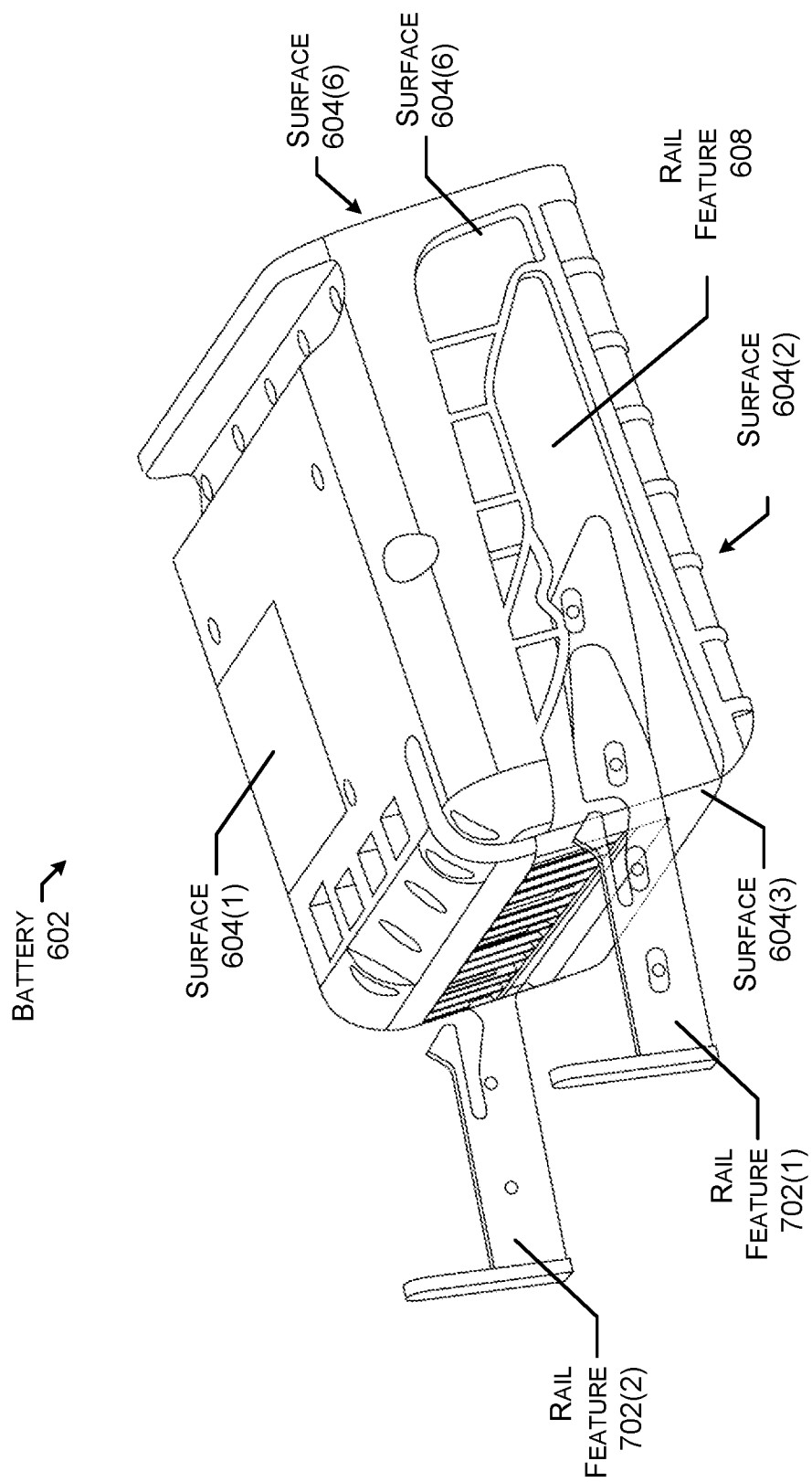
FIG. 7 illustrates an example of a rail system for guiding the battery into an opening of the mobile apparatus during installation of the battery, in accordance with examples of the present disclosure.

Additionally, the example of FIG. 6 illustrates that the battery 602 may include a rail features 610 that helps guide the battery 602 into an opening of the user-facing module 130 when the battery 602 is inserted into the user-facing module 130. For instance, FIG. 7 illustrates an example of a rail system for guiding the battery 602 into the opening of the mobile apparatus 102 during installation of the battery 602, in accordance with examples of the present disclosure. As shown, a rail feature 702(1) (as well as a rail feature 702(2) that guides the other side of the battery 602) that may be located within the opening of the user-facing module 130 may insert into the rail feature 610 of the battery 602. Based on the shape of the rail feature 702(1) and the shape of the rail feature 610, the rail feature 702(1) may guide the battery 602 into the opening. Additionally, and during the installation, the battery 602 may lock into position.

Figure 8A:
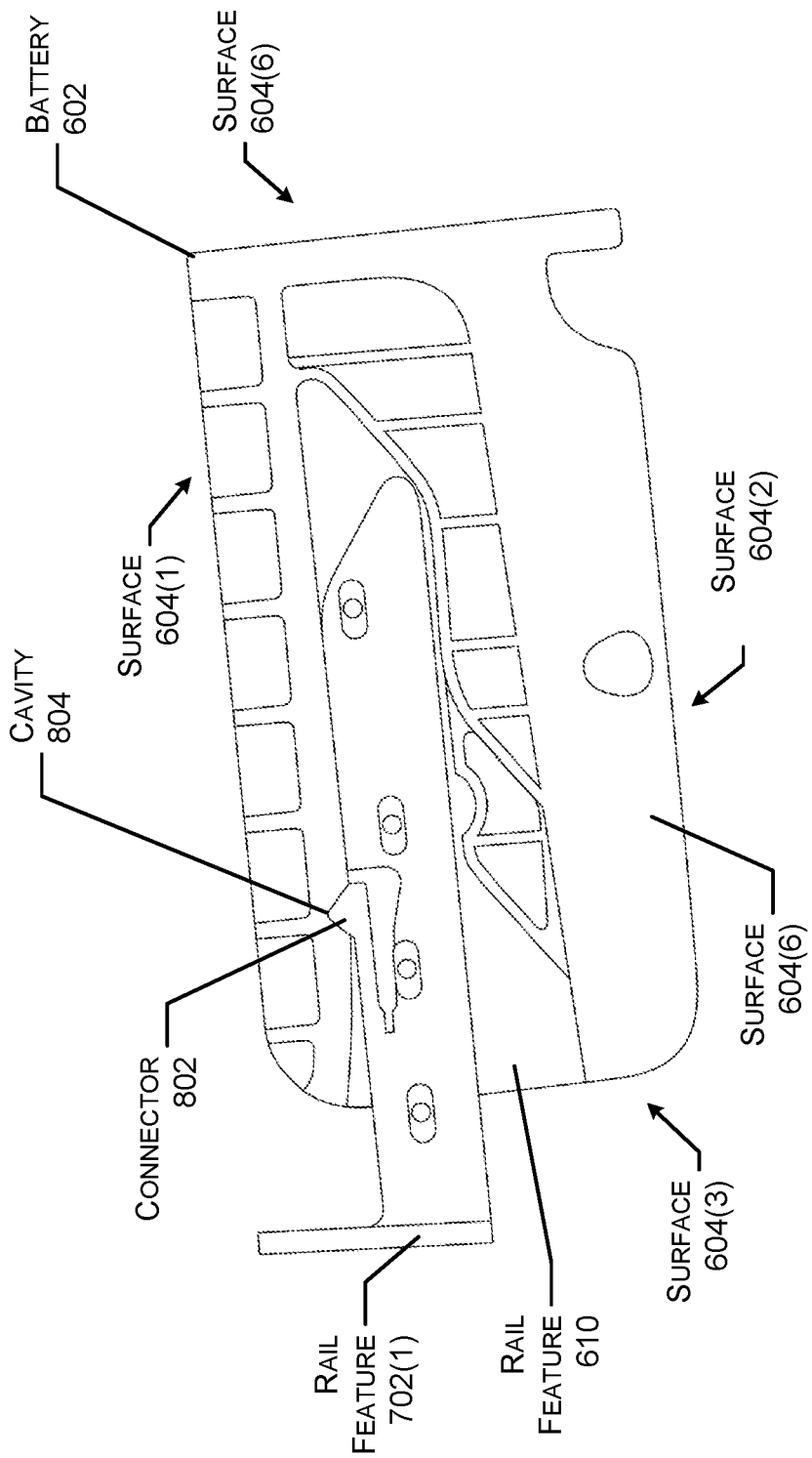
FIG. 8A illustrates an example of preventing the battery from being installed improperly, in accordance with examples of the present disclosure.

In some examples, the rail feature 610 and the rail feature 702(1) may be configured to protect the battery 602 from being installed improperly. For instance, FIG. 8A illustrates an example of preventing the battery 602 from being installed improperly, in accordance with examples of the present disclosure. As shown, the rail feature 702(1) may include a connector 802 that is configured to insert into a cavity 804 of the rail feature 610 when the battery 602 is inserted improperly into the opening. In some examples, the inserting of the connector 802 into the cavity 804 prevents the battery 602 from being fully inserted into the opening. This may be designed in order to polarize the installation of the battery 602, which may protect the electrical connector 606 of the battery 602 and/or the electrical connector of the mobile apparatus 102 that connects to the electrical connector 606.

Figure 8B:
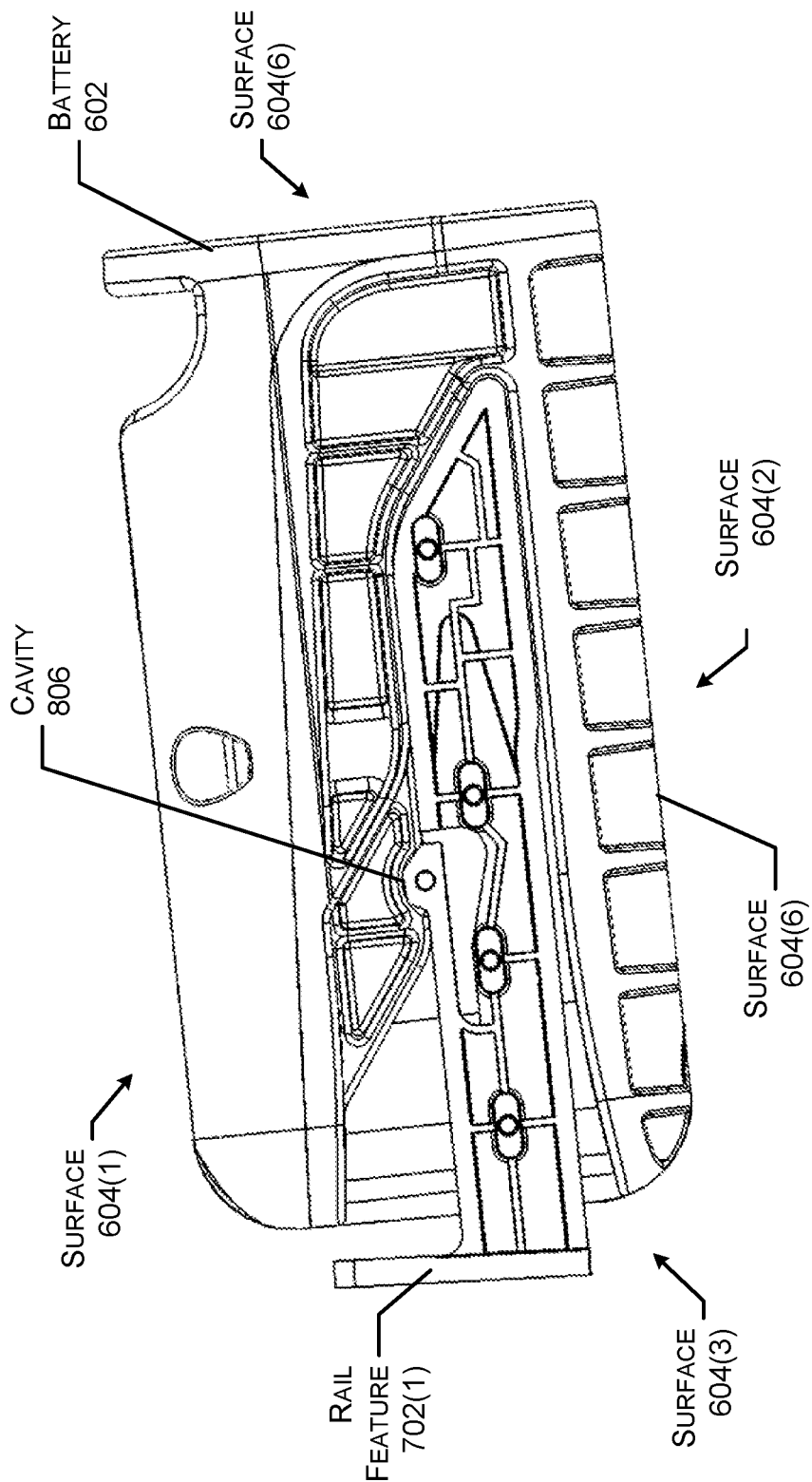
FIG. 8B illustrates an example of inserting the battery properly, in accordance with examples of the present disclosure.

FIG. 8B illustrates an example of inserting the battery 602 properly, in accordance with examples of the present disclosure. As discussed herein, the rail feature 610 and the real feature 702(1) may be configured to guide the battery 602, such as when the battery 602 is being inserted into an opening of the mobile apparatus 102 during installation of the battery 602. As such, when the battery 602 is properly inserted into the opening, the rail feature 702(1) may completely engage with the rail feature 610 in order to secure the battery 602 within the opening. Additionally, and as illustrated in the example of FIG. 8B, the connector 802 may insert into a cavity 806 of the rail feature 610, which helps secure the battery 602 within the opening.

Figure 9:
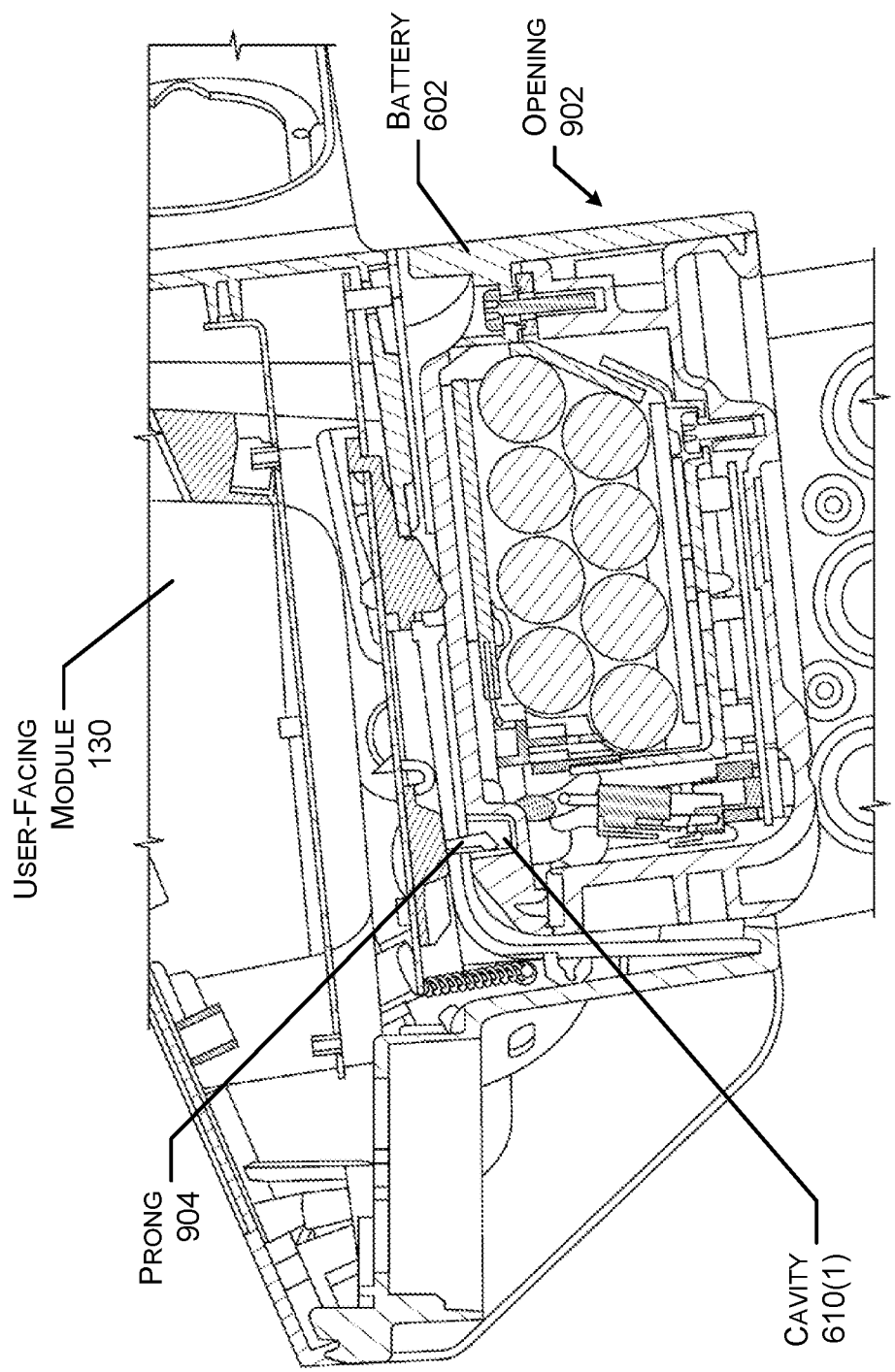
FIG. 9 illustrates an example of securing the battery within the mobile apparatus, in accordance with examples of the present disclosure.

Also, as discussed above, the cavities 608 may be used to lock the battery 602 into position. For instance, FIG. 9 illustrates an example of locking the battery 602 within the mobile apparatus 102, in accordance with examples of the present disclosure. As shown, the battery 602 is inserted into an opening 902 of the handlebar module 130 (where the opening 902 is further illustrated in FIG. 10). As also shown, the user-facing module 130 may include a prong 904 that is configured to insert into the cavity 608(1) of the battery 602 when the battery 602 is inserted into the opening 902. In some examples, the prong 904 may include a spring-loaded ram. While the example of FIG. 9 illustrates only prong 904 inserting into a single cavity 608(1), in other examples, the user-facing module 130 includes multiple prongs that insert into the cavities 608.

By using the prong to secure the battery 602 within the opening 902, the latching system may be configured to offload impact forces from the latching system directly to the mobile apparatus 102. This may help protect the battery 602 during installation, during removal, and/or during normal operation of the mobile apparatus 102.

Figure 10:
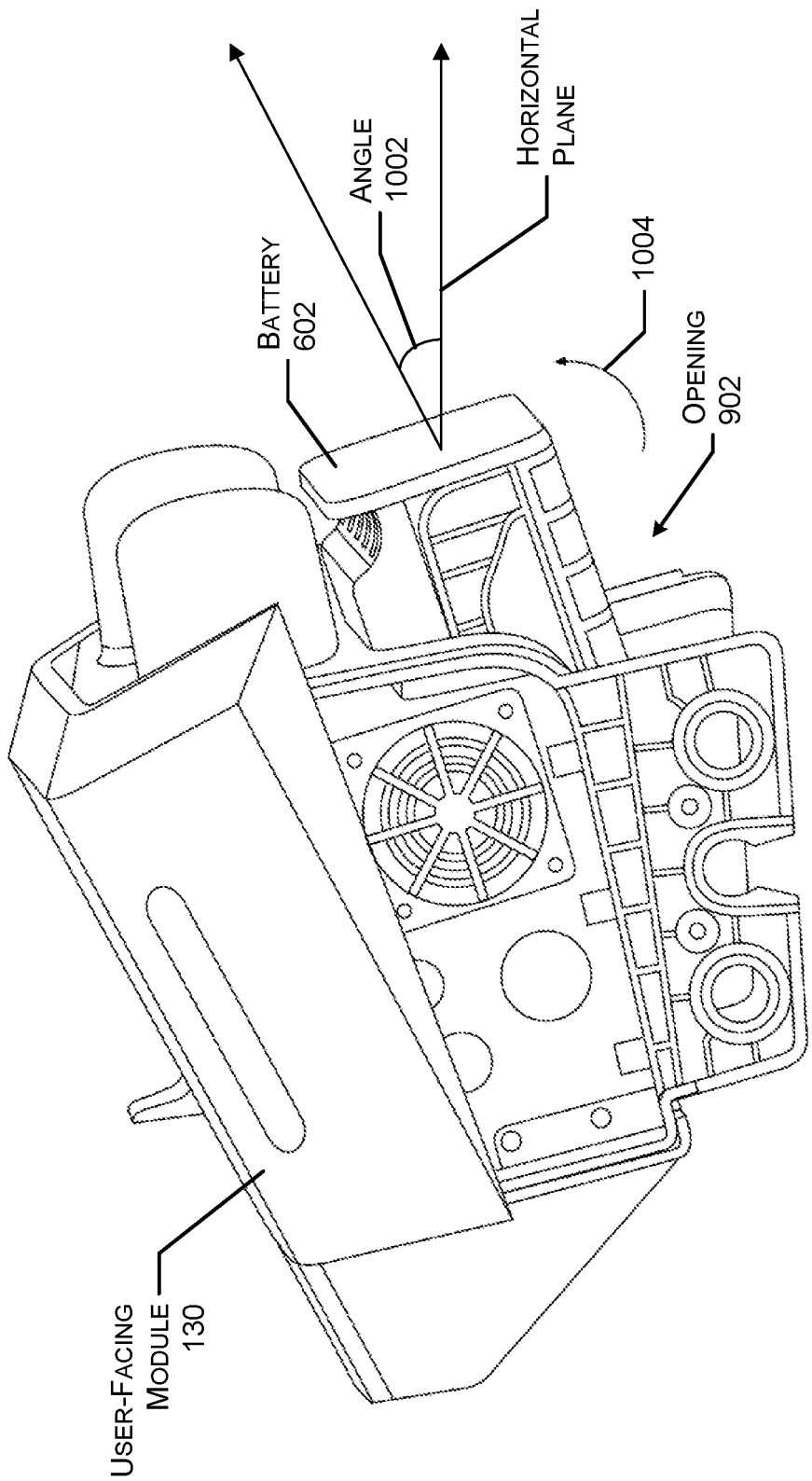
FIG. 10 illustrates an example of removing the battery from the mobile apparatus, in accordance with examples of the present disclosure.

In some examples, the mobile apparatus 102 may be configured such that the battery 602 is removed and/or installed at an angle. For instance, FIG. 10 illustrates an example of removing the battery 602 from the mobile apparatus 102, in accordance with examples of the present disclosure. As shown, the battery 602 is removed from the opening 902 of the user-facing module 130 at an angle 1002 with respect to the horizontal plane. In some examples, allowing the battery 602 to be removed and/or installed at the angle 1002 allows for easier access to the battery 602, such as when the mobile apparatus 102 is "nested" with other mobile apparatus(es).

In some examples, and as illustrated by a curved arrow 1004, the rail system associated with the battery 602 also allows for the battery 602 to pivot when the battery 602 is removed and/or inserted into the opening 902 of the user-facing module 130. Similar to the angle 1002 at which the battery 602 is inserted and/or removed, allowing the battery 602 to pivot may also allow for easier access to the battery 602, such as when the mobile apparatus 102 is "nested" with other mobile apparatus(es).

Figure 11:
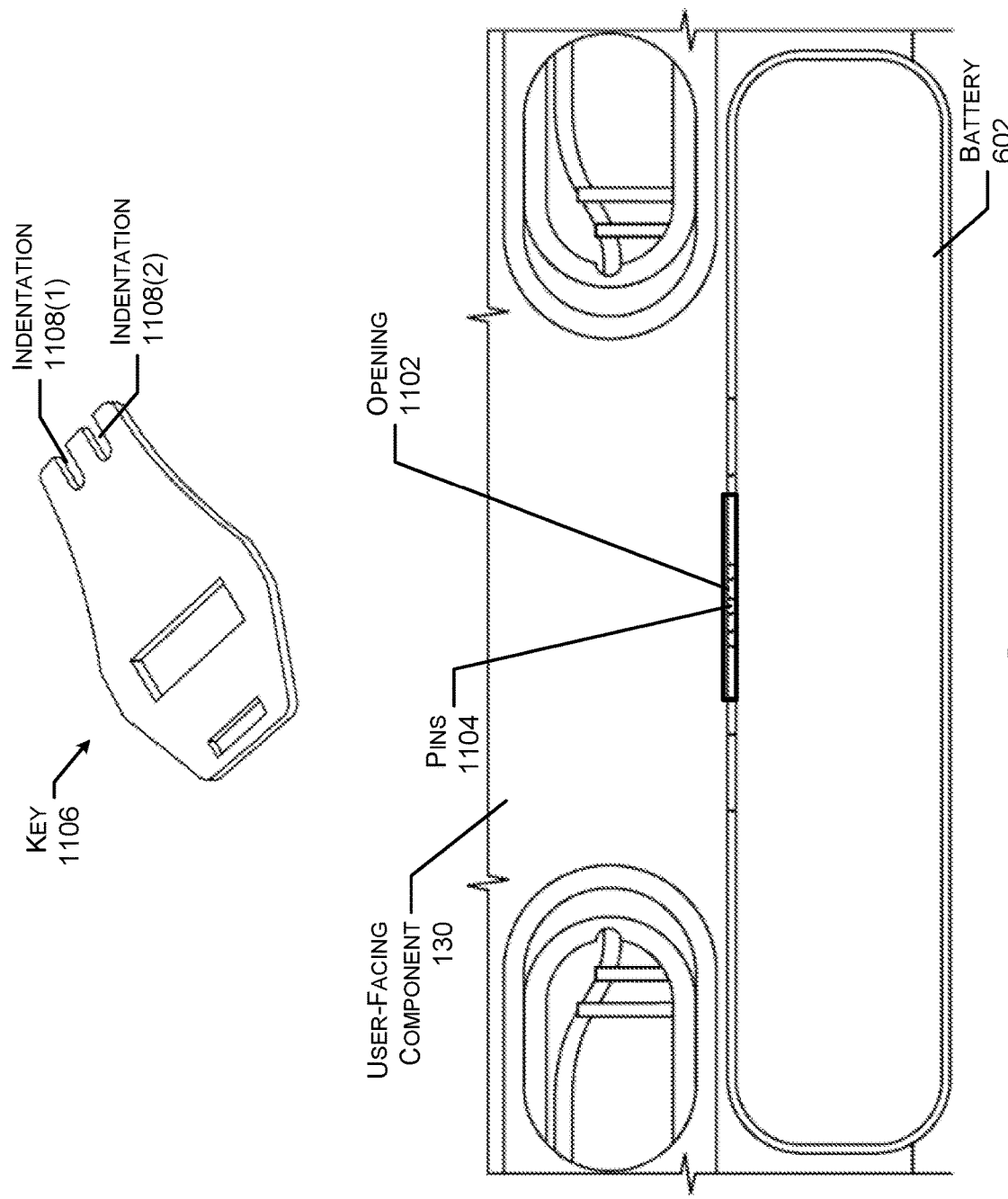
FIG. 11 illustrates an example of a locking mechanism for the battery, in accordance with examples of the present disclosure.

In some examples, the battery 602 may be configured to lock into place within the opening 902 of the user-facing module 130. For instance, FIG. 11 illustrates an example of a locking mechanism for the battery, in accordance with examples of the present disclosure. As shown, the locking mechanism may include an opening 1102 that is located between the battery 602 and a portion of the user-facing module 130. Pins 1104 may be located at least partially within the opening 1102, where the pins 1104 are configured to prevent entry to lifters within the handlebar module 130 that lift the prongs (e.g., the prong 904). As such, and as also illustrated by the example of FIG. 11, a key 1106 may be designed such that the key 1106 passes through the pins 1104 and to the lifters for the prongs.

For instance, the key 1106 may include indentations 1108(1)-(2) (also referred to as "indentations 1108") that allow the pins 1104 to pass through the key 1106 when the key 1106 is inserted into the opening 1102. This way, the key 1106 is able to access the lifters for the prongs, where the lifters cause the prongs to lift out of the cavities 608 of the battery 602. When the prongs are lifted out of the cavities 608, the battery 602 may be removed from the opening 902 of the user-facing module 130.

FIG. 12 illustrates example components of the user-facing module 130 configured to support at least a portion of the functionality of an item management system. The user-facing module 130 may include one or more hardware processors 1202 (processors) configured to execute one or more stored instructions. The processor(s) 1202 may comprise one or more cores. The user-facing module 130 may include one or more input/output (I/O) interface(s) 1204 to allow the processor(s) 1202 or other portions of the user-facing module 130 to communicate with other devices. The I/O interface(s) 1204 may comprise Inter-Integrated Circuit (I2C), Serial Peripheral Interface bus (SPI), Universal Serial Bus (USB) as promulgated by the USB Implementers Forum, and so forth. The I/O interface(s) 1204 may allow the various modules/components to communicate with each other and/or control each other.

The user-facing module 130 may also include one or more communication interfaces 1206. The communication interface(s) 1206 are configured to provide communications between the user-facing module 130 and other devices, such as the server(s), sensors, interface devices, routers, and so forth. The communication interface(s) 1206 may include devices configured to couple to personal area networks (PANs), wired and wireless local area networks (LANs), wired and wireless wide area networks (WANs), and so forth. For example, the communication interfaces 1206 may include devices compatible with Ethernet, Wi-Fi™, and so forth. The user-facing module 130 may also include one or more busses or other internal communications hardware or software that allow for the transfer of data between the various modules and components of the user-facing module 130.

The user-facing module 130 may also include the one or more capture assemblies 1208 (which may represent, and/or include, the capture assemblies 148) that each include one or more sensors 1210, a camera 1212, and one or more LEDs 1214. In some examples, the sensor(s) 1210 may comprise any type of sensor that is able to detect the presence of nearby objects without the need for physical contact (e.g., ToF sensor(s), PIR sensor(s), capacitive sensor(s), etc.). The cameras 1212 in each of the capture assemblies 1208 may comprise any type of camera or imaging device configured to generate image data (and/or video data), or information descriptive of a plurality of picture elements or pixels. The LED(s) 1214 may be selectively activated to emit light at any wavelength, visible or non-visible to users. In some examples, one or more capture assemblies 1208 may additionally, or alternatively, be facing downward into the basket 110 of the user-facing module 130. Additionally, the user-facing module 130 may include one or more cameras 1212 that are outward facing in that generate image data representing the facility around the user-facing module 130.

The user-facing module 130 may include one or more power supply(ies) 1216 to provide power to the components of the user-facing module 130, such as a battery pack module 1218 (e.g., the battery 602), which include one or more batteries 1220. The power supply(ies) 1216 may also include a secondary (e.g., internal) power supply 1222 to allow for hot swapping of battery pack modules 1218, such as one or more capacitors, internal batteries, etc.

The user-facing module 130 may also include the display 132 configured to display content represented by image data, such as pictures, videos, user interface elements, and/or any other image data. The display 132 may comprise any type of display 132, and may further be a touch screen to receive touch input from a user. The user-facing module 130 may also include one or more microphones 1224 and one or more loudspeakers 1226 to facilitate a dialogue with a user, and/or to receive feedback from the user. The microphone(s) 1224 may capture sound representing the user's speech, and the loudspeaker(s) 1226 may output machine-generated words to facilitate a dialogue, prompt a user for feedback on an item and/or for other information, and/or output other alerts or notifications.

The user-facing module 130 may also include other types of sensor(s) 1228. As described herein, these sensor(s) may proximity sensor(s), light sensor(s), and/or the like.

The user-facing module 130 may include one or more memories 1230 (e.g., in an electronics box module along with the processor(s) 1202). The memory 1230 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1230 provides storage of computer-readable instructions, data structures, program modules, and other data for the operation of the user-facing module 130. Examples of operations that may be performed by the user-facing module 130 are described with respect to FIG. 16.

Figure 13:
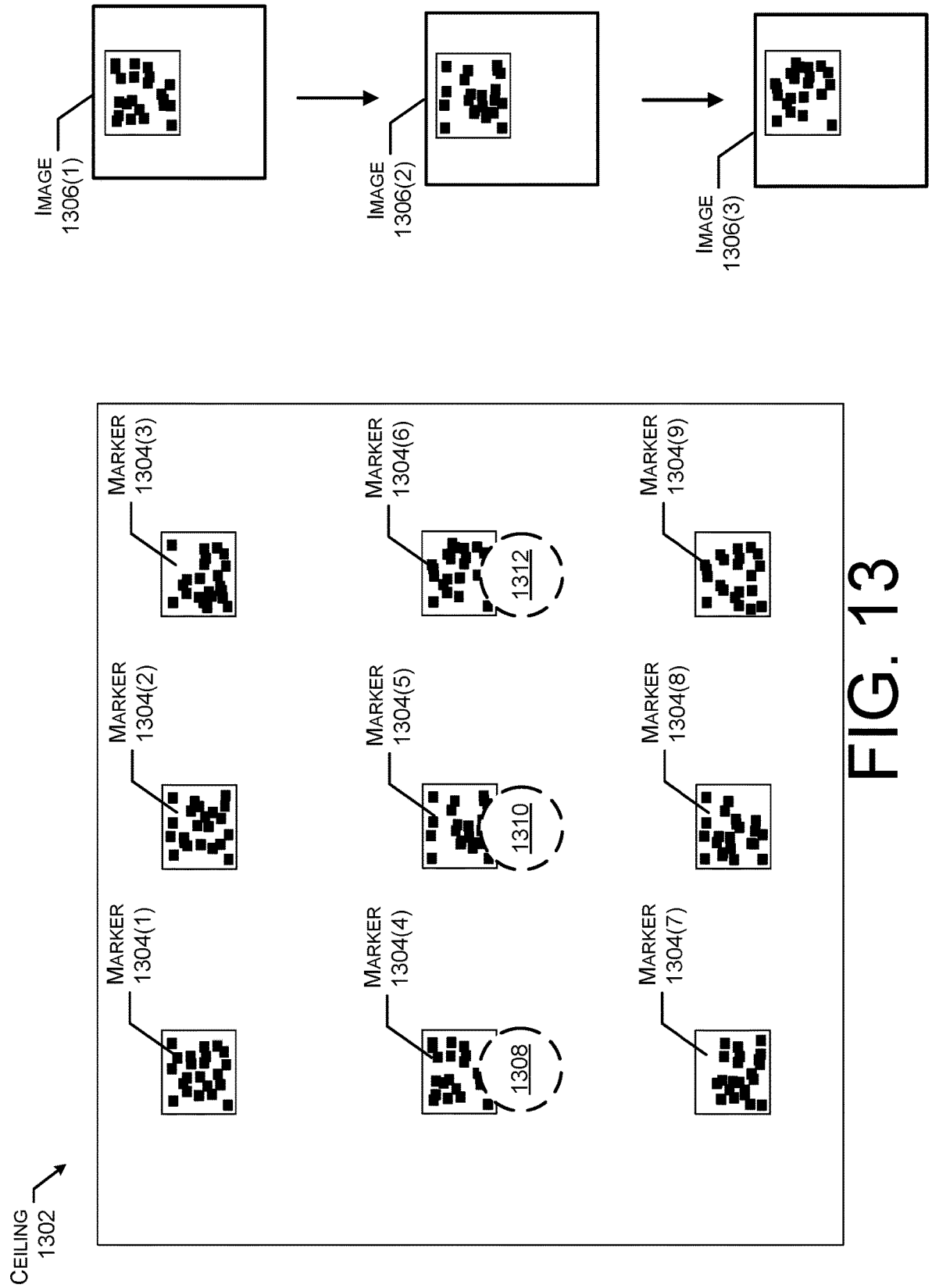
FIG. 13 illustrates an example of determining a location of mobile apparatus within a facility using an imaging device, in accordance with examples of the present disclosure.

FIG. 13 illustrates an example of determining a location of the mobile apparatus 102 within a facility using an imaging device, in accordance with examples of the present disclosure. As shown, a ceiling 1302 of a facility may include markers 1304(1)-(9) (also referred to as "markers 1304"). In some examples, the markers 1304 may include fiducial markers while, in some examples, the markers 1304 may include any other type of marker (e.g., color, design, logo, image, content, etc.). Additionally, in some examples, the markers 1304 may be configured in a pattern on the ceiling 1302 while, in other examples, the markers 1304 may be placed on the ceiling based on the layout of the facility.

For instance, the markers 1304 may be placed above the walking areas within the facility. For example, the markers 1304 may be placed alone the walking paths between the inventory locations within the facility, such as between the shelves. As an example, and using the example of FIG. 13, the markers 1304(1)-(3) may be located along a first path between a first inventory location and a second inventory location, the markers 1304(4)-(6) may be located along a second path between the second inventory location and a third inventory location, and the markers 1304(7)-(9) may be located along a third path between the third inventory location and a fourth inventory location.

To determine the location, the mobile apparatus 102 may then generate image data representing the ceiling 1302. As shown, the image data may represent images 1306(1)-(3) (also referred to as "image 1306"). The mobile apparatus 102 may then analyze the image data in order to determine the location of the mobile apparatus 102 within the facility. For example, the mobile apparatus 102 may analyze the image data to determine a pattern associated with the markers 1304 represented by the image data. The mobile apparatus 102 may then determine the location based on the pattern. For example, and as illustrated in the example of FIG. 13, the mobile apparatus 102 may be located at a first location under the ceiling 1302 at a first time, which is represented by 1308, followed by being located at a second location under the ceiling 1302 at a second time, which is represented by 1310, followed by being located at a third location under the ceiling 1302 at a third time, which is represented by 1312.

In some examples, the mobile apparatus 102 is able to determine a respective location using each image 1306. For example, the based on the marker 1304(4) depicted by the image 1306(1), the mobile apparatus 102 may determine that the mobile apparatus 102 is located at the first location. Additionally, or alternatively, in some examples, the mobile apparatus is able to determine a respective location using a series of images 1306. For example, based on the marker 1304(4) depicted by the image 1306(1), followed by the marker 1304(5) depicted by the image 1306(2), and finally followed by the marker 1304(6) depicted by the image 1306(3), the mobile apparatus 102 may determine that the mobile apparatus is located at the third location and/or moving down the path between two inventory locations. While these are just a couple example techniques of how the mobile apparatus 102 may use the image data to determine locations, in other examples, the mobile apparatus may use additional and/or alternative techniques.

In some examples, the markers 1304 may be placed set distances between one another, where the set distances are based on the distance of the markers 1304 from the floor of the facility. For example, the closer the markers 1304 are to the floor of the facility, the closer the set distances may be between the markers 1304. Additionally, the further the markers 1304 are from the floor of the facility, the further the set distances may be between the markers 1304. This may be so that the image data generated by the imaging device of the mobile apparatus 102 is able to represent at least one marker 1304 at all of the locations within the facility.

In some examples, one or more techniques may be used to configure the mobile apparatus 102 in order to perform these location determining processes. For a first example, after the markers 1304 are placed around the facility, the mobile apparatus 102 (and/or one or more other mobile apparatuses) may be walked around the facility in order to generate image data representing the markers 1304. The mobile apparatus 102 (and/or the other mobile apparatus(es), a system, etc.) may the analyze the image data in order to determine which markers 1304 are represented by the image data at the various locations within the facility. Additionally, the mobile apparatus 102 (and/or the other mobile apparatus(es), a system, etc.) may then associate the various markers 1304 with different locations within the facility, such as by using a machine-learning model. For a second example, a user associated with the facility may input, into one or more devices, information that associates the markers 1304 with the different locations within the facility.

Figure 14:
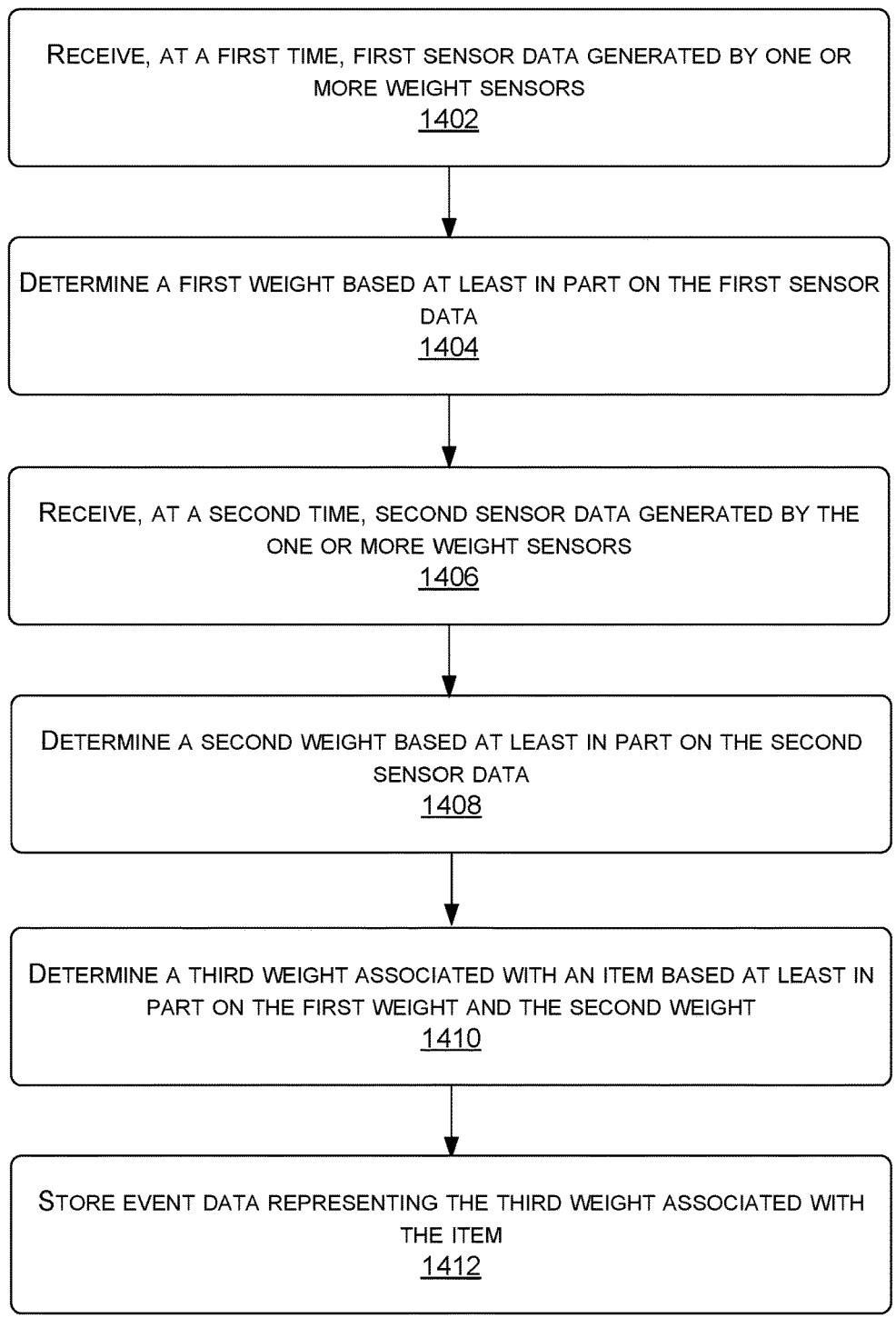
FIG. 14 illustrates a flow diagram of an example process for determining a weight of an item added to a mobile apparatus, in accordance with examples of the present disclosure.
Figure 15:
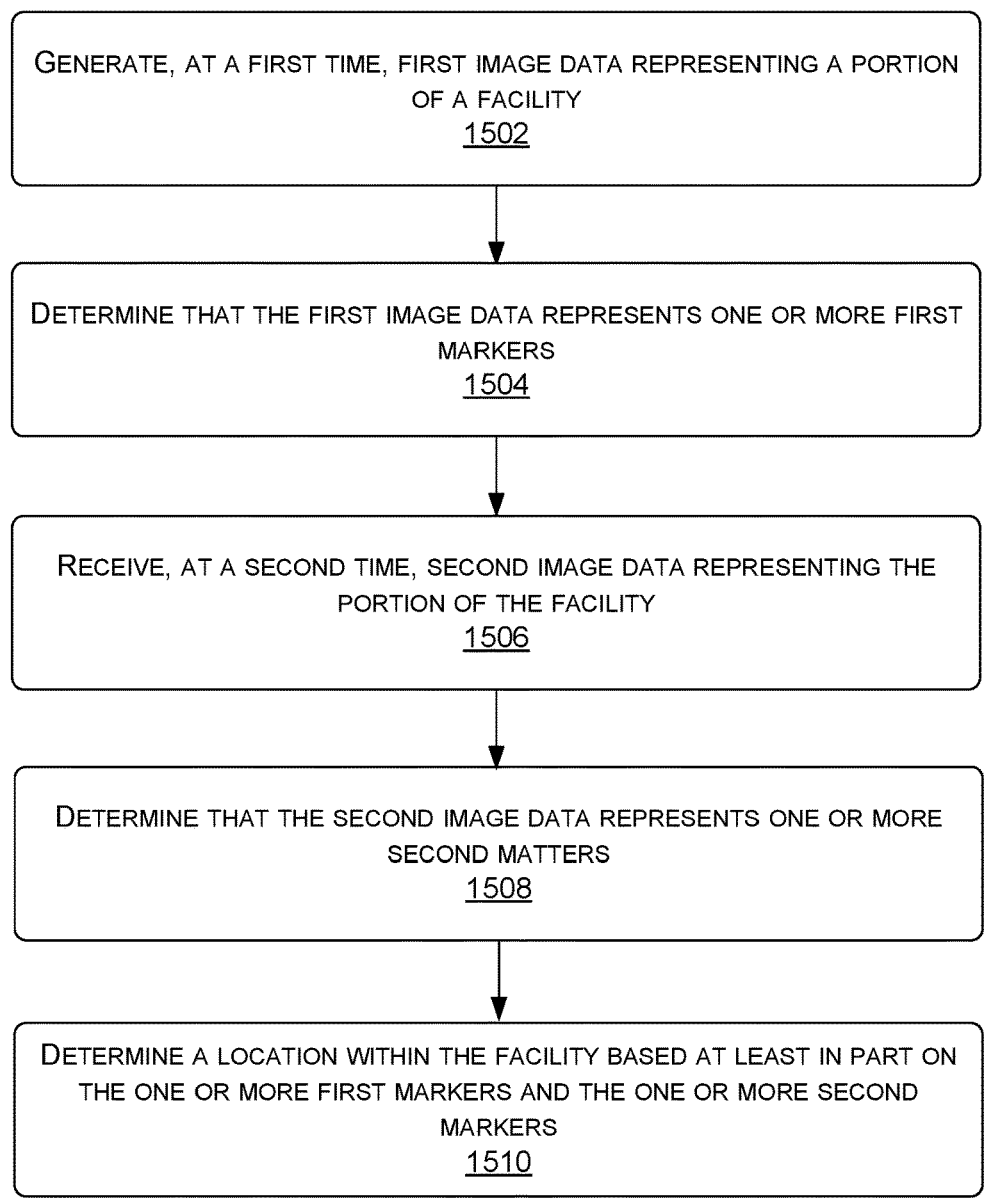
FIG. 15 illustrates a flow diagram of an example process for analyzing image data in order to determine a location of a mobile apparatus within a facility, in accordance with examples of the present disclosure.

FIGS. 14 and 15 illustrates processes performed by the mobile apparatus 102 using sensors. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 14 illustrates a flow diagram of an example process 1400 for determining a weight of an item added to the mobile apparatus 102, in accordance with examples of the present disclosure. At 1402, the process 1400 may include receiving, at a first time, first sensor data generated by one or more weight sensors. For instance, the mobile apparatus 102 may receive the first sensor data generated by the weight sensor(s) associated with the basket 110 or the weight sensor(s) associated with the tray 140. In some examples, the mobile apparatus 102 receives the sensor data continuously. In some examples, the mobile apparatus 102 receives the sensor data at the elapse of given time periods. Still, in some examples, the mobile apparatus 102 receives the sensor data based on an event being detected by the mobile apparatus 102. The event may include, but is not limited to, the mobile apparatus 102 stopping, the mobile apparatus 102 beginning to move, an item being added to the mobile apparatus 102, an item being removed from the mobile apparatus 102, a user rummaging through the item(s) added to the mobile apparatus 102, the mobile apparatus 102 receiving an input associated with an item that is priced per unit weight, and/or the like.

At 1404, the process 1400 may include determining a first weight based at least in part on the first sensor data. For instance, the mobile apparatus 102 may analyze the first sensor data in order to determine the first weight. In some examples, such as when the mobile apparatus 102 includes multiple loadcells, the mobile apparatus 102 may analyze the first sensor data to determine a respective weight measured by each loadcell. The mobile apparatus 102 may then determine the first weight using the respective weights. For example, the mobile apparatus 102 may determine the first weight by adding all of the respective weights together.

At 1406, the process 1400 may include receiving, at a second time, second sensor data generated by the one or more weight sensors. For instance, the mobile apparatus 102 may receive the second sensor data generated by the weight sensor(s) associated with the basket 110 or the weight sensor(s) associated with the tray 140. In some examples, the mobile apparatus 102 receives the second sensor data directly after receiving the first sensor data (e.g., when the mobile apparatus 102 continuously receives the sensor data). In some examples, the mobile apparatus 102 receives the second sensor data at the elapse of a given time period after receiving the first sensor data. Still, in some examples, the mobile apparatus 102 receives the second sensor data based on an additional event being detected by the mobile apparatus 102.

At 1408, the process 1400 may include determining a second weight based at least in part on the second sensor data. For instance, the mobile apparatus 102 may analyze the second sensor data in order to determine the second weight. In some examples, such as when the mobile apparatus 102 includes multiple loadcells, the mobile apparatus 102 may analyze the second sensor data to determine a respective weight measured by each weight loadcell. The mobile apparatus 102 may then determine the second weight using the respective weights. For example, the mobile apparatus 102 may determine the second weight by adding all of the respective weights together.

At 1410, the process 1400 may include determining a third weight associated with an item based at least in part on the first weight and the second weight. For instance, the mobile apparatus 102 may determine the third weight using the first weight and the second weight. In some examples, the mobile apparatus 102 determines the third weight as a difference between the second weight and the first weight.

The mobile apparatus 102 may then identify the item associated with the third weight. In some examples, the mobile apparatus 102 identifies the item using one or more additional sensors, such as imaging devices of the mobile apparatus 102. In some examples, such as when the item is priced per unit weight, the mobile apparatus 102 may determine a price of the item using the third weight. For example, the mobile apparatus 102 may determine the price by multiplying the third weight by the price per unit weight.

In some examples, the mobile apparatus 102 may then perform one or more processes using the third weight associated with the item. For a first example, the mobile apparatus 102 may detect an event, such as the item being added to or removed from the mobile apparatus 102, using the third weight. For a second example, the mobile apparatus 102 may determine, using the third weight, a price of the item that is based on a price per unit weight associated with the item. For a third example, the mobile apparatus 102 may verify an identity of the item that the mobile apparatus 102 determined using one or more other techniques, such as analyzing image data. Still, for a fourth example, the mobile apparatus 102 may determine a number of units of the item that were added to or removed from the mobile apparatus 102 using the third weight and a weight per unit of the item.

At 1412, the process 1400 may include storing event data representing the third weight associated with the item. For instance, the mobile apparatus 102 may generate event data (e.g., virtual shopping cart data) representing at least the identifier associated with the item and the third weight of the item. In some examples, the event data may further represent the price of the item, such as when the item is priced per unit weight. Additionally, the mobile apparatus 102 may provide information to a user of the mobile apparatus 102. For example, the mobile apparatus 102 may display the identifier associated with the item, the third weight of the item, the price of the item, and/or any other type of information to the user.

FIG. 15 illustrates a flow diagram of an example process 1500 for analyzing image data in order to determine a location of the mobile apparatus 102 within a facility, in accordance with examples of the present disclosure. At 1502, the process 1500 may include generating, at a first time, first image data representing a portion of a facility and at 1504, the process 1500 may include determining that the first image data represents one or more first markers. For instance, the mobile apparatus 102 may use a capture assembly to generate the first image data. In some examples, the portion of the facility is a ceiling of the facility while, in other examples, the portion of the facility is a different part of the facility (e.g., a wall, a floor, etc.). The mobile apparatus 102 may then analyze the first image data to determine that the first image data represents the first marker(s). The first marker(s) may be associated with a first location within the facility.

At 1506, the process 1500 may include generating, at a second time, second image data representing the portion of the facility and at 1508, the process 1500 may include determining that the second image data represents one or more second markers. For instance, the mobile apparatus 102 may use the capture assembly to generate the second image data. The mobile apparatus 102 may then analyze the second image data to determine that the second image data represents the second marker(s). The second marker(s) may be associated with a second location within the facility.

At 1510, the process 1500 may include determining a location within the facility based at least in part on the one or more first markers and the one more second markers. For instance, the mobile apparatus 102 may determine the location using the first marker(s) and the second marker(s). In some examples, the mobile apparatus 102 may determine the location based on detecting the second marker(s) after detecting the first marker(s). In some examples, the mobile apparatus 102 may determine the location based on the markers that are included in the first marker(s) and the second marker(s).

Figure 16:
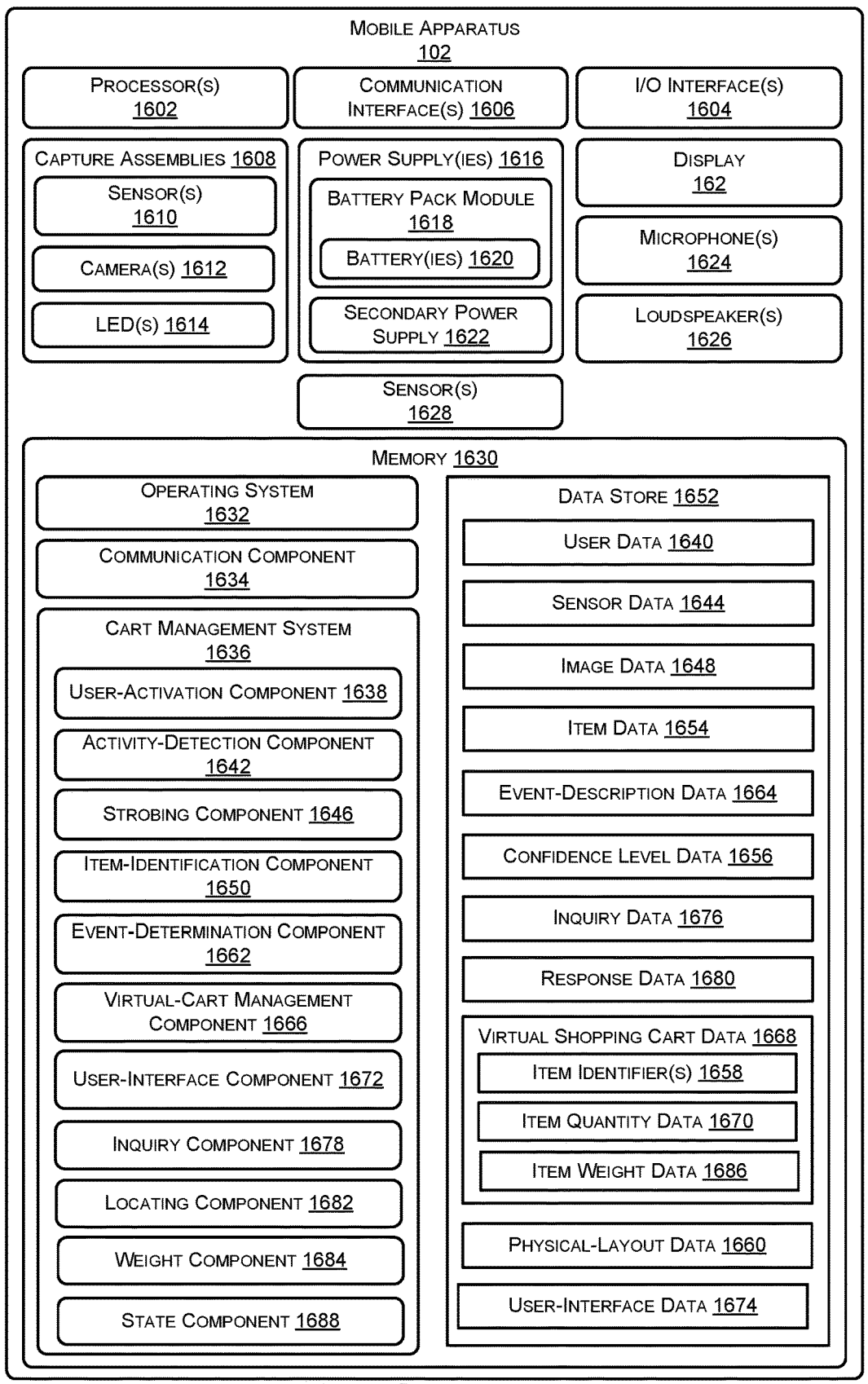
FIG. 16 illustrates example components of the mobile apparatus configured to support at least a portion of functionality of an item management system, in accordance with examples of the present disclosure.

FIG. 16 illustrates example components of the mobile apparatus 102 configured to support at least a portion of the functionality of an item management system. The mobile apparatus 102 may include one or more hardware processors 1602 (processors) (which may represent, and/or include, the processor(s) 1202) configured to execute one or more stored instructions. The processor(s) 1602 may comprise one or more cores. The mobile apparatus 102 may include one or more I/O interface(s) 1604 (which may represent, and/or include, the I/O interface(s) 1202) to allow the processor(s) 1602 or other portions of the mobile apparatus 102 to communicate with other devices. The I/O interface(s) 1604 may comprise Inter-Integrated Circuit (I2C), Serial Peripheral Interface bus (SPI), Universal Serial Bus (USB) as promulgated by the USB Implementers Forum, and so forth. The I/O interface(s) 1604 may allow the various modules/components to communicate with each other and/or control each other.

The mobile apparatus 102 may also include one or more communication interfaces 1606 (which may represent, and/or include, the communication interface(s) 1206). The communication interface(s) 1606 are configured to provide communications between the mobile apparatus 102 and other devices, such as the server(s), sensors, interface devices, routers, and so forth. The communication interface(s) 1606 may include devices configured to couple to personal area networks (PANs), wired and wireless local area networks (LANs), wired and wireless wide area networks (WANs), and so forth. For example, the communication interfaces 1606 may include devices compatible with Ethernet, Wi-Fi™, and so forth. The mobile apparatus 102 may also include one or more busses or other internal communications hardware or software that allow for the transfer of data between the various modules and components of the mobile apparatus 102.

The mobile apparatus 102 may also include the one or more capture assemblies 1608 (which may represent, and/or include, the one or more capture assemblies 1208) that each include one or more sensors 1610, a camera 1612, and one or more LEDs 1614. In some examples, the sensor(s) 1610 may comprise any type of sensor that is able to detect the presence of nearby objects without the need for physical contact (e.g., ToF sensor(s), PIR sensor(s), capacitive sensor(s), etc.). The cameras 1612 in each of the capture assemblies 1608 may comprise any type of camera or imaging device configured to generate image data (and/or video data), or information descriptive of a plurality of picture elements or pixels. The LED(s) 1614 may be selectively activated to emit light at any wavelength, visible or non-visible to users. In some examples, one or more capture assemblies 1608 may additionally, or alternatively, be facing downward into the basket 110 of the mobile apparatus 102. Additionally, the mobile apparatus 102 may include one or more cameras 1612 that are outward facing in that generate image data representing the facility around the mobile apparatus 102.

The mobile apparatus 102 may include one or more power supply(ies) 1616 to provide power to the components of the mobile apparatus 102, such as a battery pack module 1618 (e.g., the battery 602), which include one or more batteries 1620. The power supply(ies) 1616 may also include a secondary (e.g., internal) power supply 1622 to allow for hot swapping of battery pack modules 1618, such as one or more capacitors, internal batteries, etc.

The mobile apparatus 102 may also include the display 162 configured to display content represented by image data, such as pictures, videos, user interface elements, and/or any other image data. The display 162 may comprise any type of display 162, and may further be a touch screen to receive touch input from a user. The mobile apparatus 102 may also include one or more microphones 1624 (which may represent, and/or include, the microphone(s) 1224) and one or more loudspeakers 1626 (which may represent, and/or include, the loudspeaker(s) 1226) to facilitate a dialogue with a user, and/or to receive feedback from the user. The microphone(s) 1624 may capture sound representing the user's speech, and the loudspeaker(s) 1626 may output machine-generated words to facilitate a dialogue, prompt a user for feedback on an item and/or for other information, and/or output other alerts or notifications.

The mobile apparatus 102 may also include other types of sensor(s) 1628 (which may represent, and/or include, the sensor(s) 1228). As described herein, these sensor(s) may include weight sensor(s) with loadcell(s), where, in some examples, the loadcell(s) are located between the basket 110 and the chassis 108.

The mobile apparatus 102 may include one or more memories 1630 (which may represent, and/or include, the memory 1220). The memory 1630 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1630 provides storage of computer-readable instructions, data structures, program modules, and other data for the operation of the mobile apparatus 102. A few example functional modules are shown stored in the memory 1630, although the same functionality may alternatively be implemented in hardware, firmware, or as a system on a chip (SOC).

The memory 1630 may include at least one operating system (OS) component 1632. The OS component 1632 is configured to manage hardware resource devices such as the I/O interface(s) 1604, the communication interface(s) 1606, and provide various services to applications or components executing on the processor(s) 1602. The OS component 1632 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1630. These components may be executed as foreground applications, background tasks, daemons, and so forth. A communication component 1634 may be configured to establish communications with one or more of the sensors, one or more of the servers, or other devices. The communications may be authenticated, encrypted, and so forth.

The memory 1630 may further store a cart management system 1636. The cart management system 1636 is configured to provide the item-identifying functions (and other functions) provided by the mobile apparatus 102 as described herein. For example, the cart management system 1636 may be configured to detect items, identify items, and maintain a virtual shopping cart for a user of the mobile apparatus 102.

The cart management system 1636 may include a user-activation component 1638 that performs operations for activating a shopping session using the mobile apparatus 102 on behalf of a user. For instance, a user may have previously registered for a user account with an operator of the facility to utilize various automated management services provided by an operator of the facility. The user may have registered for a user account, such as by providing user data 1640, to automate payments made for items taken by the user and included a payment means (e.g., credit card, bank account number, etc.), and may have also provided an identification means in the user data 1640 to the user-activation component 1638 such that the mobile apparatus 102 can recognize the user. For instance, the user may have registered to identify themselves to the mobile apparatus 102 using any identification technique by the user-activation component 1638, such as by providing the user data 1640 by presenting an identification means to a camera/scanner 1612 (e.g., presenting a driver's license, presenting a facility-issued card, presenting a user identifier via a mobile phone, etc.), and/or speaking a predefined utterance that is captured by the microphone(s) 1624 (e.g., a name of the user, a predefined keyword, etc.). Once a user has identified themselves using the user-activation component 1638, the user-activation component 1638 may open a shopping session where the mobile apparatus 102 identifies and track items retrieved by the user and placed in the mobile apparatus 102.

The cart management system 1636 may additionally include an activity-detection component 1642 configured to detect items (or objects) within a particular proximity to the mobile apparatus 102. For example, the capacitive sensor(s) 1628 may generate sensor data 1644. The activity-detection component 1642 may then analyze the sensor data 1644 in order to determine a capacitance detected by the capacitive sensor(s) 1628. Additionally, the activity-detection component 1642 may use the capacitance to perform one or more of the processes described herein to detect the presence of a user. For example, the activity-detection component 1642 may use the capacitance to determine if the user is located proximate to the mobile apparatus 102, the user is located over the perimeter of the mobile apparatus 102, determine if the user is located within the opening of the mobile apparatus 102, determine if the user is in contact with the cart, and/or the like.

The cart management system 1636 may further include a strobing component 1646 configured to cause the LED(s) 1614 and/or shutters of the camera(s) 1612 to strobe according to different frequencies. As noted above, the LED(s) 1614 may emit light in any light spectrum (e.g., infrared, near infrared, visible, etc.). However, some items may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 1614 to emit light in the visible spectrum. When generating image data 1648 using camera(s) 1612, motion blur may appear when capturing fast moving objects. However, the motion blur may be reduced or eliminated by exposing the camera(s) 1612 imager for a short (e.g., sub-millisecond) durations. Accordingly, the strobing component 1646 may strobe the opening and closing of shutters of the camera(s) 1612 to limit the sensor exposure duration. Additionally, the strobing component 1646 may cause the LEDs 1614 to emit/strobe light at a particular frequency.

The cart management system 1636 may also include an item-identification component 1650 configured to analyze image data 1648 to identify an item represented in the image data 1648. The image data 1648 may comprise information descriptive of a plurality of picture elements, or pixels, for one or more image frames (e.g., a still picture, multiple picture frames, video frames, etc.). The item-identification component 1650 may analyze the image data 1648 using various image processing techniques, or computer vision techniques. For instance, the item-identification component 1650 may extract a representation of an item depicted in the image data 1648 generated by at least one of the camera(s) 1612. The representation may include identifying text printed on the item, colors or color schemes printed on the item, 2-D and/or 3D shapes of the item, and/or other techniques for extract a representation of the item. In some instances, the representation of the item depicted in the image data 1648 may comprise a numeric representation, such as a feature vector or a set of feature vectors.

In some examples, a data store 1652 stored in the memory 1630 may include item data 1654, which may include representations of the items offered for acquisition at the facility. The item-identification component 1650 may compare the extracted represented of the item with the "gallery" or stored representations of the known items in the item data 1654. In some instance, the item representation may include an indication of a barcode or SKU data for the item as recognized in, or extracted from, the image data 1648. The item-identification component 1650 may determine confidence level data 1656 based on the comparisons with item representation in the item data 1654. The item-identification component 1650 may determine, and assign, confidence levels indicating how likely it is that the item represented in the image data 1648 corresponds to an item from the item gallery in the item data 1654. Based on the confidence level data 1656, the item-identification component 1650 may determine an item identifier 1658 for the item in the image data 1648 (or multiple item identifiers 1658) that corresponds to an item in the item data 1654 to which the item corresponds.

In some examples, the data store 1652 may include physical-layout data 1660 that is used by the item-identification component 1650 to determine the item. The physical-layout data 1660 may include or provide a mapping of physical locations within the physical layout of devices and objects such that the location of the mobile apparatus 102 may be utilized to determine an item stored nearby. The physical-layout data 1660 may indicate the coordinates within the facility of an inventory location, items stored at that inventory location, and so forth. In examples where the mobile apparatus 102 has location determining sensors (e.g., GPS, RFID, proximity, etc.), the location sensor data may be used to determine where in the store the user is located. In such examples, the item-identification component 1650 may access the physical-layout data 1660 to determine if a location associated with the event is associated with a location, and confidence levels for the corresponding representations of items in the item data 1654. Continuing the example above, given the location within the facility of the event and image camera data, the physical-layout data 1660 may determine the items that may have been represented in generated images of the event.

The cart management system 1636 may further include an event-determination component 1662 to determine event-description data 1664 for the item in the image data 1648.

The event-determination component 1662 may determine if the user is adding an item to the mobile apparatus 102, removing the item from the mobile apparatus 102, etc., based on movement of the item and/or whether the item is shown in the image data 1648. For instance, if the item is shown as being moved downward towards the interior of the mobile apparatus 102, and the user's hand then leaves the basket without the item, it can be determined that the user added the item to the mobile apparatus 102. Similarly, if the user's hand moves into the cart without an item, and is depicted in the image data 1648 taking an item from the cart, the event-determination component 1662 may determine that the user removed an item from the mobile apparatus 102.

The cart management system 1636 may also include a virtual-cart management component 1666 configured to manage virtual shopping cart data 1668 for the mobile apparatus 102. For instance, the virtual-cart management component 1666 may utilize the item data 1654, event-description data 1664, and confidence level data 1656 to add item identifier(s) 1658 to the virtual shopping cart data 1668 for items that were added to the mobile apparatus 102, remove item identifier(s) 1658 from the virtual shopping cart data 1668 for items that were removed from the mobile apparatus 102, and track item quantity data 1670 indicating quantities of particular items in the mobile apparatus 102.

The cart management system 1636 may further include a user-interface component 1672 configured to present user interfaces on the display 132 based on user-interface data 1674. The user interfaces may include one or more fields to present data, and/or receive touch input (or other input via a keyboard, mouse, etc.) from a user. For instance, if the item-identification component 1650 is unable to determine an item identifier 1658 for an item shown in the image data 1648, the user-interface component 1672 may receive inquiry data 1676 generated by an inquiry component 1678 to prompt a user for feedback to help identify the item, and/or other information (e.g., if multiple items were placed in the mobile apparatus 102). The inquiry component 1678 may be configured to generate inquiry data 1676 based on the information needed to identify the item. For instance, the inquiry data 1676 may include a prompt to request particular feedback from the user, such as to provide input (e.g., touch input, vocal/utterance input, etc.) to identify the item, input to indicate how many items were added to the mobile apparatus 102, input to indicate whether an item was removed or added, etc. In some examples, the user-interface component 1672 may present one or more images depicting items from the item data 1654 that have the highest confidence levels as corresponding to the item 126 in the image data 1648, but confidence levels that are not high enough to make a final decision as to the item. For instance, the user-interface component 1672 may present pictures of two different items that have high confidence levels and request that the user select or indicate the appropriate item. Additionally, or alternatively, the user-interface component 1672 may present user-interface data 1674 that prompts the user for feedback regarding whether or not the item was added to, or removed from the mobile apparatus 102. The user-interface component 1672 may then receive response data 1680 representing a selection of an item.

In some examples, the cart management system 1636 may further include a locating component 1682 configured to determine locations of the mobile apparatus 102 in the facility. For instance, the locating component 1682 may analyze sensor data 1644 collected by sensors of the mobile apparatus 102 to determine a location. In some examples, the communication interface(s) 1606 may include network interfaces that configured the mobile apparatus 102 to receive or detect wireless signals (e.g., WiFi signals, Bluetooth signals, etc.) and generate sensor data 1644 indicative of the signals. The locating component 1682 may analyze the sensor data 1644 using various techniques to identify the location of the mobile apparatus 102, such as WiFi triangulation, received signal strength indicators (RSSI), and/or other methods for analyzing wireless signals to determine a location of the mobile apparatus 102. In some instances, the facility may include various infrared (IR) or near-IR emitters at different locations that emit light according to frequencies, patterns, etc. that indicate the different locations in the facility. In such examples, the mobile apparatus 102 may include a light sensor to generate the sensor data 1644 representing the IR or NIR and determine the location of the mobile apparatus 102 in the facility. In some instances, there may be visible landmarks or markers throughout the facility that indicate a location in the facility, and the locating component 1682 may analyze image data 1648 generated by an outward facing camera 1612 to determine a location of the mobile apparatus 102. As another example, there may be various radio frequency (RF) emitters positioned throughout the store, and the mobile apparatus 102 may include an RF receiver to allow the locating component 1682 to perform IR beaconing to determine the location of the mobile apparatus 102. The locating component 1682 may perform one, or any combination, of the above techniques to determine a location of the mobile apparatus 102 in the facility and/or any other technique known in the art.

The locating component 1682 may perform various operations based on determining the location of the mobile apparatus 102 within the facility. For instance, the locating component 1682 may cause user-interface data 1674 to be presented on the display 132 that includes a map of the facility and/or directions to an item for the user of the mobile apparatus 102. Additionally, or alternatively, the locating component 1682 may utilize the location of the cart, the physical-layout data 1660, and/or item data 1654 and "push" user interfaces to the display 132 that indicate various location-based information, such as indications of deals for items located nearby, indications of items located nearby and on the user's shopping list, and/or other user-interface data 1674.

As further illustrated in the example of FIG. 16, the mobile apparatus 102 may include a weight component 1684 that is configured to determine weight(s) of item(s) located within the basket 110, located within the shelf 124, and/or located on the tray 140. For a first example, the weight component 1684 may receive sensor data 1644 generated by sensor(s) 1628, where the sensor(s) 1628 include the load-cell(s) of the weight sensor associated with the basket 110. The weight component 1684 may then be configured to analyze the sensor data 1644 in order to determine a weight associated with the basket 110 (and/or the shelf 124). For example, the weight component 1684 may be configured to analyze the sensor data 1644 in order to determine the respective weight measured by each of the loadcell(s). When the weight sensor includes more than one loadcell, the weight component 1684 may then be configured to determine the weight associated with the basket 110 (and/or the shelf 124) using the determined weights. For example, the weight sensor may determine the weight associated with the basket 110 (and/or the shelf 124) by adding each of the determined weights together.

For a second example, the weight component 1684 may receive sensor data 1644 generated by sensor(s) 1628, where the sensor(s) 1628 include the loadcell(s) of the weight sensor associated with the tray 140. The weight component 1684 may then be configured to analyze the sensor data 1644 in order to determine a weight associated with the tray. For example, the weight component 1684 may be configured to analyze the sensor data 1644 in order to determine the respective weight measured by each of the loadcell(s). Again, when the weight sensor includes more than one loadcell, the weight component 1684 may then be configured to determine the weight associated with the tray 140 using the determined weights. For example, the weight sensor may determine the weight associated with the tray 140 by adding each of the determined weights together.

The weight component 1684 may use these weights to determine the weight of the item placed within the basket 110, located within the shelf 124, and/or located on the tray 140. For example, the weight component 1684 may perform the processes above in order to determine a first weight associated with the basket 110 (and/or the shelf 124) at a first time. The weight component 1684 may then perform the processes above in order to determine a second weight associated with the basket 110 (and/or the shelf 124) at a second, later time. In some examples, the weight component 1684 receives the sensor data 1644 and/or determines the weights at the elapse of given time periods (e.g., every second, two seconds, five seconds, etc.). In some examples, the weight component 1684 receives the sensor data 1644 and/or determines the weights based on detecting that an item has been placed within the basket 110 (and/or the shelf 124), such as based on the output from the activity-detection component 1642, the item-identification component 1650, and/or the event-determination component 1662. In either example, the weight component 1684 may use the first weight and the second weight to determine the weight of the item.

For example, the weight component 1684 may determine whether the second weight is greater than the first weight. If the weight component 1684 determines that the second weight substantially equal to the first weight, then the weight component 1684 may determine that a new item has not been placed within the basket 110 (and/or the shelf 124). However, if the weight component 1684 determines that the second weight greater than the first weight, then the weight component 1684 may determine that a new item has been placed within the basket 110 (and/or the shelf 124). In some examples, the weight component 1684 may then determine the weight of the item using the weights, such as by taking the difference between the second weight and the first weight.

Additionally, or alternatively, in some examples, the weight component 1684 may use the first weight and the second weight to determine that an item has been removed from the basket 110 (and/or the shelf 124). For example, the weight component 1684 may determine that the second weight is less than the first weight. Based on the determination, the weight component 1684 may determine that an item has been removed from the basket 110 (and/or the shelf 124). In some examples, the weight component 1684 may then determine the weight of the item using the weights, such as by taking the difference between the first weight and the second weight. Additionally, if the mobile apparatus 102 already knows the weights of each of the items, the mobile apparatus 102 may determine which item was removed by matching the weight of the item removed to the weight of one of the items within the basket 110 (and/or the shelf 124).

While the examples above describe determining the weights of items placed within and/or removed from the basket 110 (and/or the shelf 124), in other examples, the weight component 1684 may perform similar processes to determine the weights of items placed on the tray 140.

In some examples, the weight component 1684 (and/or another component) may perform one or more processes using the weights associated with the items. For a first example, if an item is priced per unit weight, then the weight component 1684 (and/or another component) may determine a price of the item using the weight and the price per unit weight. For instance, the weight component 1684 may determine the price as the weight of the item multiplied by the price per unit weight. In such examples, the item data 1054 may represent the price per unit weight of the item. For instance, if the price per unit weight of the item is $1.00 for every pound, and the measured weight of the item is 10 pounds, then the weight component 1684 may determine that the price of the item is $10.00. When performing processes for determining the price of the item using the weight, the mobile apparatus 102 may initially confirm that the weight of the item is accurate. For instance, the mobile apparatus 102 may use a sensor 1628, such as an IMU sensor, to verify that the mobile apparatus 102 is stationary and/or located on a flat surface before performing the processes of determining the weight of the item. By verifying that the mobile apparatus 102 is stationary and/or on a flat surface, the mobile apparatus 102 may be configured to determine a more accurate weight of the item.

For a second example, the weight component 1684 (and/or another component, such as the item-identification component 1650) may verify an item that has been added to or removed from the mobile apparatus 102. For instance, and as discussed above, the item-identification component 1650 may determine an initial identity of an item, such as by analyzing image data generated by one or more of the capture assemblies 1608, using one or more of the processes described herein. The weight component 1684 may then determine a weight of an item added to the mobile apparatus 102. Additionally, the weight component 1684 (and/or another component, such as the item-identification component 1650) may use the weight to verify the initial identity of the item. For instance, the item data 1654 may represent the expected weights of items, such as the weight of the item. The weight component 1684 (and/or the other component) may then compare the weight of the first item as represented by the item data 1654 to the weight of the item as measured by the weight sensor(s). The weight component 1684 (and/or the other component) may then verify the identity of the item when the measured weight is within a threshold percentage to the weight represented by the item data 1654, or the weight component 1684 (and/or the other component) may not verify the identity of the item when the measured weight is outside of the threshold weight. The threshold may include, but is not limited to, 0.1%, 0.5%, 1%, and/or any other percentage. When performing such processes, the weight component 1684 (and/or the other component) are able to verify the identities of items add to the mobile apparatus 102 and/or items removed from the mobile apparatus 102.

For a third example, the weight component 1684 (and/or another component) may determine a number of items added to the mobile apparatus 102. For instance, the item-identification component 1650 may again determine an identity of item(s) added to the mobile apparatus 102 while the weight component 1684 determines the weight of the item(s). The weight component 1684 (and/or the other component) may then determine the number of the item(s) added to the mobile apparatus 102. For instance, the weight component 1684 (and/or the other component) may use the item data 1654 to determine the weight per unit item associated with the identified item(s). The weight component 1684 (and/or the other component) may then determine the number of items using the measured weight and the weight per unit item. In some instances, the weight component 1684 (and/or the other component) may determine the number of items by dividing the measured weight by the weight per unit item. For instance, if the weight per unit item is 1 pound per unit item and the measured weight is 10 pounds, then the weight component 1684 (and/or the other component) may determine that the number of items is 10 items.

In some examples, the virtual-cart management component 1606 may be configured to generate item weight data 1686 representing the weight of the items, which the virtual-cart management component 1606 may store as part of the virtual shopping cart data 1668. Additionally, in some examples, the item data 1654 may represent the price per unit weight of the item and/or the number of items. The mobile apparatus 102 may then be configured to provide the price of the item to the user, such as using the display 162.

As further illustrated in FIG. 16, the mobile apparatus 102 may include a state component 1688. As described herein, the mobile apparatus 102 may include sensor(s) 1628 (which may represent, and/or include, the sensors 310) to determine when a user is located proximate to the mobile apparatus 102, when a user is not located proximate to the mobile apparatus 102, when the mobile apparatus 102 is not nested, when the mobile apparatus 102 is nested, and/or the like. Additionally, the mobile apparatus 102 may switch between states based on these determinations. For example, the mobile apparatus 102 may operate in a first state when a user is located proximate to the mobile apparatus 102 and/or when the mobile apparatus 102 is not nested. Additionally, the mobile apparatus 102 may operate in a second, different state when a user is not located proximate to the mobile apparatus 102 and/or when the mobile apparatus 102 is nested. As such, the state component 1688 may be configured to cause the mobile apparatus to switch between the states.

In some examples, the mobile apparatus 102 may use more power when operating in the first state than when operating in the second state. For example, when operating in the first state, the mobile apparatus 102 may activate at least a majority of the components of the mobile apparatus 102, such as the display 162, the capture assemblies 1608, the sensor(s) 1628, the communication interface(s) 1606, the microphone(s) 1624, the loudspeaker(s) 1626, and/or the like. Additionally, when operating in the second state, the mobile apparatus 102 may deactivate one or more components of the mobile apparatus 102, such as the display 162, the capture assemblies 1608, the sensor(s) 1628, the communication interface(s) 1606, the microphone(s) 1624, the loudspeaker(s) 1626, and/or the like. By deactivating the one or more components, the mobile apparatus 102 may use less power when operating in the second state.

Figure 17:
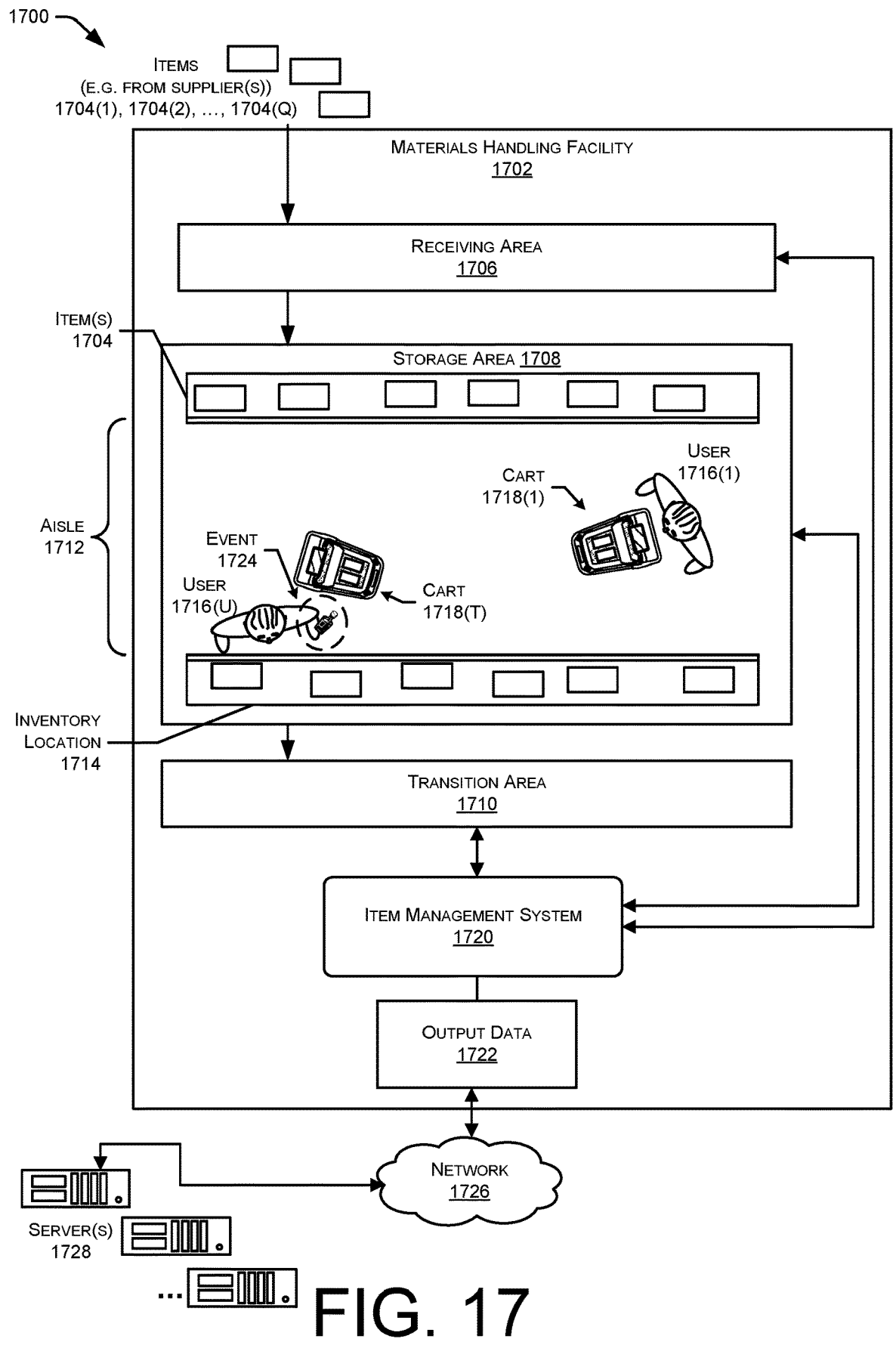
FIG. 17 is a block diagram of an example materials handling facility that includes carts and an item management system configured to generate output regarding events occurring in the cart using sensor data, in accordance with examples of the present disclosure.

FIG. 17 is a block diagram 1700 of an example materials handling facility 1702 (also referred to the "facility 1702") that includes carts and an item management system configured to generate output regarding events occurring in the cart using sensor data. However, the following description is merely one illustrative example of an industry and environment in which the techniques described herein may be utilized.

An example of the facility 1702 configured to store and manage inventory items is illustrated in FIG. 17. The facility 1702 comprises one or more physical structures or areas within which one or more items 1704(1), 1704(2), . . . , 1704(Q) (generally denoted as 1704) may be held. As used in this disclosure, letters in parenthesis such as "(Q)" indicate an integer result. The items 1704 comprise physical goods, such as books, pharmaceuticals, repair parts, electronic gear, groceries, and so forth.

The facility 1702 may include one or more areas designated for different functions with regard to inventory handling. In this illustration, the facility 1702 includes a receiving area 1706, a storage area 1708, and a transition area 1710. The receiving area 1706 may be configured to accept items 1704, such as from suppliers, for intake into the facility 1702. For example, the receiving area 1706 may include a loading dock at which trucks or other freight conveyances unload the items 1704.

The storage area 1708 is configured to store the items 1704. The storage area 1708 may be arranged in various physical configurations. In one example, the storage area 1708 may include one or more aisles 1712. The aisles 1712 may be configured with, or defined by, inventory locations 1714 on one or both sides of the aisle 1712. The inventory locations 1714 may include one or more of shelves, racks, cases, cabinets, bins, floor locations, or other suitable storage mechanisms for holding or storing the items 1704. The inventory locations 1714 may be affixed to the floor or another portion of the facility's structure, or may be movable such that the arrangements of aisles 1712 may be reconfigurable. In some examples, the inventory locations 1714 may be configured to move independently of an outside operator. For example, the inventory locations 1714 may comprise a rack with a power source and a motor, operable by a computing device to allow the rack to move from one location within the facility 1702 to another.

One or more users 1716(1), . . . , 1716(U), carts 1718(1), . . . , 1718(T) (generally denoted as 1718) or other material handling apparatus may move within the facility 1702. For example, the users 1716 may move about within the facility 1702 to pick or place the items 1704 in various inventory locations 1714, placing them on the carts 1718 for ease of transport. An individual cart 1718 is configured to carry or otherwise transport one or more items 1704. For example, a cart 1718 may include a basket, a cart, a bag, and so forth. In other examples, other agencies such as robots, forklifts, cranes, aerial drones, and so forth, may move about the facility 1702 picking, placing, or otherwise moving the items 1704.

One or more sensors may be configured to acquire information in the facility 1702. The sensors in the facility 1702 may include sensors fixed in the environment (e.g., ceiling-mounted cameras) or otherwise, such as sensors in the possession of users (e.g., mobile phones, tablets, etc.) or sensors mounted on the carts 1718. The sensors may include, but are not limited to, cameras, weight sensors (e.g., in the bottom of the carts 1718), radio frequency (RF) receivers, temperature sensors, humidity sensors, vibration sensors, and so forth. The sensors may be, in some examples, in or on the cart 1718 or another location in the facility 1702. In one example, the bottom of a basket of the carts 1718 may include weight sensors configured to determine a weight of the items 1704 placed thereupon.

During operation of the facility 1702, the sensors may be configured to provide information suitable for identifying the movement of items 1704 or other occurrences within the cart 1718. For example, a series of images acquired by a camera may indicate removal of an item 1704 from a particular cart 1718 by one of the users 1716 and/or placement of the item 1704 on or at least partially within one of the carts 1718.

While the storage area 1708 is depicted as having one or more aisles 1712, inventory locations 1714 storing the items 1704, sensors, and so forth, it is understood that the receiving area 1706, the transition area 1710, or other areas of the facility 1702 may be similarly equipped. Furthermore, the arrangement of the various areas within the facility 1702 is depicted functionally rather than schematically. For example, multiple different receiving areas 1706, storage areas 1708, and transition areas 1710 may be interspersed rather than segregated in the facility 1702.

The carts 1718 and/or the inventory location 1714 may include, or be coupled to, an item management system 1720. The item management system 1720 is configured to identify interactions with and between users 1716, carts 1718, and/or the inventory location 1714, in one or more of the receiving area 1706, the storage area 1708, or the transition area 1710. These interactions may include one or more events 1724. For example, events 1724 may include placing of an item 1704 in a cart 1718, returning of an item 1704 from the cart 1718 to an inventory location 1714, placing an item 1704 on the inventory location 1714, removing an item 1704 from the inventory location 1714, and/or any of the other events described herein. Other events 1724 involving users 1716 may include the user 1716 providing authentication information in the facility 1702, using a computing device at the facility 1702 to authenticate identity to the item management system 1720, and so forth.

By determining the occurrence of one or more of the events 1724, the item management system 1720 may generate output data 1722. The output data 1722 comprises information about the event 1724. For example, where the event 1724 comprises an item 1704 being removed from, or placed in, a cart 1718, the output data 1722 may comprise an item identifier indicative of the particular item 1704 that was removed from, or placed in, the cart 1718, a quantity of the item 1704, a user identifier of a user that removed the item 1704, and/or other output data 1722.

The item management system 1720 may use one or more automated systems to generate the output data 1722. For example, an artificial neural network, one or more classifiers, or other automated machine learning techniques may be used to process the sensor data and/or image data from the one or more sensors to generate output data 1722. The automated systems may operate using probabilistic or non-probabilistic techniques. For example, the automated systems may use a Bayesian network. In another example, the automated systems may use support vector machines to generate the output data 1722 or the tentative results. The automated systems may generate confidence level data that provides information indicative of the accuracy or confidence that the output data 1722 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 175%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1704 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1716 may pick an item 1704(1) such as a perfume bottle that is generally cubical in shape from the inventory location 1714. Other items 1704 at nearby inventory locations 1714 may be predominately spherical. Based on the difference in shape (cube vs. sphere) from the adjacent items, and the correspondence in shape with the previously stored image of the perfume bottle item 1704(1) (cubical and cubical), the confidence level that the user 1716 has picked up the perfume bottle item 1704(1) is high.

In some situations, the automated techniques may be unable to generate output data 1722 with a confidence level above a threshold result. For example, the automated techniques may be unable to distinguish which item 1704 in large a group of items a user 1716 has picked up from the inventory location 1714 and placed in the cart 1718. In other situations, it may be desirable to provide human confirmation of the event 1724 or of the accuracy of the output data 1722. For example, some items 1704 may be deemed age restricted such that they are to be handled only by users 1716 above a minimum age threshold.

In instances where human confirmation is desired, sensor data associated with an event 1724 may be processed to generate inquiry data. The inquiry data may include a subset of the sensor data associated with the event 1724. The inquiry data may also include one or more of one or more tentative results as determined by the automated techniques, or supplemental data. The subset of the sensor data may be determined using information about the one or more sensors. The subset of the sensor data may include images that may show the item 1704 being placed in, or removed from, the cart 1718. The subset of the sensor data may also omit images from other cameras that did not have that item 1704 in the field of view. The field of view may comprise a portion of the scene in the cart 1718 that the camera is able to generate sensor/image data about.

Continuing the example, the subset of the sensor data may comprise a video clip acquired by one or more cameras having a field of view that includes the item 1704. The tentative results may comprise the "best guess" as to which items 1704 may have been involved in the event 1724. For example, the tentative results may comprise results determined by the automated system that have a confidence level above a minimum threshold.

The facility 1702 may be configured to receive different kinds of items 1704 from various suppliers and to store them until a customer orders or retrieves one or more of the items 1704. A general flow of items 1704 through the facility 1702 is indicated by the arrows of FIG. 17. Specifically, as illustrated in this example, items 1704 may be received from one or more suppliers, such as manufacturers, distributors, wholesalers, and so forth, at the receiving area 1706. In various examples, the items 1704 may include merchandise, commodities, perishables, or any suitable type of item 1704, depending on the nature of the enterprise that operates the facility 1702. The receiving of the items 1704 may comprise one or more events 1724 for which the item management system 1720 may generate output data 1722.

Upon being received from a supplier at receiving area 1706, the items 1704 may be prepared for storage. For example, items 1704 may be unpacked or otherwise rearranged. An inventory management system of the facility 1702 may include one or more software applications executing on a computer system to provide inventory management functions based on the events 1724 associated with the unpacking or rearrangement. These inventory management functions may include maintaining information indicative of the type, quantity, condition, cost, location, weight, or any other suitable parameters with respect to the items 1704. The items 1704 may be stocked, managed, or dispensed in terms of countable, individual units or multiples, such as packages, cartons, crates, pallets, or other suitable aggregations. Alternatively, some items 1704, such as bulk products, commodities, and so forth, may be stored in continuous or arbitrarily divisible amounts that may not be inherently organized into countable units. Such items 1704 may be managed in terms of measurable quantity such as units of length, area, volume, weight, time, duration, or other dimensional properties characterized by units of measurement. Generally speaking, a quantity of an item 1704 may refer to either a countable number of individual or aggregate units of an item 1704 or a measurable amount of an item 1704, as appropriate.

After arriving through the receiving area 1706, items 1704 may be stored within the storage area 1708. In some examples, like items 1704 may be stored or displayed together in the inventory locations 1714 such as in bins, on shelves, hanging from pegboards, and so forth. In this example, all items 1704 of a given kind are stored in one inventory location 1714. In other examples, like items 1704 may be stored in different inventory locations 1714. For example, to optimize retrieval of certain items 1704 having frequent turnover within a large physical facility 1702, those items 1704 may be stored in several different inventory locations 1714 to reduce congestion that might occur at a single inventory location 1714.

When a customer order specifying one or more items 1704 is received, or as a user 1716 progresses through the facility 1702, the corresponding items 1704 may be selected or "picked" from the inventory locations 1714 containing those items 1704. In various examples, item picking may range from manual to completely automated picking. For example, in one example, a user 1716 may have a list of items 1704 they desire and may progress through the facility 1702 picking items 1704 from inventory locations 1714 within the storage area 1708, and placing those items 1704 into a cart 1718. In other examples, employees of the facility 1702 may pick items 1704 using written or electronic pick lists derived from customer orders. These picked items 1704 may be placed into the cart 1718 as the employee progresses through the facility 1702. Picking may comprise one or more events 1724, such as the user 1716 in moving to the inventory location 1714, retrieval of the item 1704 from the inventory location 1714, and so forth.

After items 1704 have been picked, they may be processed at a transition area 1710. The transition area 1710 may be any designated area within the facility 1702 where items 1704 are transitioned from one location to another or from one entity to another. For example, the transition area 1710 may be a packing station within the facility 1702. When the item 1704 arrives at the transition area 1710, the items 1704 may be transitioned from the storage area 1708 to the packing station. Information about the transition may be maintained by the item management system 1720 using the output data 1722 associated with those events 1724.

In another example, if the items 1704 are departing the facility 1702 a list of the items 1704 may be used by the item management system 1720 to transition responsibility for, or custody of, the items 1704 from the facility 1702 to another entity. For example, a carrier may accept the items 1704 for transport with that carrier accepting responsibility for the items 1704 indicated in the list. In another example, a customer may purchase or rent the items 1704 and remove the items 1704 from the facility 1702.

The item management system 1720 may access or generate sensor data about the items 1704, the users 1716, the carts 1718, and so forth. The sensor data may be acquired by one or more of the sensors, data provided by other systems, and so forth. For example, the sensors may include cameras configured to acquire image data of items 1704 placed in the carts 1718. The image data may comprise still images, video, or a combination thereof. The image data may be processed by the item management system 1720 to determine an item identifier for the items 1704, a listing of items in the cart 1718 for a user 1716, and so forth. As used herein, the identity of the user of a cart 1718 may represent a unique identifier of the user (e.g., name, number associated with user, username, etc.), an identifier that distinguishes the user amongst other users being identified with the environment, or the like.

The item management system 1720, or systems coupled thereto, may be configured to identify the user 1716. In one example, this determination may comprise comparing sensor data with previously stored identity data. For example, the user 1716 may be identified by showing their face to a facial recognition system, by presenting a token carrying authentication credentials, providing a fingerprint, scanning a barcode or other type of unique identifier upon entering the facility, and so forth. Identity of the user 1716 may be determined before, during, or after entry to the facility 1702 and/or interaction with a cart 1718. Determination of the user's 1716 identity may comprise comparing sensor data associated with the user 1716 in the facility 1702 and/or with the cart 1718 to previously stored user data. In some examples, the output data 1722 may be transmitted over a network 1726 to server(s) 1728.

Separate instances of these programs can be executed on or distributed across any number of separate computer systems. Thus, although certain steps have been described as being performed by certain devices, software programs, processes, or entities, this need not be the case, and a variety of alternative examples will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A shopping cart comprising:
an upper frame;
a basket coupled to the upper frame, the basket comprising:
  a first bottom having a first perimeter; and
  first sides coupled to and extending upward from the first bottom, wherein the first bottom and the first sides at least partly define a first receptacle of the basket to hold at least a first item;
one or more first weight sensors disposed below a first surface of the first bottom;
a shelf coupled to and extending substantially horizontally from a back portion of the first bottom, the shelf comprising;
  a second bottom having a second perimeter; and
  second sides coupled to and extending upward from the second bottom, wherein the second bottom and the second sides at least partly define a second receptacle of the shelf to hold at least a second item;
a user-facing module, the user-facing module comprising:
  a first camera oriented substantially towards the first receptacle of the basket; and
  a second camera oriented substantially towards the second receptacle of the shelf;
a substantially vertical member extending substantially downward from the upper frame and to a top of a wheel frame;
a tray coupled to the wheel frame;
one or more second weight sensors disposed below a second surface of the tray; and
wheel castors coupled to a bottom of the wheel frame.

2. The shopping cart as recited in claim 1, the user-facing module further comprising:
one or more processors; and
one or more computer-readable media storing instructions that, when executed by the one or more processors, cause the one or more processors to perform operations comprising:
  receiving first image data generated by the first camera;
  determining a first identity of the first item based at least in part on the first image data;
  receiving first sensor data generated by the one or more first weight sensors;
  determining a first weight associated with the first item based at least in part on the first sensor data;
  receiving second image data generated by the second camera;
  determining a second identity of the second item based at least in part on the second image data;
  receiving second sensor data generated by the one or more first weight sensors;
  determining a second weight associated with the second item based at least in part on the second sensor data;
  receiving third image data generated by at least one of the first camera or the second camera;
  determining a third identity of a third item based at least in part on the third image data;
  receiving third sensor data generated by the one or more second weight sensors; and
  determining a third weight associated with the third item based at least in part on the third sensor data.

3. The shopping cart as recited in claim 1, wherein the user-facing module further comprises:
a third camera oriented substantially perpendicular with respect to a ground plane;
one or more processors; and
one or more computer-readable media storing instructions that, when executed by the one or more processors, cause the one or more processors to perform operations comprising:
  receiving image data generated by the third camera;
  determining that the image data represents a marker associated with a ceiling of a facility; and
  determining a location associated with the shopping cart within the facility based at least in part on the marker.

4. A mobile apparatus comprising:
a frame;
a basket coupled to the frame, the basket comprising:
  a first bottom having a first perimeter; and
  first sides coupled to and extending upward from the first bottom, wherein the first bottom and the first sides at least partly define a first receptacle of the basket;
a shelf coupled to and extending substantially horizontally from the basket, the shelf comprising;
  a second bottom having a second perimeter; and
  second sides coupled to and extending upward from the second bottom, wherein the second bottom and the second sides at least partly define a second receptacle of the shelf;
a first imaging device oriented substantially towards the first receptacle of the basket; and
a second imaging device oriented substantially towards the second receptacle of the shelf; and
one or more wheels coupled to the frame.

5. The mobile apparatus as recited in claim 4, further comprising:
one or more processors; and
one or more computer-readable media storing instructions that, when executed by the one or more processors, cause the one or more processors to perform operations comprising:
  receiving first image data generated by the first imaging device;
  identifying, based at least in part on the first image data, a first item placed within the first receptacle;
  receiving second image data generated by the second imaging device; and
  identifying, based at least in part on the second image data, a second item placed within the second receptacle.

6. The mobile apparatus as recited in claim 4, further comprising a user-facing module, the user-facing module comprising:
the first imaging device;
the second imaging device; and
a third imaging device oriented substantially perpendicular with respect to a ground plane.

7. The mobile apparatus as recited in claim 6, the user-facing module further comprises:

one or more processors; and
one or more computer-readable media storing instructions that, when executed by the one or more processors, cause the one or more processors to perform operations comprising:
  receiving third image data generated by the third imaging device;
  determining that the third image data represents a marker; and
  determining a location associated with the mobile apparatus based at least in part on the marker.

8. The mobile apparatus as recited in claim 4, further comprising a third imaging device oriented substantially towards the first receptacle of the basket.

9. The mobile apparatus as recited in claim 8, wherein:
the first imaging device is disposed proximate to a first side of the mobile apparatus;
the first imaging device is oriented in a first direction, the first direction being substantially towards a second side of the mobile apparatus;
the third imaging device is disposed proximate to a second side of the mobile apparatus; and
the third imaging device is oriented in a second direction, the second direction being substantially towards the first side of the mobile apparatus.

10. The mobile apparatus as recited in claim 4, further comprising:
a tray coupled to the frame; and
one or more weight sensors disposed proximate to a surface of the tray.

11. The mobile apparatus as recited in claim 10, further comprising:
one or more processors; and
one or more computer-readable media storing instructions that, when executed by the one or more processors, cause the one or more processors to perform operations comprising:
  receiving image data generated by at least one of the first imaging device or the second imaging device;
  determining an identity of an item based at least in part on the image data;
  receiving sensor data generated by the one or more weight sensors;
  determining a weight of the item based at least in part on the sensor data;
  determining a price per unit weight associated with the item;
  determining a price of the item based at least in part on the weight and the price per unit weight; and
  generating item data representing at least the identity of the item, the weight of the item, and the price.

12. The mobile apparatus as recited in claim 10, further comprising:
one or more processors; and
one or more computer-readable media storing instructions that, when executed by the one or more processors, cause the one or more processors to perform operations comprising:
  receiving image data generated by at least one of the first imaging device or the second imaging device;
  determining an identity of an item based at least in part on the image data;
  receiving sensor data generated by the one or more weight sensors;
  determining a first weight based at least in part on the sensor data;
  determining a second weight associated with the item; and
  verifying the identity of the item based at least in part on the first weight and the second weight.

13. The mobile apparatus as recited in claim 10, further comprising:
one or more processors; and
one or more computer-readable media storing instructions that, when executed by the one or more processors, cause the one or more processors to perform operations comprising:
  receiving image data generated by at least one of the first imaging device or the second imaging device;
  determining an identity of an item based at least in part on the image data;
  receiving sensor data generated by the one or more weight sensors;
  determining a first weight associated with one or more items based at least in part on the sensor data;
  determining a second weight associated with a unit of the item;
  determining a number of the item based at least in part on the first weight and the second weight; and
  generating item data representing at least the identity of the item and the number of the item.

14. A mobile apparatus comprising:
a frame;
a basket coupled to the frame;
one or more weight first weight sensors disposed proximate to the basket;
a tray coupled to the frame;
a first plate coupled to the frame, wherein the tray is coupled to the first plate;
a second plate coupled to the frame, wherein the tray is coupled to the second plate;
one or more second weight sensors disposed proximate to the tray, wherein the one or more second weight sensors comprise:
  a first loadcell of a weight sensor disposed between the tray and the first plate; and
  a second loadcell of the weight sensor disposed between the tray and the second plate; and
wheels coupled to the frame.

15. The mobile apparatus as recited in claim 14, wherein the one or more second weight sensors comprise:
a first loadcell of a weight sensor disposed proximate to a first portion of the tray;
a second loadcell of the weight sensor disposed proximate to a second portion of the tray;
a third loadcell of the weight sensor disposed proximate to a third portion of the tray; and
a fourth loadcell of the weight sensor disposed proximate to a fourth portion of the tray.

16. The mobile apparatus as recited in claim 14, further comprising:
an imaging device;
one or more processors; and
one or more computer-readable media storing instructions that, when executed by the one or more processors, cause the one or more processors to perform operations comprising:
  receiving image data generated by the imaging device;
  determining an identity of an item based at least in part on the image data;
  receiving sensor data generated by the one or more second weight sensors; and determining a weight of the item based at least in part on the sensor data.

17. The mobile apparatus as recited in claim 16, wherein the imaging device comprises:
   a first imaging device oriented substantially towards the basket; and
   a second imaging device oriented substantially towards the tray.

18. The mobile apparatus as recited in claim 14, wherein the tray further comprises:
   a first portion of the tray, the first portion of the tray including a first angle with respect to a ground plane; and
   a second portion of the tray, the second portion of the tray including a second angle with respect to the ground plane, the second angle being different than the first angle.

19. The mobile apparatus as recited in claim 14, further comprising:
   a shelf coupled to and extending substantially horizontally from the basket; and
   a user-facing module coupled to the frame, the user-facing module comprising:
      a first imaging device oriented substantially towards a first receptacle of the basket; and
      a second imaging device oriented substantially towards a second receptacle of the shelf.

20. The mobile apparatus as recited in claim 19, wherein the user-facing module further comprises:
   one or more processors; and
   one or more computer-readable media storing instructions that, when executed by the one or more processors, cause the one or more processors to perform operations comprising:
      receiving first image data generated by the first imaging device;
      determining, based at least in part on the first image data, a first identity of a first item placed within the first receptacle;
      receiving second image data generated by the second imaging device; and
      determining, based at least in part on the second image data, a second identity of a second item placed within the second receptacle.

* * * * *